United States Patent
Weitz et al.

(10) Patent No.: US 10,195,571 B2
(45) Date of Patent: Feb. 5, 2019

(54) MULTIPLE EMULSIONS AND TECHNIQUES FOR THE FORMATION OF MULTIPLE EMULSIONS

(71) Applicant: President and Fellows of Harvard College, Cambridge, MA (US)

(72) Inventors: David A. Weitz, Bolton, MA (US); Shin-Hyn Kim, Cambridge, MA (US); Alireza Abbaspourrad, Ithaca, NY (US)

(73) Assignee: President and Fellows of Harvard College, Cambridge, MA (US)

( * ) Notice: Subject to any disclaimer, the term of this patent is extended or adjusted under 35 U.S.C. 154(b) by 99 days.

(21) Appl. No.: 15/235,423

(22) Filed: Aug. 12, 2016

(65) Prior Publication Data

US 2016/0375413 A1    Dec. 29, 2016

Related U.S. Application Data

(62) Division of application No. 14/130,531, filed as application No. PCT/US2012/045481 on Jul. 5, 2012.
(Continued)

(51) Int. Cl.
*B01F 5/00* (2006.01)
*B01F 3/08* (2006.01)
(Continued)

(52) U.S. Cl.
CPC .......... *B01F 5/0085* (2013.01); *B01F 3/0807* (2013.01); *B01F 3/0811* (2013.01);
(Continued)

(58) Field of Classification Search
None
See application file for complete search history.

(56) References Cited

U.S. PATENT DOCUMENTS

| | | |
|---|---|---|
| 2,379,816 A | 7/1945 | Mabbs |
| 2,918,263 A | 12/1959 | Eichhorn |

(Continued)

FOREIGN PATENT DOCUMENTS

| | | |
|---|---|---|
| CA | 2 767 056 A1 | 3/2011 |
| CH | 563807 A5 | 7/1975 |

(Continued)

OTHER PUBLICATIONS

European Office Communication for EP 06737002.3 dated Apr. 3, 2008.
(Continued)

*Primary Examiner* — Jeffrey D Washville
(74) *Attorney, Agent, or Firm* — Wolf, Greenfield & Sacks, P.C.

(57) ABSTRACT

Multiple emulsions and techniques for the formation of multiple emulsions are generally described. A multiple emulsion, as used herein, describes larger droplets that contain one or more smaller droplets therein. In some embodiments, the larger droplet or droplets may be suspended in a carrying fluid containing the larger droplets that, in turn, contain the smaller droplets. As described below, multiple emulsions can be formed in one step in certain embodiments, with generally precise repeatability, and can be tailored in some embodiments to include a relatively thin layer of fluid separating two other fluids.

15 Claims, 25 Drawing Sheets

Related U.S. Application Data

(60) Provisional application No. 61/505,001, filed on Jul. 6, 2011, provisional application No. 61/504,990, filed on Jul. 6, 2011.

(51) Int. Cl.
  *B01F 5/04* (2006.01)
  *B01F 13/00* (2006.01)
  *B01J 13/04* (2006.01)
  *B01J 13/12* (2006.01)
  *B01J 13/14* (2006.01)

(52) U.S. Cl.
  CPC .......... *B01F 5/045* (2013.01); *B01F 13/0059* (2013.01); *B01F 13/0062* (2013.01); *B01F 13/0069* (2013.01); *B01J 13/04* (2013.01); *B01J 13/12* (2013.01); *B01J 13/14* (2013.01); *B01F 2003/0838* (2013.01); *B01F 2005/0034* (2013.01); *B01F 2215/0404* (2013.01); *B01F 2215/0431* (2013.01); *B01F 2215/0454* (2013.01); *B01F 2215/0495* (2013.01); *Y10T 428/2985* (2015.01)

(56) References Cited

U.S. PATENT DOCUMENTS

| | | |
|---|---|---|
| 3,505,244 A | 4/1970 | Cessna |
| 3,675,901 A | 7/1972 | Rion |
| 3,816,331 A | 6/1974 | Brown et al. |
| 3,980,541 A | 9/1976 | Aine |
| 4,251,195 A | 2/1981 | Suzuki et al. |
| 4,279,345 A | 7/1981 | Allred |
| 4,422,985 A | 12/1983 | Morishita et al. |
| 4,508,265 A | 4/1985 | Jido |
| 4,695,466 A | 9/1987 | Morishita et al. |
| 4,732,930 A | 3/1988 | Tanaka et al. |
| 4,743,507 A | 5/1988 | Franses et al. |
| 4,865,444 A | 9/1989 | Green et al. |
| 4,880,313 A | 11/1989 | Loquenz et al. |
| 4,888,140 A | 12/1989 | Schlameus et al. |
| 4,931,225 A | 6/1990 | Cheng |
| 4,978,483 A | 12/1990 | Redding, Jr. |
| 4,996,265 A | 2/1991 | Okubo et al. |
| 5,100,933 A | 3/1992 | Tanaka et al. |
| 5,149,625 A | 9/1992 | Church et al. |
| 5,204,112 A | 4/1993 | Hope et al. |
| 5,209,978 A | 5/1993 | Kosaka et al. |
| 5,216,096 A | 6/1993 | Hattori et al. |
| 5,227,979 A | 7/1993 | Fukuhira et al. |
| 5,232,712 A | 8/1993 | Mills et al. |
| 5,326,692 A | 7/1994 | Brinkley et al. |
| 5,378,957 A | 1/1995 | Kelly |
| 5,418,154 A | 5/1995 | Aebischer et al. |
| 5,452,955 A | 9/1995 | Lundstrom |
| 5,500,223 A | 3/1996 | Behan et al. |
| 5,512,131 A | 4/1996 | Kumar et al. |
| 5,617,997 A | 4/1997 | Kobayashi et al. |
| 5,681,600 A | 10/1997 | Antinone et al. |
| 5,762,775 A | 6/1998 | DePaoli et al. |
| 5,795,590 A | 8/1998 | Kiefer et al. |
| 5,849,055 A | 12/1998 | Arai et al. |
| 5,851,769 A | 12/1998 | Gray et al. |
| 5,882,680 A | 3/1999 | Suzuki et al. |
| 5,888,538 A | 3/1999 | Kiefer et al. |
| 5,935,331 A | 8/1999 | Naka et al. |
| 5,942,443 A | 8/1999 | Parce et al. |
| 5,980,936 A | 11/1999 | Krafft et al. |
| 6,004,525 A | 12/1999 | Tani et al. |
| 6,046,056 A | 4/2000 | Parce et al. |
| 6,116,516 A | 9/2000 | Ganan-Calvo |
| 6,119,953 A | 9/2000 | Ganan-Calvo et al. |
| 6,120,666 A | 9/2000 | Jacobson et al. |
| 6,149,789 A | 11/2000 | Benecke et al. |
| 6,150,180 A | 11/2000 | Parce et al. |
| 6,174,469 B1 | 1/2001 | Ganan-Calvo |
| 6,187,214 B1 | 2/2001 | Ganan-Calvo |
| 6,189,803 B1 | 2/2001 | Ganan-Calvo |
| 6,193,951 B1 | 2/2001 | Ottoboni et al. |
| 6,196,525 B1 | 3/2001 | Ganan-Calvo |
| 6,197,835 B1 | 3/2001 | Ganan-Calvo |
| 6,221,654 B1 | 4/2001 | Quake et al. |
| 6,234,402 B1 | 5/2001 | Ganan-Calvo |
| 6,238,690 B1 | 5/2001 | Kiefer et al. |
| 6,241,159 B1 | 6/2001 | Ganan-Calvo et al. |
| 6,248,378 B1 | 6/2001 | Ganan-Calvo |
| 6,251,661 B1 | 6/2001 | Urabe et al. |
| 6,267,858 B1 | 7/2001 | Parce et al. |
| 6,274,337 B1 | 8/2001 | Parce et al. |
| 6,299,145 B1 | 10/2001 | Ganan-Calvo |
| 6,301,055 B1 | 10/2001 | Legrand et al. |
| 6,306,659 B1 | 10/2001 | Parce et al. |
| 6,355,198 B1 | 3/2002 | Kim et al. |
| 6,357,670 B2 | 3/2002 | Ganan-Calvo |
| 6,380,297 B1 | 4/2002 | Zion et al. |
| 6,386,463 B1 | 5/2002 | Ganan-Calvo |
| 6,394,429 B2 | 5/2002 | Ganan-Calvo |
| 6,399,389 B1 | 6/2002 | Parce et al. |
| 6,405,936 B1 | 6/2002 | Ganan-Calvo |
| 6,408,878 B2 | 6/2002 | Unger et al. |
| 6,413,548 B1 | 7/2002 | Hamer et al. |
| 6,429,025 B1 | 8/2002 | Parce et al. |
| 6,432,148 B1 | 8/2002 | Ganan-Calvo |
| 6,432,630 B1 | 8/2002 | Blankenstein |
| 6,450,189 B1 | 9/2002 | Ganan-Calvo |
| 6,464,886 B2 | 10/2002 | Ganan-Calvo |
| 6,489,103 B1 | 12/2002 | Griffiths et al. |
| 6,506,609 B1 | 1/2003 | Wada et al. |
| 6,508,988 B1 | 1/2003 | Van Dam et al. |
| 6,540,895 B1 | 4/2003 | Spence et al. |
| 6,554,202 B2 | 4/2003 | Ganan-Calvo |
| 6,557,834 B2 | 5/2003 | Ganan-Calvo |
| 6,558,944 B1 | 5/2003 | Parce et al. |
| 6,558,960 B1 | 5/2003 | Parce et al. |
| 6,560,030 B2 | 5/2003 | Legrand et al. |
| 6,592,821 B1 | 7/2003 | Wada et al. |
| 6,608,726 B2 | 8/2003 | Legrand et al. |
| 6,610,499 B1 | 8/2003 | Fulwyler et al. |
| 6,614,598 B1 | 9/2003 | Quake et al. |
| 6,630,353 B1 | 10/2003 | Parce et al. |
| 6,645,432 B1 | 11/2003 | Anderson et al. |
| 6,660,252 B2 | 12/2003 | Matathia et al. |
| 6,752,922 B2 | 7/2004 | Huang et al. |
| 6,790,328 B2 | 9/2004 | Jacobson et al. |
| 6,806,058 B2 | 10/2004 | Jesperson et al. |
| 6,890,487 B1 | 5/2005 | Sklar et al. |
| 6,916,488 B1 | 7/2005 | Meier et al. |
| 6,935,768 B2 | 8/2005 | Lowe et al. |
| 7,041,481 B2 | 5/2006 | Anderson et al. |
| 7,068,874 B2 | 6/2006 | Wang et al. |
| 7,115,230 B2 | 10/2006 | Sundararajan et al. |
| 7,374,332 B2 | 5/2008 | Higashino et al. |
| 7,651,770 B2 | 1/2010 | Berkland et al. |
| 7,708,949 B2 | 5/2010 | Stone et al. |
| 7,776,927 B2 | 8/2010 | Chu et al. |
| RE41,780 E | 9/2010 | Anderson et al. |
| 7,968,287 B2 | 6/2011 | Griffiths et al. |
| 8,039,020 B2 | 10/2011 | Lapidot et al. |
| 8,263,129 B2 | 9/2012 | Desimone et al. |
| 8,302,880 B2 | 11/2012 | Clarke |
| 8,439,487 B2 | 5/2013 | Clarke et al. |
| 8,685,323 B2 | 4/2014 | Nam et al. |
| 8,697,008 B2 | 4/2014 | Clarke et al. |
| 8,741,192 B2 | 6/2014 | Torii et al. |
| 8,772,046 B2 | 7/2014 | Fraden et al. |
| 9,039,273 B2 | 5/2015 | Weitz et al. |
| 2002/0004532 A1 | 1/2002 | Matathia et al. |
| 2002/0008028 A1 | 1/2002 | Jacobson et al. |
| 2002/0009473 A1 | 1/2002 | Tebbe |
| 2002/0119459 A1 | 8/2002 | Griffiths |
| 2003/0015425 A1 | 1/2003 | Bohm et al. |
| 2003/0039169 A1 | 2/2003 | Ehrfeld et al. |
| 2003/0077204 A1 | 4/2003 | Seki et al. |
| 2003/0124509 A1 | 7/2003 | Kenis et al. |

(56) References Cited

U.S. PATENT DOCUMENTS

| | | |
|---|---|---|
| 2003/0124586 A1 | 7/2003 | Griffiths et al. |
| 2003/0180485 A1 | 9/2003 | Nakajima et al. |
| 2003/0227820 A1 | 12/2003 | Parrent |
| 2003/0230819 A1 | 12/2003 | Park et al. |
| 2004/0058198 A1 | 3/2004 | Wang et al. |
| 2004/0068019 A1 | 4/2004 | Higuchi et al. |
| 2004/0096515 A1 | 5/2004 | Bausch et al. |
| 2004/0109894 A1 | 6/2004 | Shefer et al. |
| 2004/0182712 A1 | 9/2004 | Basol |
| 2005/0032238 A1 | 2/2005 | Karp et al. |
| 2005/0032240 A1 | 2/2005 | Lee et al. |
| 2005/0112235 A1 | 5/2005 | Shefer et al. |
| 2005/0172476 A1 | 8/2005 | Stone et al. |
| 2005/0183995 A1 | 8/2005 | Deshpande et al. |
| 2005/0207940 A1 | 9/2005 | Butler et al. |
| 2005/0221339 A1 | 10/2005 | Griffiths et al. |
| 2006/0051329 A1 | 3/2006 | Lee et al. |
| 2006/0078888 A1 | 4/2006 | Griffiths et al. |
| 2006/0078893 A1 | 4/2006 | Griffiths et al. |
| 2006/0108012 A1 | 5/2006 | Barrow et al. |
| 2006/0163385 A1 | 7/2006 | Link et al. |
| 2006/0196644 A1 | 9/2006 | Boger et al. |
| 2006/0222701 A1 | 10/2006 | Kulkarni et al. |
| 2006/0263888 A1 | 11/2006 | Fritz et al. |
| 2007/0000342 A1 | 1/2007 | Kazuno |
| 2007/0003442 A1 | 1/2007 | Link et al. |
| 2007/0009668 A1 | 1/2007 | Wyman et al. |
| 2007/0054119 A1 | 3/2007 | Garstecki et al. |
| 2007/0056853 A1 | 3/2007 | Aizenberg et al. |
| 2007/0092914 A1 | 4/2007 | Griffiths et al. |
| 2007/0138675 A1 | 6/2007 | Liang et al. |
| 2007/0172827 A1 | 7/2007 | Murakami |
| 2007/0172873 A1 | 7/2007 | Brenner et al. |
| 2007/0195127 A1 | 8/2007 | Ahn et al. |
| 2007/0196397 A1 | 8/2007 | Torii et al. |
| 2008/0003142 A1 | 1/2008 | Link et al. |
| 2008/0004436 A1 | 1/2008 | Tawfik et al. |
| 2008/0014589 A1 | 1/2008 | Link et al. |
| 2009/0011009 A1 | 1/2009 | Benita et al. |
| 2009/0012187 A1 | 1/2009 | Chu et al. |
| 2009/0036568 A1 | 2/2009 | Merle et al. |
| 2009/0068170 A1 | 3/2009 | Weitz et al. |
| 2009/0131543 A1 | 5/2009 | Weitz et al. |
| 2009/0191276 A1 | 7/2009 | Kim et al. |
| 2009/0235990 A1 | 9/2009 | Beer |
| 2010/0040696 A1* | 2/2010 | Sente ............... A61K 8/11 424/497 |
| 2010/0096088 A1 | 4/2010 | Okita et al. |
| 2010/0129422 A1 | 5/2010 | Han et al. |
| 2010/0130369 A1 | 5/2010 | Shenderov et al. |
| 2010/0136544 A1 | 6/2010 | Agresti et al. |
| 2010/0137163 A1 | 6/2010 | Link et al. |
| 2010/0163109 A1 | 7/2010 | Fraden et al. |
| 2010/0170957 A1 | 7/2010 | Clarke |
| 2010/0173394 A1 | 7/2010 | Colston, Jr. et al. |
| 2010/0188466 A1 | 7/2010 | Clarke |
| 2010/0203151 A1* | 8/2010 | Hiraoka ............ A61K 9/5031 424/497 |
| 2010/0209478 A1 | 8/2010 | Sawhney et al. |
| 2010/0213628 A1 | 8/2010 | Bausch et al. |
| 2010/0238232 A1 | 9/2010 | Clarke et al. |
| 2011/0008427 A1 | 1/2011 | Biggs et al. |
| 2011/0116993 A1 | 5/2011 | Nam et al. |
| 2011/0123413 A1 | 5/2011 | Abate et al. |
| 2011/0160078 A1 | 6/2011 | Fodor et al. |
| 2011/0177951 A1 | 7/2011 | Toledano et al. |
| 2011/0229545 A1 | 9/2011 | Shum et al. |
| 2011/0305761 A1 | 12/2011 | Shum et al. |
| 2012/0015382 A1 | 1/2012 | Weitz et al. |
| 2012/0048882 A1 | 3/2012 | Clarke et al. |
| 2012/0053250 A1 | 3/2012 | Carrick et al. |
| 2012/0108721 A1 | 5/2012 | Mazutis |
| 2012/0168010 A1 | 7/2012 | Bauer et al. |
| 2012/0199226 A1 | 8/2012 | Weitz et al. |
| 2012/0211084 A1 | 8/2012 | Weitz et al. |
| 2012/0220494 A1 | 8/2012 | Samuels et al. |
| 2013/0046030 A1 | 2/2013 | Rotem et al. |
| 2013/0064862 A1 | 3/2013 | Weitz et al. |
| 2013/0243689 A1 | 9/2013 | Amiji et al. |
| 2013/0274117 A1 | 10/2013 | Church et al. |
| 2013/0277461 A1 | 10/2013 | Ripoll et al. |
| 2014/0065234 A1 | 3/2014 | Shum et al. |
| 2014/0106032 A1 | 4/2014 | Firmenich |
| 2014/0151912 A1 | 6/2014 | Nam et al. |
| 2014/0220350 A1 | 8/2014 | Kim et al. |
| 2014/0378349 A1 | 12/2014 | Hindson et al. |
| 2015/0005200 A1 | 1/2015 | Hindson et al. |
| 2015/0285282 A1 | 10/2015 | Weitz et al. |
| 2016/0144329 A1 | 5/2016 | Wesner et al. |
| 2016/0144330 A1 | 5/2016 | Wesner et al. |
| 2016/0145535 A1 | 5/2016 | Wesner et al. |
| 2017/0224849 A1 | 8/2017 | Carroll et al. |
| 2017/0319443 A1 | 11/2017 | Weitz et al. |

FOREIGN PATENT DOCUMENTS

| | | |
|---|---|---|
| CN | 1695809 A | 11/2005 |
| CN | 1772363 A | 5/2006 |
| CN | 1933898 A | 3/2007 |
| CN | 101721964 A | 6/2010 |
| CN | 101856603 A | 10/2010 |
| CN | 102014871 A | 4/2011 |
| DE | 43 08 839 A1 | 9/1994 |
| DE | 199 61 257 A1 | 7/2001 |
| DE | 100 15 109 A1 | 10/2001 |
| DE | 100 41 823 A1 | 3/2002 |
| DE | 102005048259.00 A1 | 4/2007 |
| EP | 0 249 007 A2 | 12/1987 |
| EP | 0 272 659 A2 | 6/1988 |
| EP | 0 478 326 A1 | 4/1992 |
| EP | 0781548 A2 | 7/1997 |
| EP | 0 718 038 B1 | 10/2002 |
| EP | 1 358 931 A2 | 11/2003 |
| EP | 1 362 634 A1 | 11/2003 |
| EP | 1595597 A2 | 11/2005 |
| EP | 1 757 357 A1 | 2/2007 |
| EP | 1 741 482 A2 | 1/2008 |
| EP | 2 283 918 A2 | 2/2011 |
| EP | 2283918 A2 | 2/2011 |
| EP | 2 289 613 A2 | 3/2011 |
| FR | 2696658 A1 | 4/1994 |
| GB | 1 422 737 | 1/1976 |
| GB | 1 446 998 | 8/1976 |
| GB | 2 433 448 A | 6/2007 |
| JP | S54-107880 A | 8/1979 |
| JP | S56-130219 A | 10/1981 |
| JP | S60-040055 A | 3/1985 |
| JP | S61-057236 A | 3/1986 |
| JP | H09-221417 A | 8/1997 |
| JP | H10-219222 A | 8/1998 |
| JP | H11-509768 A | 8/1999 |
| JP | 2001-234188 A | 8/2001 |
| JP | 2001-354551 A | 12/2001 |
| JP | 2004-161739 A | 6/2004 |
| JP | 2004-202476 A | 7/2004 |
| JP | 2004-351417 A | 12/2004 |
| JP | 2005-144356 A | 6/2005 |
| JP | 2005-152740 A | 6/2005 |
| JP | 2005-152773 A | 6/2005 |
| JP | 2006-023322 A | 1/2006 |
| JP | 2006-507921 A | 3/2006 |
| JP | 2006-257415 A | 9/2006 |
| JP | 2006-523142 A | 10/2006 |
| JP | 2008-535644 A | 9/2008 |
| JP | 2008-238146 A | 10/2008 |
| JP | 2009-241044 A | 10/2009 |
| JP | 2011-092854 A | 5/2011 |
| JP | 2011-115755 A | 6/2011 |
| JP | S51-08875 B2 | 12/2012 |
| WO | WO 96/29629 A2 | 9/1996 |
| WO | WO 00/70080 A1 | 11/2000 |
| WO | WO 00/76673 A1 | 12/2000 |
| WO | WO 01/12327 A1 | 2/2001 |
| WO | WO 01/68257 A1 | 9/2001 |

(56) References Cited

FOREIGN PATENT DOCUMENTS

| | | |
|---|---|---|
| WO | WO 01/69289 A2 | 9/2001 |
| WO | WO 01/72431 A1 | 10/2001 |
| WO | WO 01/85138 A2 | 11/2001 |
| WO | WO 01/89787 A2 | 11/2001 |
| WO | WO 01/89788 A2 | 11/2001 |
| WO | WO 01/94635 A2 | 12/2001 |
| WO | WO 02/18949 A2 | 3/2002 |
| WO | WO 02/047665 A2 | 6/2002 |
| WO | WO 02/103011 A2 | 12/2002 |
| WO | WO 03/011443 A2 | 2/2003 |
| WO | WO 03/068381 A1 | 8/2003 |
| WO | WO 2004/002627 A2 | 1/2004 |
| WO | WO 2004/038363 A2 | 5/2004 |
| WO | WO 2004/071638 A2 | 8/2004 |
| WO | WO 2004/091763 A2 | 10/2004 |
| WO | WO 2005/002730 A1 | 1/2005 |
| WO | WO 2005/021151 A1 | 3/2005 |
| WO | WO 2005/049787 A2 | 6/2005 |
| WO | WO 2005/084210 A2 | 9/2005 |
| WO | WO 2005/089921 A1 | 9/2005 |
| WO | WO 2005/103106 A1 | 11/2005 |
| WO | WO 2006/002641 A1 | 1/2006 |
| WO | WO 2006/050638 A1 | 5/2006 |
| WO | WO 2006/078841 A1 | 7/2006 |
| WO | WO 2006/096571 A2 | 9/2006 |
| WO | WO 2006/101851 A2 | 9/2006 |
| WO | WO 2007/001448 A2 | 1/2007 |
| WO | WO 2007/024410 A2 | 3/2007 |
| WO | WO 2007/081385 A2 | 7/2007 |
| WO | WO 2007/089541 A2 | 8/2007 |
| WO | WO 2007/133807 A2 | 11/2007 |
| WO | WO 2008/058297 A2 | 5/2008 |
| WO | WO 2008/109176 A2 | 9/2008 |
| WO | WO 2008/121342 A2 | 10/2008 |
| WO | WO 2008/134153 A1 | 11/2008 |
| WO | WO 2009/020633 A2 | 2/2009 |
| WO | WO 2009/048532 A2 | 4/2009 |
| WO | WO 2009/061372 A1 | 5/2009 |
| WO | WO 2009/075652 A1 | 6/2009 |
| WO | WO 2009/120254 A1 | 10/2009 |
| WO | WO 2009/148598 A1 | 12/2009 |
| WO | WO 2010/104597 A2 | 9/2010 |
| WO | WO 2010/104604 A1 | 9/2010 |
| WO | WO 2010/121307 A1 | 10/2010 |
| WO | WO 2010/148106 A1 | 12/2010 |
| WO | WO 2011/001185 A2 | 1/2011 |
| WO | WO 2011/028760 A2 | 3/2011 |
| WO | WO 2011/028764 A2 | 3/2011 |
| WO | WO 2011/160733 A1 | 12/2011 |
| WO | WO 2012/048341 A1 | 4/2012 |
| WO | WO 2013/042125 A2 | 3/2013 |
| WO | WO 2013/163246 A2 | 10/2013 |
| WO | WO 2014/099946 A1 | 6/2014 |
| WO | WO 2014/130761 A2 | 8/2014 |

OTHER PUBLICATIONS

European Office Communication for EP 06737002.3 dated Mar. 11, 2009.
Examining Division Decision for EP 06737002.3 dated Sep. 2, 2010.
Extended European Search Report for EP 10165813.6 dated Oct. 7, 2010.
Invitation to Pay Additional Fees for PCT/US2006/007772 dated Jun. 28, 2006.
International Search Report and Written Opinion for PCT/US2006/007772 dated Sep. 1, 2006.
International Preliminary Report on Patentability for PCT/US2006/007772 dated Sep. 20, 2007.
Decision on Rejection for CN 200880017845.4 dated Sep. 24, 2012.
International Search Report and Written Opinion for PCT/US2008/004097 dated Aug. 10, 2009.
European Office Action for Application No. EP 09758762.0 dated Aug. 13, 2015.
European Office Communication for Application No. 09758762.0 dated Sep. 29, 2016.
Korean Office Action for Application No. KR 10-2011-7000094 dated Feb. 27, 2013.
International Search Report and Written Opinion for International Application No. PCT/US09/003389 dated Oct. 21, 2009.
International Preliminary Report on Patentability for International Application No. PCT/US2009/003389 dated Dec. 16, 2010.
International Search Report and Written Opinion for International Application No. PCT/US2001/46181 dated Mar. 12, 2003.
International Preliminary Examination Report for International Application No. PCT/US2001/46181 dated Apr. 5, 2004.
International Search Report International Search Report and Written Opinion for International Application No. PCT/US2007/084561 dated Apr. 29, 2008.
International Search Report and Written Opinion for PCT/US2010/000763 dated Jul. 20, 2010.
Chinese Office Action for Application No. CN 201080039018.2 dated Sep. 27, 2013.
Chinese Office Action dated May 13, 2014 for Application No. 201080039018.2.
Chinese Office Action dated Sep. 17, 2014 for Application No. 201080039018.2.
Extended European Search Report for Application No. EP 10814398.3 dated Oct. 29, 2015.
Japanese Office Action dated Aug. 5, 2014 for Application No. JP 2012-527993.
International Search Report and Written Opinion for PCT/US2010/047458 dated May 24, 2011.
International Preliminary Report on Patentability for PCT/US2010/047458 dated Mar. 15, 2012.
Chinese Office Action for Application No. CN 201080039023.3 dated Dec. 23, 2013.
Chinese Office Action dated Oct. 24, 2014 for Application No. 201080039023.3.
Chinese Office Action dated Jul. 10, 2015 for Application No. 201080039023.3.
Extended European Search Report for Application No. EP 10814401.5 dated Nov. 3, 2015.
Japanese Office Action dated Jul. 22, 2014 for Application No. JP 2012-527995.
Japanese Office Action dated Jun. 11, 2015 for Application No. 2012-527995.
International Search Report and Written Opinion for PCT/US2010/047467 dated May 26, 2011.
International Preliminary Report on Patentability for PCT/US2010/047467 dated Mar. 15, 2012.
Chinese Office Action dated May 13, 2014 for Application No. CN 201180014139.6.
Invitation to Pay Additional Fees for PCT/US2011/028754 dated Nov. 30, 2011.
International Search Report and Written Opinion for PCT/US2011/028754 dated Apr. 3, 2012.
International Preliminary Report on Patentability for PCT/US2011/028754 dated Sep. 27, 2012.
Chinese Office Action dated Jan. 16, 2015 for Application No. CN 201280024857.6.
Chinese Office Action for Application No. CN 201280024857.6 dated Sep. 14, 2015.
European Office Action dated Mar. 24, 2015 for Application No. 12725967.9.
European Office Action for Application No. 12725967.9 dated Nov. 19, 2015.
Invitation to Pay Additional Fees for PCT/US2012/038957 dated Sep. 5, 2012.
International Search Report and Written Opinion for PCT/US2012/038957 dated Dec. 13, 2012.
International Preliminary Report on Patentability for PCT/US2012/038957 dated Dec. 5, 2013.
Chinese Office Action for Application No. CN 201280039927.5 dated Mar. 24, 2015.
Chinese Office Action for Application No. CN 201280039927.5 dated Dec. 1, 2015.

(56) References Cited

OTHER PUBLICATIONS

Chinese Office Action for Application No. 201280039927.5 dated May 17, 2016.
European Office Action dated Feb. 12, 2015 for Application No. 12736019.6.
European Office Action dated Oct. 7, 2015 for Application No. 12736019.6.
European Office Action for Application No. 12736019.6 dated Jul. 6, 2016.
Extended European Search Report dated Jan. 31, 2017 for Application No. EP 16184915.3.
Japanese Office Action for Application No. 2014-519281 dated May 24, 2016.
Japanese Office Action dated Aug. 8, 2017 for Application No. JP 2016-159526.
International Search Report and Written Opinion for PCT/US2012/045481 dated Feb. 6, 2013.
International Preliminary Report on Patentability for PCT/US2012/045481 dated Jan. 16, 2014.
Chinese Office Action dated Feb. 4, 2015 for Application No. 201280041041.4.
Chinese Office Action for Application No. CN 201280041041.4 dated Aug. 26, 2015.
Chinese Office Action for Application No. 201280041041.4 dated Mar. 7, 2016.
Office Action dated Nov. 15, 2016 for Application No. 201280041041.4.
European Office Action dated Jul. 28, 2017 for Application No. EP 12751233.3.
Japanese Office Action for Application No. 2014-528430 dated Jun. 21, 2016.
Invitation to Pay Additional Fees dated May 31, 2013 for Application No. PCT/US2012/050916.
International Search Report and Written Opinion dated Nov. 6, 2013 for Application No. PCT/US2012/050916.
International Preliminary Report on Patentability dated Mar. 13, 2014 for Application No. PCT/US2012/050916.
International Search Report and Written Opinion dated Feb. 3, 2016 for Application No. PCT/US2015/061481.
International Preliminary Report on Patentability dated Jun. 8, 2017 for Application No. PCT/US2015/061481.
International Search Report and Written Opinion dated Feb. 9, 2016 for Application No. PCT/US2015/064192.
International Preliminary Report on Patentability for PCT/US2015/064192 dated Jun. 8, 2017.
International Search Report and Written Opinion dated Feb. 10, 2016 for Application No. PCT/US2015/055315.
International Preliminary Report on Patentability dated Apr. 27, 2017 for Application No. PCT/US2015/055315.
International Search Report and Written Opinion dated Feb. 5, 2016 for Application No. PCT/US2015/061511.
International Preliminary Report on Patentability dated Jun. 8, 2017 for Application No. PCT/US2015/061511.
Office Communication dated Oct. 9, 2014 for U.S. Appl. No. 11/885,306.
Office Communication dated Jul. 11, 2012 for U.S. Appl. No. 12/993,205.
Office Communication dated Feb. 14, 2013 for U.S. Appl. No. 12/993,205.
Office Action dated Feb. 24, 2015 for U.S. Appl. No. 13/397,018.
Office Action dated Jun. 11, 2015 for U.S. Appl. No. 13/967,018.
Office Action dated Feb. 9, 2016 for U.S. Appl. No. 13/967,018.
Office Action dated Jun. 30, 2016 for U.S. Appl. No. 13/967,018.
Office Action dated Dec. 23, 2016 for U.S. Appl. No. 13/967,018.
Office Action dated May 16, 2017 for U.S. Appl. No. 13/967,018.
Office Action dated Nov. 20, 2014 for U.S. Appl. No. 13/390,584.
Office Action dated Oct. 20, 2015 for U.S. Appl. No. 14/130,531.
Office Action dated Jun. 9, 2016 for U.S. Appl. No. 14/130,531.
Office Communication dated Nov. 29, 2013 for U.S. Appl. No. 13/586,628 mailed.
Final Office Action dated Jun. 19, 2014 for U.S. Appl. No. 13/586,628.
Advisory Action dated Sep. 25, 2014 for U.S. Appl. No. 13/586,628.
Advisory Action dated Nov. 10, 2014 for U.S. Appl. No. 13/586,628.
Office Action dated Dec. 18, 2015 for U.S. Appl. No. 13/586,628.
Office Action dated Jun. 30, 2016 for U.S. Appl. No. 13/586,628.
Office Action dated Mar. 22, 2017 for U.S. Appl. No. 13/586,628.
Office Action dated Jan. 2, 2018 for U.S. Appl. No. 13/586,628.
[No Author Listed] ATP Determination Kit (A-22066). Molecular Probes. Product Information. 2003. 3 pages. Revised Apr. 23, 2003.
[No Author Listed] Experimental Soft Condensed Matter Group. Cool Picture of the Moment. Available at http://www.seas.harvard.edu/projects /weitzlab/coolpic16012007.html dated Jan. 16, 2007.
[No Author Listed] Hawley's Condensed Chemical Dictionary, (2007), 499, John Wiley & Sons, Inc. Online@ http://onlinelibrary.wiley.com/book/10.1002/9780470114735/titles headwords = Emulsion, (downloaded Jan. 9, 2016), pp. 1.
[No Author Listed], Toxnet, Toxicology Data Network. Vinyl Toluene. National Library of Medicine. 2015:1-38.
[No Author] "Parafin Wax". http://www.wikipedia.com [last accessed Feb. 15, 2014].
[No Author] "Wax". http://www.wikipedia.com [last accessed Feb. 15, 2014].
[No Author] Microfluidic ChipShop. Microfluidic product catalogue. Mar. 2005.
[No Author] Microfluidic ChipShop. Microfluidic product catalogue. Oct. 2009.
Abate et al. One-step formation of multiple emulsions in microfluidics. Lab on a Chip. Lab Chip. Jan. 21, 2011;11(2):253-8. Epub Oct. 22, 2010. DOI:10.1039/C0LC00236D. 6 pages.
Abate et al., High-order multiple emulsions formed in poly(dimethylsiloxane) microfluidics. Small. Sep. 2009;5(18):2030-2.
Adams et al., Entropically driven microphase transitions in mixtures of colloidal rods and spheres. Nature. May 28, 1998:393:349-52.
Adams et al., Smart Capsules: Engineering new temperature and pressure sensitive materials with microfluidics. Mar. 10 Meeting of the American Physical Society. Mar. 15-19, 2010. Portland, Oregon. Submitted Nov. 20, 2009. Last accessed Jun. 14, 2012 at http://absimage.aps.org/image/MAR10/MWS_MAR10-2009-007422.pdf. Abstract only. 1 page.
Ahn et al., Dielectrophoretic manipulation of drops for high-speed microfluidic sorting devices. Applied Physics Letters. 2006;88:024104. 3 pages. Month not cited on publication.
Ando et al., PLGA microspheres containing plasmid DNA: preservation of supercoiled DNA via cryopreparation and carbohydrate stabilization. J Pharm Sci. Jan. 1999;88(1):126-30.
Anna et al., Formation of dispersions using "flow focusing" in microchannels. Applied Physics Letters. Jan. 20, 2003;82(3):364-6.
Ao et al., Emulsion-templated liquid core-polymer shell microcapsule formation. Langmuir. Mar. 3, 2009;25(5):2572-4. doi: 10.1021/la804036m.
Benichou et al., Double Emulsions Stabilized by New Molecular Recognition Hybrids of Natural Polymers. Polym Adv Tehcnol. 2002;13:1019-31. Month not cited on publication.
Bibette et al., Emulsions: basic principles. Rep Prog Phys. 1999;62:969-1033. Month not cited on publication.
Boone, et al. Plastic advances microfluidic devices. The devices debuted in silicon and glass, but plastic fabrication may make them hugely successful in biotechnology application. Analytical Chemistry. Feb. 2002; 78A-86A.
Chang et al. Controlled double emulsification utilizing 3D PDMS microchannels. Journal of Micromechanics and Microengineering. May 9, 2008;18:1-8.
Chao et al., Control of Concentration and Volume Gradients in Microfluidic Droplet Arrays for Protein Crystallization Screening. 26th Annual International Conference of the IEEE Engineering in Medicine and Biology Society. Francisco, California. Sep. 1-5, 2004. 4 pages.
Chao et al., Droplet Arrays in Microfluidic Channels for Combinatorial Screening Assays. Hilton Head 2004: A Solid State Sensor, Actuator and Microsystems Workshop. Hilton Head Island, South Carolina. Jun. 6-10, 2004:382-3.

(56) References Cited

OTHER PUBLICATIONS

Chen et al., Capturing a photoexcited molecular structure through time-domain x-ray absorption fine structure. Science. Apr. 13, 2001;292(5515):262-4.
Chen et al., Microfluidic Switch for Embryo and Cell Sorting. The 12th International Conference on Solid State Sensors, Actuators, and Microsystems. Boston, MA. Jun. 8-12, 2003. Transducers. 2003:659-62.
Cheng et al., Electro flow focusing in microfluidic devices. Microfluidics Poster, presented at DEAS, "Frontiers in Nanoscience," presented Apr. 10, 2003. 1 page.
Chiba et al., Controlled protein delivery from biodegradable tyrosine-containing poly(anhydride-co-imide) microspheres. Biomaterials. Jul. 1997;18(13):893-901.
Chou, et al. Disposable Microdevices for DNA Analysis and Cell Sorting. Proc. Solid-State Sensor and Actuator Workshop, Hilton Head, SC. Jun. 8-11, 1998; 11-14.
Chu et al., Controllable monodisperse multiple emulsions. Ang Chem Int Ed. 2007:46:8970-4. Published online Sep. 11, 2007.
Chung et al., Human embryonic stem cell lines generated without embryo destruction. Cell Stem Cell. Feb. 7, 2008;2(2):113-7. doi: 10.1016/j.stem.2007.12.013. Epub Jan. 10, 2008.
Cohen et al., Controlled delivery systems for proteins based on poly(lactic/glycolic acid) microspheres. Pharm Res. Jun. 1991;8(6):713-20.
Cole, Gelatin. Encyclopedia of Food Science and Technology. Second Ed. Francis, ed. 2000:1183-8. http://www.gelatin.co.za/gltn1.html [last accessed Feb. 15, 2014].
Collins et al., Microfluidic flow transducer based on the measurement of electrical admittance. Lab Chip. Feb. 2004;4(1):7-10. Epub Nov. 11, 2003. (E-pub version).
Collins et al., Optimization of Shear Driven Droplet Generation in a Microfluidic Device. ASME International Mechanical Engineering Congress and R&D Expo. Washington, D.C. Nov. 15-21, 2003. 4 pages.
Cook et al., Novel sustained release microspheres for pulmonary drug delivery. J Control Release. May 5, 2005;104(1):79-90.
Cortesi et al., Production of lipospheres as carriers for bioactive compounds. Biomaterials. Jun. 2002;23(11):2283-94.
Dendukuri et al. Continuous-flow lithography for high-throughput microparticle synthesis. Nature Mat. May 2006;5:365-69.
Diaz et al., One-month sustained release microspheres of $^{125}$I-bovine calcitonin In vitro-in vivo studies. Journal of Controlled Release. 1999;59:55-62. Month not cited on publication.
Dinsmore et al., Colloiclosomes: Selectively-Permeable Capsules Composed of Colloidal Particles. Supplementary Material (Nov. 2002). Available at http://people.umass.edu/dinsmore/pdf_files/colloidosome_supplementary.pdf . 6 pages.
Dinsmore et al., Colloidosomes: selectively permeable capsules composed of colloidal particles. Science. Nov. 1, 2002;298(5595):1006-9.
Discher et al., Polymersomes: tough vesicles made from diblock copolymers. Science. May 14, 1999;284(5417):1143-6.
Dove et al., Research News. Nature Biotechnology. Dec. 2002;20:1213.
Dowding et al., Oil core-polymer shell microcapsules prepared by internal phase separation from emulsion droplets. I. Characterization and release rates for microcapsules with polystyrene shells. Langmuir. Dec. 21, 2004;20(26):11374-9.
Durant et al., Effects of cross-linking on the morphology of structured latex particles 1. Theoretical considerations. Macromol. 1996;29:8466-72. Month not cited on publication.
Edris et al., Encapsulation of orange oil in a spray dried double emulsion. Nahrung/Food. Apr. 2001;45(2):133-7.
Eow et al., Electrocoalesce-separators for the separation of aqueous drops from a flowing dielectric viscous liquid. Separation and Purification Technology. 2002;29:63-77.
Eow et al., Electrostatic and hydrodynamic separation of aqueous drops in a flowing viscous oil. Chemical Engineering and Processing. 2002;41:649-57.
Eow et al., Electrostatic enhancement of coalescence of water droplets in oil: a review of the technology. Chemical Engineering Journal. 2002;85:357-68.
Eow et al., Motion, deformation and break-up of aqueous drops in oils under high electric field strengths. Chemical Engineering and Processing. 2003;42:259-72.
Eow et al., The behaviour of a liquid-liquid interface and drop-interface coalescence under the influence of an electric field. Colloids and Surfaces A: Physiochem Eng Aspects. 2003;215:101-23.
Estes et al., Electroformation of giant liposomes from spin-coated films of lipids. Colloids Surf B Biointerfaces. May 10, 2005;42(2):115-23.
Fisher et al., Cell Encapsulation on a Microfluidic Platform. The Eighth International Conference on Miniaturised Systems for Chemistry and Life Sciences. MicroTAS. Malmo, Sweden. Sep. 26-30, 2004. 3 pages.
Foster et al., Giant biocompatible and biodegradable PEG-PMCL vesicles and microcapsules by solvent evaporation from double emulsion droplets. J Colloid Interface Sci. Nov. 1, 2010;351(1):140-50. doi: 10.1016/j.jcis.2010.05.020. Epub May 12, 2010.
Fu et al., A microfabricated fluorescence-activated cell sorter. Nat Biotechnol. Nov. 1999;17(11):1109-11.
Fujiwara et al., Calcium carbonate microcapsules encapsulating biomacromolecules. Chemical Engineering Journal. Feb. 13, 2008;137(1):14-22.
Gallarate et al., On the stability of ascorbic acid in emulsified systems for topical and cosmetic use. Int J Pharm. Oct. 25, 1999;188(2):233-41.
Gañán-Calvo et al., Perfectly monodisperse microbubbling by capillary flow focusing. Phys Rev Lett. Dec. 31, 2001;87(27 Pt 1):274501. Epub Dec. 11, 2001. 4 pages.
Ganan-Calvo, Generation of Steady Liquid Microthreads and MicronSized Monodisperse Sprays in Gas Streams. Physical Review Letters. Jan. 12, 1998;80(2):285-8.
Ganan-Calvo, Perfectly monodisperse micro-bubble production by novel mechanical means. Scaling laws. American Physical Society 53rd Annual Meeting of the Division of Fluid Dynamics. Nov. 19-21, 2000. 1 page.
Gartner, et al. The Microfluidic Toolbox—examples for fluidic interfaces and standardization concepts. Proc. SPIE 4982, Microfluidics, BioMEMS, and Medical Microsystems, (Jan. 17, 2003); doi: 10.1117/12.479566.
Ghadessy et al. Directed evolution of polymerase function by compartmentalized self-replication. Proc Natl Acad Sci USA. Apr. 10, 2001; 98(8):4552-7. Epub Mar. 27, 2001.
Gordon et al., Self-assembled polymer membrane capsules inflated by osmotic pressure. JACS. 2004;126:14117-22. Published on web Oct. 12, 2004.
Graham et al., Nanogels and microgels: The new polymeric materials playground. Pure Appl Chem. 1998;70(6):1271-75. Month not cited on publication.
Grasland-Mongrain et al., Droplet coalescence in microfluidic devices. Jan.-Jul. 2003:1-30.
Griffiths et al., Man-made enzymes—from design to in vitro compartmentalisation. Curr Opin Biotechnol. Aug. 2000;11(4):338-53.
Griffiths et al., Miniaturising the Laboratory in Emulsion Droplets. Trends Biotechnol. Sep. 2006;24(9):395-402. Epub Jul. 14, 2006. (E-pub version).
Guery et al., Diffusion through colloidal shells under stress. Phys Rev E Stat Nonlin Soft Matter Phys. Jun. 2009;79(6 Pt 1):060402. Epub Jun. 29, 2009. 4 pages.
Hadd et al., Microchip device for performing enzyme assays. Anal Chem. Sep. 1, 1997;69(17):3407-12.
Hanes et al., Degradation of porous poly(anhydride-co-imide) microspheres and implications for controlled macromolecule delivery. Biomaterials. Jan.-Feb. 1998;19(1-3):163-72.
Hayward et al., Dewetting instability during the formation of polymersomes from block-copolymer-stabilized double emulsions. Langmuir. May 9, 2006;22(10):4457-61.
Hsu et al., Self-assembled shells composed of colloidal particles: fabrication and characterization. Langmuir. 2005;21:2963-70. Published on web Feb. 23, 2005.

(56) References Cited

OTHER PUBLICATIONS

Huang et al., Synthesis of biodegradable and electroactive multiblock polylactide and aniline pentamer copolymer for tissue engineering applications. Biomacromolecules. Mar. 2008;9(3):850-8. doi: 10.1021/bm7011828. Epub Feb. 9, 2008.

Hug et al. Measurement of the number of molecules of a single mRNA species in a complex mRNA preparation. J Theor Biol. Apr. 21, 2003; 221(4):615-24.

Hung et al., Controlled Droplet Fusion in Microfluidic Devices. MicroTAS. Malmo, Sweden. Sep. 26-30, 2004. 3 pages.

Hung et al., Optimization of Droplet Generation by controlling PDMS Surface Hydrophobicity. 2004 ASME International Mechanical Engineering Congress and RD&D Expo. Anaheim, CA. Nov. 13-19, 2004. 2 pages.

Jang et al., Controllable delivery of non-viral DNA from porous scaffolds. J Control Release. Jan. 9, 2003;86(1):157-68.

Jiang et al., Antineoplastic unsaturated fatty acids from Fijian macroalgae. Phytochemistry. Oct. 2008;69(13):2495-500. doi: 10.1016/j.phytochem.2008.07.005. Epub Aug. 29, 2008.

Jo et al, Encapsulation of Bovine Serum Albumin in Temperature-Programmed "Shell-in-Shell" Structures. Macromol Rapid Commun. 2003;24:957-62. Month not cited on publication.

Jogun et al., Rheology and microstructure of dense suspensions of plate-shaped colloidal particles. J. Rheol. Jul./Aug. 1999;43:847-71.

Kanouni et al., Preparation of a stable double emulsion (W1/O/W2): role of the interfacial films on the stability of the system. Adv Colloid Interface Sci. Dec. 2, 2002;99(3):229-54.

Kawakatsu et al., Production of W/O/W emulsions and S/O/W pectin microcapsules by microchannel emulsification. Colloids and Surfaces. Jan. 2001;189:257-64.

Kim et al., Albumin loaded microsphere of amphiphilic poly(ethylene glycol)/poly(α-ester) multiblock copolymer. Eu. J. Pharm. Sci. 2004;23:245-51. Available online Sep. 27, 2004.

Kim et al., Colloidal assembly route for responsive colloidosomes with tunable permeability. Nano Lett. 2007;7:2876-80. Published on web Aug. 3, 2007.

Kim et al., Comparative study on sustained release of human growth hormone from semi-crystalline poly(L-lactic acid) and amorphous poly(D,L-lactic-co-glycolic acid) microspheres: morphological effect on protein release. J Control Release. Jul. 23, 2004;98(1):115-25.

Kim et al., Double-emulsion drops with ultra-thin shells for capsule templates. Lab Chip. Sep. 21, 2011;11(18):3162-6. Epub Aug. 2, 2011.

Kim et al., Fabrication of monodisperse gel shells and functional microgels in microfluidic devices. Angew Chem Int Ed. 2007;46:1819-22. Month not cited on publication.

Kim et al., Monodisperse nonspherical colloid materials with well-defined structures. Presentation. Sep. 16, 2005. 5 pages.

Kim et al., Synthesis of nonspherical colloidal particles with anisotropic properties. JACS. 2006;128:14374-77. Published on web Oct. 18, 2006.

Kim et al., Uniform nonspherical colloidal particles engineered by geometrically tunable gradient of crosslink density. 80th ACS Colloid Surf. Sci. Symp. Jun. 20, 2006. 23 pages.

Kim et al., Uniform nonspherical colloidal particles with tunable shapes. Adv. Mater. 2007;19:2005-09. Month not cited on publication.

Koo et al., A snowman-like array of colloidal dimers for antireflecting surfaces. Adv Mater. Feb. 3, 2004;16(3):274-77.

Kumar et al., Biodegradable block copolymers. Adv Drug Deliv Rev. Dec. 3, 2001;53(1):23-44.

Lamprecht et al., pH-sensitive microsphere delivery increases oral bioavailability of calcitonin. J Control Release. Jul. 23, 2004;98(1):1-9.

Landfester et al. Preparation of Polymer Particles in Nonaqueous Direct and Inverse Miniemulsions. Macromolecules. Mar. 11, 2000;33(7):2370-2376.

Landfester et al., Formulation and Stability Mechanisms of Polymerizable Miniemulsions. Macromolecules. 1999;32:5222-5228. Published on web Jul. 22, 1999.

Leary et al., Application of Advanced Cytometric and Molecular Technologies to Minimal Residual Disease Monitoring. In: In-Vitro Diagnostic Instrumentation. Gerald E. Cohn, Ed. Proceedings of SPIE. 2000;3913:36-44. Month not cited on publication.

Lee et al., Double emulsion-templated nanoparticle colloidosomes with selective permeability. Adv Mater. 2008;20:3498-503. Month not cited on publication.

Lee et al., Effective Formation of Silicone-in-Fluorocarbon-in-Water Double Emulsions: Studies on Droplet Morphology and Stability. Journal of Dispersion Science and Technology. 2002;23(4):491-7. Month not cited on publication.

Lee et al., Nonspherical colloidosomes with multiple compartments from double emulsions. Small. Sep. 2009;5(17):1932-5.

Lee et al., Preparation of Silica Particles Encapsulating Retinol Using O/W/O Multiple Emulsions. J Colloid Interface Sci. Aug. 1, 2001;240(1):83-89.

Lemoff et al., An AC Magnetohydrodynamic Microfluidic Switch for Micro Total Analysis Systems. Biomedical Microdevices. 2003;5(1):55-60. Month not cited on publication.

Letchford et al., A review of the formation and classification of amphiphilic block copolymer nanoparticulate structures: micelles, nanospheres, nanocapsules and polymersomes. Eur J Pharm Biopharm. Mar. 2007;65(3):259-69. Epub Nov. 23, 2006.

Li et al., PEGylated PLGA nanoparticles as protein carriers: synthesis, preparation and biodistribution in rats. Journal of Controlled Release. 2001;71:203-211. Month not cited on publication.

Lin et al., Ultrathin cross-linked nanoparticle membranes. JACS. 2003;125:12690-91. Published on web Sep. 27, 2003.

Link et al., Geometrically mediated breakup of drops in microfluidic devices. Phys Rev Lett. Feb. 6, 2004;92(5):054503. Epub Feb. 6, 2004. 4 pages.

Lopez-Herrera et al., Coaxial jets generated from electrified Taylor cones. Scaling laws. Aerosol Science. 2003:34:535-52. Month not cited on publication.

Lopez-Herrera et al., One-Dimensional Simulation of the Breakup of Capillary Jets of Conducting Liquids. Application to E.H.D. Spraying. J Aerosol Sci. 1999;30(7):895-912. Month not cited on publication.

Lopez-Herrera et al., The electrospraying of viscous and non-viscous semi-insulating liquids. Scalilng laws. Bulletin of the American Physical Society Nov. 1995;40:2041. Abstract JB 7.

Lorenceau et al., Generation of polymerosomes from double-emulsions. Langmuir. Sep. 27, 2005;21(20):9183-6.

Loscertales et al., Micro/nano encapsulation via electrified coaxial liquid jets. Science. Mar. 1, 2002;295(5560):1695-8.

Lundstrom et al., Breakthrough in cancer therapy: Encapsulation of drugs and viruses. www.currentdrugdiscovery.com. Nov. 2002:19-23.

Ly et al., Effect of Alcohols on Lipid Bilayer Rigidity, Stability, and Area/Molecule (in collaboration with David Block and Roland Faller). Available at http://www.chms.ucdavis.edu/research/web/longo/micromanipulation.html. Last accessed Oct. 10, 2012.

Magdassi et al., Formation of water/oil/water multiple emulsions with solid oil phase. J Coll Interface Sci. Dec. 1987;120(2):537-9.

Manoharan et al., Dense packing and symmetry in small clusters of microspheres. Science. Jul. 25, 2003;301:483-87.

Marques et al., Porous Flow within Concentric Cylinders. Bulletin of the American Physical Society Division of Fluid Dynamics. Nov. 1996;41:1768. Available at http://flux.aps.org/meetings/YR9596/BAPSDFD96/abs/G1070001.html (downloaded Oct. 11, 2006) 2 pages.

Melin et al., A liquid-triggered liquid microvalve for on-chip flow control. Sensors and Actuators B. May 2004;100(3):463-68.

Mock et al., Synthesis of anisotropic nanoparticles by seeded emulsion polymerization. Langmuir. Apr. 25, 2006;22(9):4037-43. Published on web Mar. 31, 2006.

Naka et al., Control of crystal nucleation and growth of calcium carbonate bysynthetic substrates. Chem Mater 2001;13:3245-59.

Nakano et al., Single-molecule PCR using water-in-oil emulsion. J Biotechnol. Apr. 24, 2003;102(2):117-24.

Nie et al., Polymer particles with various shapes and morphologies produced in continuous microfluidic reactors. J Am Chem Soc. Jun. 8, 2005;127(22):8058-63.

(56) References Cited

OTHER PUBLICATIONS

Nihant et al., Polylactide microparticles prepared by double emulsion/evaporation technique. I. Effect of primary emulsion stability. Pharm Res. Oct. 1994;11(10):1479-84.
Nikolaides et al., Two Dimensional Crystallisation on Curved Surfaces. MRS Fall 2000 Meeting. Boston, MA. Nov. 27, 2000. Abstract #41061.
Nisisako et al., Controlled formulation of monodisperse double emulsions in a multiple-phase microfluidic system. Soft Matter. 2005;1:23-7. Month not cited on publication.
Nisisako, Microstructured Devices for Preparing Controlled Multiple Emulsions. Chem Eng Technol. 2008;31:1091-8. Month not cited on publication.
Nof et al., Drug-releasing scaffolds fabricated from drug-loaded microspheres. J Biomed Mater Res. Feb. 2002;59(2):349-56.
Oh et al., Distribution of macropores in silica particles prepared by using multiple emulsions. J Colloid Interface Sci. Oct. 1, 2002;254(1):79-86.
Okubo et al., Micron-sized, monodisperse, snowman/confetti-shaped polymer particles by seeded dispersion polymerization. Colloid Polym. Sci. 2005;283:1041-45. Published online Apr. 2, 2005.
Okushima et al., Controlled production of monodisperse double emulsions by two-step droplet breakup in microfluidic devices. Langmuir. Nov. 9, 2004;20(23):9905-8.
Ouellette, A New Wave of Microfluidic Device. The Industrial Physicist. Aug./Sep. 2003:14-7.
Pannacci et al., Equilibrium and nonequilibrium states in microfluidic double emulsions. Phys Rev Lett. Oct. 17, 2008;101(16):164502. Epub Oct. 14, 2008. 4 pages.
Perez et al., Poly(lactic acid)-poly(ethylene glycol) nanoparticles as new carriers for the delivery of plasmid DNA. Journal of Controlled Release. 2001;75:211-224. Month not cited on publication.
Piemi et al., Transdermal delivery of glucose through hairless rat skin in vitro: effect of multiple and simple emulsions. Int J Pharm. 1998; 171:207-15. Month not cited on publication.
Priest et al., Generation of monodisperse gel emulsions in a microfluidic device. App Phys Lett. 2006;88:024106. 3 pages. Published online Jan. 12, 2006.
Quevedo et al., Interfacial polymerization within a simplified microfluidic device: capturing capsules. J Am Chem Soc. Aug. 3, 2005;127(30):10498-9.
Raghuraman et al., Emulsion liquid membranes for wastewater treatment: equilibrium models for some typical metal-extractant systems. Environ Sci Technol. Jun. 1, 1994;28(6):1090-8.
Reculusa et al., Synthesis of daisy-shaped and multipod-like silica/polystyrene nanocomposites. Nano Lett. 2004;4:1677-82. Published on web Jul. 14, 2004.
Roh et al., Biphasic janus particles with nanoscale anisotropy. Nature Med. Oct. 2005;4:759-63.
Rojas et al., Induction of instability in water-in-oil-in-water double emulsions by freeze-thaw cycling. Langmuir. Jun. 19, 2007;23(13):6911-7. Epub May 24, 2007.
Rojas et al., Temperature-induced protein release from water-in-oil-in-water double emulsions. Langmuir. Jul. 15, 2008;24(14):7154-60. Epub Jun. 11, 2008.
Schubert et al., Designer Capsules. Nat Med. Dec. 2002;8:1362.
Seo et al., Microfluidic consecutive flow-focusing droplet generators. Soft Matter. 2007;3:986-92. Published online May 29, 2007.
Sheu et al., Phase separation in polystyrene latex interpenetrating polymer networks. J. Poly. Sci. A. Poly. Chem. 1990;28:629-51. Month not cited on publication.
Shum et al., Abstract: P9.00001 : Microfluidic Fabrication of Bio-compatible Vesicles by Self-assembly in Double Emulsions. 2008 APS March Meeting. Mar. 10-14, 2008. New Orleans, LA. Submitted Nov. 26, 2007. Presented Mar. 12, 2008. Abstract Only.
Shum et al., Double emulsion templated monodisperse phospholipid vesicles. Langmuir. Aug. 5, 2008;24(15):7651-3. Epub Jul. 10, 2008.
Shum et al., Microfluidic Fabrication of Bio-compatible Vesicles Using Double Emulsion Drops as Templates. APS March Meeting 2008. Presented Mar. 12, 2008. 16 pages.
Shum et al., Microfluidic fabrication of monodisperse biocompatible and biodegradable polymersomes with controlled permeability. J Am Chem Soc. Jul. 23, 2008;130(29):9543-9. Epub Jun. 25, 2008.
Shum et al., Template-Directed Assembly of Amphiphiles in Controlled Emulsions by Microfluidics. $82^{nd}$ ACS Colloid & Surface Science Symposium. Jun. 15-18, 2008. Presented Jun. 16, 2008. Abstract Only.
Silva-Cunha et al., W/O/W multiple emulsions of insulin containing a protease inhibitor and an absorption enhancer: biological activity after oral administration to normal and diabetic rats. Int J Pharmaceutics. 1998;169:33-44. Month not cited on publication.
Sim et al. The shape of a step structure as a design aspect to control droplet generation in microfluidics. J Micromech Microeng. Feb. 9, 2010;20:035010. 6 pages.
Skjeltorp et al., Preparation of nonspherical, monodisperse polymer particles and their self-organization. J. Colloid Interf. Sci. Oct. 1986;113:577-82.
Sohn et al., Capacitance cytometry: measuring biological cells one by one. Proc Natl Acad Sci U S A. Sep. 26, 2000;97(20):10687-90.
Song et al., A microfluidic system for controlling reaction networks in time. Angew Chem Int Ed Engl. Feb. 17, 2003;42(7):768-72.
Sun et al., Microfluidic melt emulsification for encapsulation and release of actives. ACS Appl Mater Interfaces. Dec. 2010;2(12):3411-6. Epub Nov. 17, 2010.
Takeuchi et al., An Axisymmetric Flow-Focusing Microfluidic Device. Adv Mater. Apr. 18, 2005;17:1067-72.
Tan et al., Controlled Fission of Droplet Emulsions in Bifurcating Microfluidic Channel. Boston. Transducers. 2003. 4 pages. Month not cited on publication.
Tan et al., Design of microfluidic channel geometries for the control of droplet volume, chemical concentration, and sorting. Lab Chip. Aug. 2004;4(4):292-8. Epub Jul. 1, 2004.
Tan et al., Microfluidic Liposome Generation from Monodisperse Droplet Emulsion-Towards the Realization of Artificial Cells. Summer Bioengineering Conference Jun. 25-29, 2003. Key Biscayne, Florida. 2 pages.
Tan, Monodisperse Droplet Emulsions in Co-Flow Microfluidic Channels. Lake Tahoe. Micro TAS. 2003. 2 pages.
Tawfik et al., Man-made cell-like compartments for molecular evolution. Nat Biotechnol. Jul. 1998;16(7):652-6.
Terray et al., Fabrication of linear colloidal structures for microfluidic applications. App Phys Lett. Aug. 26, 2002;81:1555-7.
Terray et al., Microfluidic control using colloidal devices. Science. Jun. 7, 2002;296(5574):1841-4.
Thomas et al., Using a liquid emulsion membrane system for the encapsulation of organic and inorganic substrates within inorganic microcapsules. Chem Commun (Camb). May 21, 2002;(10):1072-3.
Thorsen et al., Dynamic pattern formation in a vesicle-generating microfluidic device. Phys Rev Lett. Apr. 30, 2001;86(18):4163-6.
Ulrich, Chapter 1. General Introduction. Chem. Tech. Carbodiimides. 2007:1-7. Month not cited on publication.
Umbanhowar et al., Monodisperse Emulsion Generation via Drop Break Off in a Coflowing Stream. Langmuir. 2000;16:347-51. Published on web Oct. 14, 1999.
Utada et al., Monodisperse double emulsions generated from a microcapillary device. Science. Apr. 22, 2005;308(5721):537-41.
Van Blaaderen, Colloidal molecules and beyond. Science. Jul. 25, 2003;301:470-71.
Van Blaaderen, Colloids get complex. Nature. Feb. 2006;439:545-46.
Van Dijkhuizen-Radersma, Biodegradable Multiblock Copolymers for Drug Delivery Applications. Thesis; University of Twente, Enschede., The Netherlands. 2004:1-30.
Velev et al., Assembly of latex particles by using emulsion droplets. 3. Reverse (water in oil) system. Langmuir. 1997;13:1856-59. Month not cited on publication.
Velev et al., Assembly of latex particles using emulsion droplets as templates. 1. Microstructured hollow spheres. Langmuir. 1996;12:2374-84. Month not cited on publication.

(56) References Cited

OTHER PUBLICATIONS

Velev et al., Assembly of latex particles using emulsion droplets as templates. 2. Ball-like and composite aggregates. Langmuir. 1996;12:2385-91. Month not cited on publication.
Wang et al., Regenerative superhydrophobic coating from microcapsules. J Mater Chem. 2010;20(16):3211-5.
Wang, Fabrication of a Toroidal Structure of Polymer Particle by Phase Separation with One Dimensional Axial Flow in Microchannel. 82$^{nd}$ ACS Colloid & Surface Science Symposium. Jun. 15-18, 2008. Presented Jun. 17, 2008. Abstract Only.
Weitz, Nonspherical engineering of polymer colloids. Web Page. Exp. Soft Condensed Matter Group. Last updated Nov. 10, 2005. 1 page.
Weitz, Packing in the spheres. Science. Feb. 13, 2004;303:968-969.
Wolff et al., Integrating advanced functionality in a microfabricated high-throughput fluorescent-activated cell sorter. Lab Chip. Feb. 2003;3(1):22-7. Epub Jan. 23, 2003.
Xu et al., Generation of Monodisperse Particles by Using Microfluidics: Control over Size, Shape and Composition. Angew Chem Int Ed. 2004;43:2-5. Month not cited on publication.
Yamaguchi et al., Insulin-loaded biodegradable PLGA microcapsules: initial burst release controlled by hydrophilic additives. J Control Release. Jun. 17, 2002;81(3):235-49.
Yin et al., Template-assisted self-assembly: a practical route to complex aggregates of monodispersed colloids with well-defined sizes, shapes, and structures. JACS. 2001;123:8718-29. Published on web Aug. 15, 2001.
Yoon et al., Abstract: X8.00007 : Fabrication of phospholipid vesicles from double emulsions in microfluidics. 2008 APS March Meeting. Mar. 10-14, 2008. New Orleans, LA. Submitted Nov. 26, 2007. Presented Mar. 14, 2008. Abstract Only.
Yoon et al., Fabrication of giant phospholipid vesicles from double emulsions in microfluidics. APS March Meeting 2008. Presented Mar. 14, 2008. 11 pages.
Zhang et al., A Simple Statistical Parameter for Use in Evaluation and Validation of High Throughput Screening Assays. J Biomol Screen. 1999;4(2):67-73. Month not cited on publication.
Zhao et al., Enhanced encapsulation of actives in self-sealing microcapsules by precipitation in capsule shells. Langmuir. Dec. 6, 2011;27(23):13988-91. Epub Oct. 26, 2011.
Zhao, Preparation of hemoglobin-loaded nano-sized particles with porous structure as oxygen carriers. Biomaterials. 2007;28:1414-1422. Available online Nov. 28, 2006.
Zheng et al., A microfluidic approach for screening submicroliter volumes against multiple reagents by using preformed arrays of nanoliter plugs in a three-phase liquid/liquid/gas flow. Angew Chem Int Ed Engl. Apr. 22, 2005;44(17):2520-3.
Zhu et al., Magnetochromatic microcapsule arrays for displays. Adv Funct Mater. Jun. 2011;21; 2043-48.
Zieringer et al., Microcapsules for Enhanced Cargo Retention and Diversity. Small. Jun. 24, 2005;11(24):2903-9. doi: 10.1002/smll.201403175. Epub Feb. 18, 2015.
Zimmermann et al., Microscale production of hybridomas by hypo-osmolar electrofusion. Hum Antibodies Hybridomas. Jan. 1992;3(1):14-8.
Japanese Office Action dated Mar. 26, 2018 for Application No. 2016-159526.
Office Action dated Jun. 8, 2018 for U.S. Appl. No. 15/519,288.
U.S. Appl. No. 13/967,018, filed Aug. 14, 2013, Weitz et al.
JP 2016-159526, Mar. 26, 2018, Office Action.
U.S. Appl. No. 14/681,560, filed Apr. 8, 2015, Weitz et al.
U.S. Appl. No. 13/967,018, filed Aug. 14, 2013, Shum et al.
U.S. Appl. No. 15/785,135, filed Oct. 16, 2017, Weitz et al.
U.S. Appl. No. 13/586,628, filed Aug. 15, 2012, Weitz et al.
U.S. Appl. No. 15/519,288, filed Apr. 14, 2017, Carroll et al.
U.S. Appl. No. 14/945,475, filed Nov. 19, 2015, Wesner et al.
U.S. Appl. No. 14/945,479, filed Nov. 19, 2015, Wesner et al.
U.S. Appl. No. 14/945,484, filed Nov. 19, 2015, Wesner et al.
EP 06737002.3, dated Apr. 3, 2008, Office Action.
EP 06737002.3, dated Mar. 11, 2009, Office Action.
EP 06737002.3, dated Sep. 2, 2010, Office Action.
EP 10165813.6, dated Oct. 7, 2010, Office Action.
PCT/US2006/007772, dated Jun. 28, 2006, Invitation to Pay Additional Fees.
PCT/US2006/007772, dated Sep. 1, 2006, International Search Report and Written Opinion.
PCT/US2006/007772, dated Sep. 20, 2007, International Preliminary Report on Patentability.
CN 200880017845.4, dated Sep. 24, 2012, Office Action.
PCT/US2008/004097, dated Aug. 10, 2009, International Search Report and Written Opinion.
EP 09758762.0, dated Aug. 13, 2015, European Office Action.
EP 09758762.0, dated Sep. 29, 2016, European Office Communication.
KR 10-2011-7000094, dated Feb. 27, 2013, Office Action.
PCT/US2009/003389, dated Oct. 21, 2009, International Search Report and Written Opinion.
PCT/US2009/003389, dated Dec. 16, 2010, International Preliminary Report on Patentability.
PCT/US2001/46181, dated Mar. 12, 2003, International Search Report and Written Opinion.
PCT/US2001/46181, dated Apr. 5, 2004, International Preliminary Report on Patentability.
PCT/US2007/084561, dated Apr. 29, 2008, International Search Report and Written Opinion.
PCT/US2010/000763, dated Jul. 20, 2010, International Search Report and Written Opinion.
CN 201080039018.2, dated Sep. 27, 2013, Office Action.
CN 201080039018.2, dated May 13, 2014, Office Action.
CN 201080039018.2, dated Sep. 17, 2014, Office Action.
EP 10814398.3, dated Oct. 29, 2015, Extended European Search Report.
JP 2012-527993, dated Aug. 5, 2014, Office Action.
PCT/US2010/047458, dated May 24, 2011, International Search Report and Written Opinion.
PCT/US2010/047458, dated Mar. 15, 2012, International Preliminary Report on Patentability.
CN 201080039023.3, dated Dec. 23, 2013, Office Action.
CN 201080039023.3, dated Oct. 24, 2014, Office Action.
CN 201080039023.3, dated Jul. 10, 2015, Office Action.
EP 10814401.5, dated Nov. 3, 2015, Extended European Search Report.
JP 2012-527995, dated Jul. 22, 2014, Office Action.
JP 2012-527995, dated Jun. 11, 2015, Office Action.
PCT/US2010/047467, dated May 26, 2011, International Search Report and Written Opinion.
PCT/US2010/047467, dated Mar. 15, 2012, International Preliminary Report on Patentability.
CN 201180014139.6, dated May 13, 2014, Office Action.
PCT/US2011/028754, dated Nov. 30, 2011, Invitation to Pay Additional Fees.
PCT/US2011/028754, dated Apr. 3, 2012, International Search Report and Written Opinion.
PCT/US2011/028754, dated Sep. 27, 2012, International Preliminary Report on Patentability.
CN 201280024857.6, dated Jan. 16, 2015, Office Action.
CN 201280024857.6, dated Sep. 14, 2015, Chinese Office Action and English Translation Thereof.
EP 12725967.9, dated Mar. 24, 2015, Office Action.
EP 12725967.9, dated Nov. 19, 2015, European Office Action.
PCT/US2012/038957, dated Sep. 5, 2012, Invitation to Pay Additional Fees.
PCT/US2012/038957, dated Dec. 13, 2012, International Search Report and Written Opinion.
PCT/US2012/038957, dated Dec. 5, 2013, International Preliminary Report on Patentability.
CN 201280039927.5, dated Mar. 24, 2015, Office Action.
CN 201280039927.5, dated Dec. 1, 2015, Chinese Office Action.
CN 201280039927.5, dated May 17, 2016, Chinese Office Action.
EP 12736019.6, dated Feb. 12, 2015, Office Action.
EP 12736019.6, dated Oct. 7, 2015, European Office Action.
EP 12736019.6, dated Jul. 6, 2016, European Office Action.

(56) References Cited

OTHER PUBLICATIONS

EP 16184915.3, dated Jan. 31, 2017, Extended European Search Report.
JP 2014-519281, dated May 24, 2016, Japanese Office Action.
JP 2016-15952, dated Aug. 8, 2017, Japanese Office Action.
PCT/US2012/045481, dated Feb. 6, 2013, International Search Report and Written Opinion.
PCT/US2012/045481, dated Jan. 16, 2014, International Preliminary Report on Patentability.
CN 201280041041.4, dated Feb. 4, 2015, Office Action.
CN 201280041041.4, dated Aug. 26, 2015, Chinese Office Action.
CN 201280041041.4, dated Mar. 7, 2016, Chinese Office Action.
CN 201280041041.4, dated Nov. 15, 2016, Chinese Office Action.
EP 12751233.3, dated Jul. 28, 2017, European Office Action.
JP 2014-528430, dated Jun. 21, 2016, Japanese Office Action.
PCT/US2012/050916, dated May 31, 2013, Invitation to Pay Additional Fees.
PCT/US2012/050916, dated Nov. 6, 2013, International Search Report and Written Opinion.
PCT/US2012/050916, dated Mar. 13, 2014, International Preliminary Report on Patentability.
PCT/US2015/061481, dated Feb. 3, 2016, International Search Report and Written Opinion.
PCT/US2015/061481, dated Jun. 8, 2017, International Preliminary Report on Patentability.
PCT/US2015/064192, dated Feb. 9, 2016, International Search Report and Written Opinion.
PCT/US2015/064192, dated Jun. 8, 2017, International Preliminary Report on Patentability.
PCT/US2015/055315, dated Feb. 10, 2016, International Search Report and Written Opinion.
PCT/US2015/055315, dated Apr. 27, 2017, International Preliminary Report on Patentability.
PCT/US2015/061511, dated Feb. 5, 2016, International Search Report and Written Opinion.
PCT/US2015/061511, dated Jun. 8, 2017, International Preliminary Report on Patentability.
Office Communication for U.S. Appl. No. 11/885,306 dated May 31, 2011.
Office Communication for U.S. Appl. No. 11/885,306 dated Oct. 20, 2011.
Office Communication for U.S. Appl. No. 11/885,306 dated May 8, 2012.
Office Communication for U.S. Appl. No. 11/885,306 dated Oct. 9, 2014.
Office Communication for U.S. Appl. No. 12/058,628 dated Feb. 25, 2009.
Office Communication for U.S. Appl. No. 12/058,628 dated Sep. 1, 2009.
Office Communication for U.S. Appl. No. 12/993,205 dated Jul. 11, 2012.
Office Communication for U.S. Appl. No. 12/993,205 dated Feb. 14, 2013.
Office Action for U.S. Appl. No. 13/397,018 dated Feb. 24, 2015.
Office Action for U.S. Appl. No. 13/967,018 dated Jun. 11, 2015.
Office Action for U.S. Appl. No. 13/967,018 dated Feb. 9, 2016.
Office Action for U.S. Appl. No. 13/967,018 dated Jun. 30, 2016.
Office Action for U.S. Appl. No. 13/967,018 dated Dec. 23, 2016.
Office Action for U.S. Appl. No. 13/967,018 dated May 16, 2017.
Office Communication for U.S. Appl. No. 10/433,753 dated Sep. 22, 2006.
Office Communication for U.S. Appl. No. 10/433,753 dated Oct. 3, 2008.
Office Communication for U.S. Appl. No. 10/433,753 dated May 28, 2009.
Office Communication for U.S. Appl. No. 12/019,454 dated Dec. 24, 2009.
Office Action for U.S. Appl. No. 13/390,584 dated Nov. 20, 2014.
Office Action for U.S. Appl. No. 13/388,596 dated Nov. 23, 2015.
Office Communication for U.S. Appl. No. 13/049,957 dated Feb. 1, 2013.
Office Communication for U.S. Appl. No. 13/049,957 dated Sep. 17, 2013.
Office Communication for U.S. Appl. No. 13/049,957 dated Feb. 21, 2014.
Office Action for U.S. Appl. No. 13/049,957 dated Jan. 5, 2016.
Ex Parte Quayle Action for U.S. Appl. No. 13/477,636 mailed Aug. 3, 2015.
Office Action for U.S. Appl. No. 14/130,531 dated Oct. 20, 2015.
Office Action for U.S. Appl. No. 14/130,531 dated Jun. 9, 2016.
Office Communication for U.S. Appl. No. 13/586,628 dated Nov. 29, 2013.
Final Office Action for U.S. Appl. No. 13/586,628 dated Jun. 19, 2014.
Advisory Action for U.S. Appl. No. 13/586,628 dated Sep. 25, 2014.
Advisory Action for U.S. Appl. No. 13/586,628 dated Nov. 10, 2014.
Office Action for U.S. Appl. No. 13/586,628 dated Dec. 18, 2015.
Office Action for U.S. Appl. No. 13/586,628 dated Jun. 30, 2016.
Office Action for U.S. Appl. No. 13/586,628 dated Mar. 22, 2017.
Office Action for U.S. Appl. No. 13/586,628 dated Jan. 2, 2018.
CH 563807 is generally directed to a manufacturing process of pellets and an apparatus for implementing this process.
The relevance of CN1695809A is understood by what is believed to be its corresponding English-language counterpart, EP 1 595 597.
The relevance of CN1772363A is understood by its English-language abstract and figures.
The relevance of CN1933898A is understood by what is believed to be its corresponding English-language counterpart, U.S. 2007-0196397.
The relevance of CN101721964A is understood by its English-language abstract and figures.
The relevance of CN101856603A is understood by its English-language abstract and figures.
The relevance of CN102014871A is understood by the machine translation provided and by its English-language counterpart, US 2009-0012187. The undersigned makes no representation as to the accuracy of the translation, but is not aware of any inaccuracies.
The relevance of DE 43 08 839 A1 is understood by its English-language abstract and figures.
The relevance of DE 199 61 257 A1 is understood by its English-language abstract and figures.
The relevance of DE 100 15 109 A1 is understood by its English-language abstract and figures.
The relevance of DE 100 41 823 A1 is understood by its English-language abstract and figures.
The relevance of DE 102005048259.00 A1 is understood by its English-language abstract and figures.
The relevance of EP 0 718 038 B1 is understood by its English-language abstract and figures.
The relevance of FR 2696658 A1 is understood by its English-language abstract and figures.
The relevance of JP S51-08875 B2 is understood by what is believed to be its English-language counterpart, US 2010-009088.
The relevance of JP S54-107880 can be determined by the full translation provided. The undersigned makes no representation as to the accuracy of the translation, but is not aware of any inaccuracies.
The relevance of JP S56-130219 A is understood by its English-language abstract and figures.
The relevance of JP S60-04055 A is understood by its English-language abstract and figures.
The relevance of JP S61-057236 A is understood by its English-language abstract and figures.
The relevance of JP H09-221417 A is understood by its English-language abstract and figures.
The relevance of JP H10-219222 A is understood by its English-language abstract and figures.
The relevance of JP H11-509768 A is understood by what is believed to be its English-language counterpart, U.S. Pat. No. 5,795,590.
The relevance of JP 2001-234188 A is understood by its English-language abstract and figures.

(56) References Cited

OTHER PUBLICATIONS

The relevance of JP 2001-354551 A is understood by its English-language abstract and figures.
The relevance of JP 2004-161739 A is understood by its English-language abstract and figures.
The relevance of JP 2004-202476 A is understood by its English language abstract and figures.
The relevance of JP 2004-351417 A is understood by its English language abstract and by what is believed to be its English-language counterpart, U.S. 2004-0068019.
The relevance of JP 2005-144356 A is understood by its English language abstract and figures.
The relevance of JP 2005-152740 A is understood by its English language abstract and figures.
The relevance of JP 2005-152773 A is understood by its English language abstract and figures.
The relevance of JP 2006-023322 A is understood by its English-language abstract and figures.
The relevance of JP 2006-507921 A is understood by what is believed to be its English-language counterpart, WO 2004/002627.
The relevance of JP 2006-257415 A is understood by its English-language abstract and figures.
The relevance of JP 2006-523142 A is understood by what is believed to be its English-language counterpart, WO 2004/091763.
The relevance of JP 2008-238146 A is understood by its English-language abstract and figures.
The relevance of JP 2009-241044 A is understood by its English-language abstract and figures.
The relevance of JP 2011-092854 A is understood by its English-language abstract and figures.
The relevance of JP 2011-115755 A is understood by its English-language abstract and figures.
The relevance of WO 01/72431 A1 is understood by its English-language abstract and figures.
The relevance of WO 03/068381 A1 is understood by its English-language abstract and figures.
The relevance of WO 2005/089921 is understood by its English language abstract and figures, and by what is believed to be and its corresponding English-language counterpart, U.S. Pat. No. 8,741,192.
The relevance of WO 2006/002641 A1 is understood by its English language abstract and figures.
The relevance of WO 2006/050638 is understood by the enclosed partial English-language translation. The undersigned makes no representation as to the accuracy of the translation, but is not aware of any inaccuracies.

\* cited by examiner

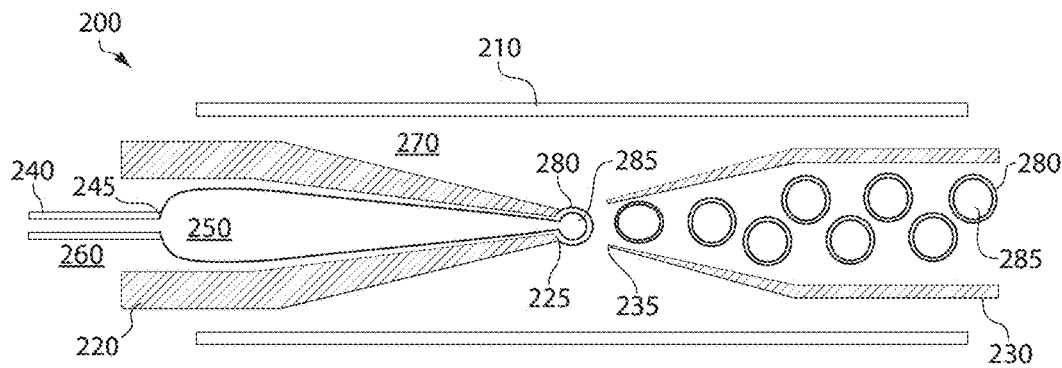
Fig. 2
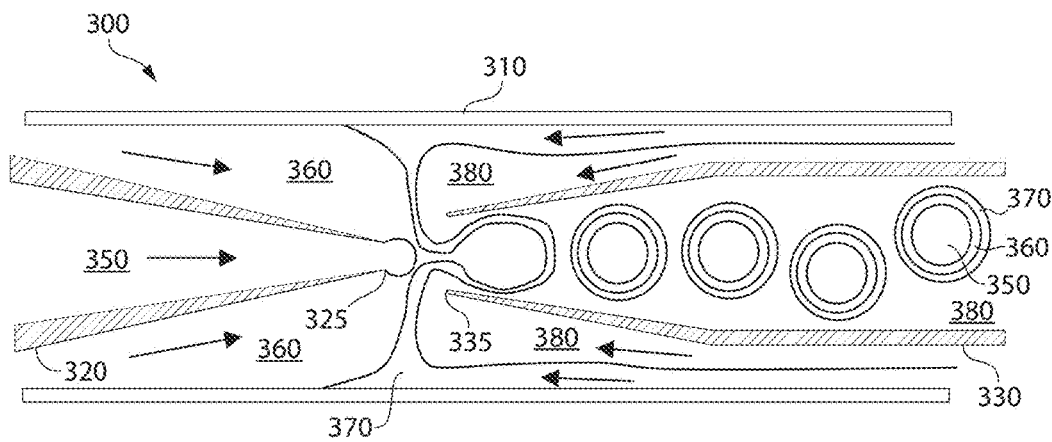
Fig. 3
Fig. 4

MULTIPLE EMULSIONS AND TECHNIQUES FOR THE FORMATION OF MULTIPLE EMULSIONS

RELATED APPLICATIONS

This application is a divisional application of U.S. application Ser. No. 14/130,531, with a § 371 date of Apr. 17, 2014, which is a National Stage Application of International Application No. PCT/US2012/045481, which claims the benefit of U.S. Provisional Patent Application Ser. No. 61/505,001, filed Jul. 6, 2011, and of U.S. Provisional Patent Application Ser. No. 61/504,990, filed Jul. 6, 2011, each of which is incorporated herein by reference in its entirety.

TECHNICAL FIELD

Multiple emulsions and techniques for the formation of multiple emulsions are generally described.

BACKGROUND

An emulsion is a fluidic state which exists when a first fluid is dispersed in a second fluid that is typically immiscible or substantially immiscible with the first fluid. Examples of common emulsions are oil in water and water in oil emulsions. Multiple emulsions are emulsions that are formed with more than two fluids, or two or more fluids arranged in a more complex manner than a typical two-fluid emulsion. For example, a multiple emulsion may be oil-in-water-in-oil, or water-in-oil-in-water. Multiple emulsions are of particular interest because of current and potential applications in fields such as pharmaceutical delivery, paints and coatings, food and beverage, and health and beauty aids.

SUMMARY

Systems, articles, and methods related to multiple emulsions are provided. The subject matter of the present invention involves, in some cases, interrelated products, alternative solutions to a particular problem, and/or a plurality of different uses of one or more systems and/or articles.

In one aspect, a method of forming droplets is described. In some embodiments, the method comprises flowing a first fluid in a first conduit; expelling the first fluid from an exit opening of the first conduit into a second fluid in a second conduit such that droplets of the first fluid are not formed at the exit opening of the first conduit; and expelling the first fluid and the second fluid from an exit opening of the second conduit into a third fluid to form a multiple emulsion droplets comprising the second fluid surrounding droplets of the first fluid.

The method comprises, in some embodiments, expelling a first fluid from an exit opening of a first conduit into a second fluid in a second conduit; and expelling the first fluid and the second fluid from an exit opening of the second conduit into a third fluid to form a multiple emulsion droplets comprising a shell of the second fluid surrounding droplets of the first fluid. In some embodiments, the shell has an average thickness of less than about 0.05 times the average cross-sectional diameter of the multiple emulsion and/or the shell has an average thickness of less than about 1 micrometer.

In some embodiments, the method comprises expelling a first fluid from an exit opening of a first conduit into a second fluid being transported through a second conduit via a first entrance opening of the second conduit; and flowing a third fluid and a fourth fluid through a second entrance opening of the second conduit to form multiple emulsion droplets comprising a shell of the third fluid surrounding the second fluid and a shell of the second fluid surrounding the first fluid.

In one aspect, a device is provided. In some embodiments, the device comprises a first conduit, an outer injection conduit having an exit opening contained within the first conduit, an inner injection conduit having an exit opening contained within the outer injection conduit, and a collection conduit having an entrance opening contained within the first conduit but not contained within the outer injection conduit. In some embodiments, the outer injection conduit is at least partially coated with a hydrophobic coating, and the other tubes are not coated with the hydrophobic coating.

In one aspect, an article is provided. In some embodiments, the article comprises a microfluidic device comprising a double emulsion droplet production region, wherein the double emulsion droplet production region consists essentially of a first conduit, an outer injection conduit having an exit opening contained within the first conduit, an inner injection conduit having an exit opening contained within the outer injection conduit, and a collection conduit having an entrance opening contained within the first conduit but not contained within the outer injection conduit.

The article comprises, in some embodiments, a particle having a shell comprising a polymer, the particle having an average diameter of less than about 1 mm, the shell at least partially containing a fluid. In some embodiments, the shell has an average thickness of less than about 0.05 times the average cross-sectional diameter of the particle and/or the shell has an average thickness of less than about 1 micrometer; and substantially all of the polymer within the shell has a glass transition temperature of at least about 85° C. and/or substantially all of the polymer within the shell is at least partially soluble in octane.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures. For purposes of clarity, not every component is labeled in every figure, nor is every component of each embodiment of the invention shown where illustration is not necessary to allow those of ordinary skill in the art to understand the invention. In the figures:

FIGS. 2-4 show, according to some embodiments, exemplary cross-sectional schematic diagrams of systems that can be used to form multiple emulsions;

DETAILED DESCRIPTION

Figure 1A:
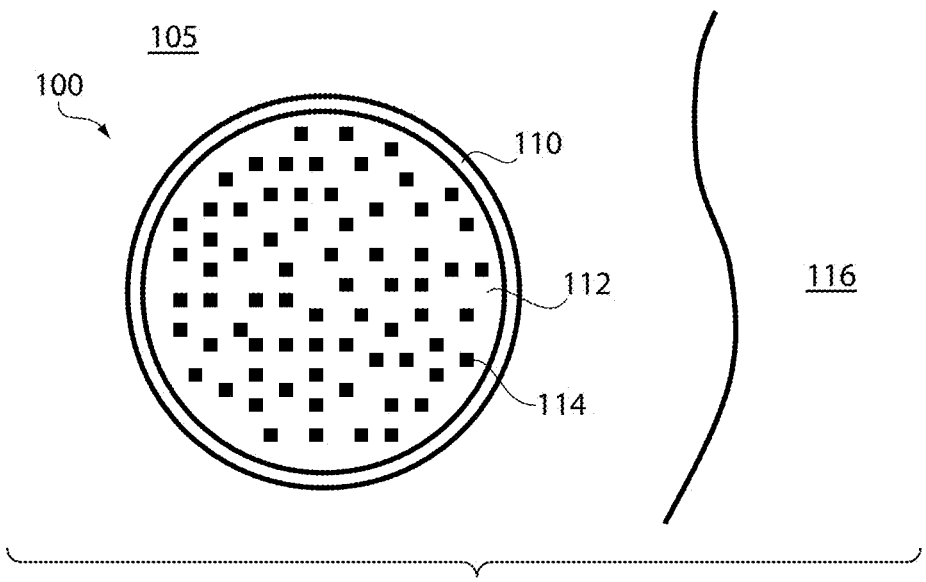
FIGS. 1A-1D are cross-sectional schematic diagrams illustrating use of a particle to deliver a fluid and/or an agent to a target medium, according to some embodiments.

Multiple emulsions and techniques for the formation of multiple emulsions are generally described. A multiple emulsion, as used herein, describes one or more larger droplets that contain one or more smaller droplets therein. In some embodiments, the larger droplets may be suspended in a carrying fluid containing the larger droplets that, in turn, contain the smaller droplets. As described below, multiple emulsions can be formed in one step in certain embodiments, with generally precise repeatability, and can be tailored in some embodiments to include a relatively thin layer of fluid separating two other fluids.

The formation of emulsions and multiple emulsions containing droplets with a uniform size, shape, and/or a uniform number of smaller droplets contained within larger droplets is known in the art. For example, International Patent Publication No. WO 2008/121342 by Weitz, et al., describes the use of microfluidic systems to produce multiple emulsions containing uniformly sized larger droplets each containing smaller droplets. Generally, in these systems, multiple emulsions are formed by nesting multiple immiscible fluids within a microfluidic conduit system. The multiple emulsions can be produced by first producing one or more droplets of a first fluid within a second fluid at the exit of a first conduit. These droplets are then transported to the end of a second conduit, where a multiple emulsion is formed in which the second fluid surrounds the droplets of the first fluid.

In addition, the formation of multiple emulsions in which the first and second droplets are formed simultaneously is known in the art. For example, International Patent Publication Number WO 2006/096571 by Weitz, et al., includes a description of various microfluidic systems in which fluids are transported through two nested conduits contained within another conduit to produce multiple emulsions. However, multiple conduits are typically used in these systems, and in some cases, an inner conduit is nested within a surrounding conduit such that the exit opening of the inner conduit extends past the exit opening of the surrounding conduit. As another example, International Patent Publication Number WO 2011/028764, by Weitz, et al., describes the formation of multiple emulsions, but in various systems that include certain intersections of different conduits.

The present invention is generally directed to surprising new methods of flowing fluids in conduits (and associated articles and systems) to produce multiple emulsions. As described in more detail below, it has been discovered that increasing fluid flow rates from a stable operating regime produces an unstable operating regime, but unexpectedly, further increases in flow rates produce a second stable operating regime. In some cases, the multiple emulsions formed within the second, stable operating regime may comprise relatively thin intermediate fluid shells. Rather than first producing droplets of a first fluid at an exit opening of a first conduit and subsequently passing these droplets through an end of a second conduit to produce a double emulsion (i.e., operating under a "droplet flow" regime), the first and second droplets within the multiple emulsions of the present invention may be formed simultaneously. Simultaneous formation of the first and second droplets can be achieved, in some embodiments, by transporting a first fluid within a first conduit at a relatively high flow rate such that the first fluid forms a continuous stream of fluid within the second fluid as the first fluid exits the first conduit (i.e., a "jetting flow" regime). As the jet of the first fluid exits a second conduit located downstream of the first conduit, the second fluid can surround the first fluid, thereby forming a double emulsion. When operated under a jetting flow regime, the multiple emulsions formed at the exit opening of the second conduit may contain, in some embodiments, relatively thin shells of the second fluid. In addition, operation under a jetting flow regime may allow for high speed production of multiple emulsions, relative to the droplet flow regime, at least in some cases.

One reason the benefits of operation under a jetting flow regime in certain embodiments are surprising is because, in order to transition from the droplet flow regime to the jetting flow regime, one must first pass through an intermediate regime in which the fluid flow is unstable and generally unsuitable for producing multiple emulsions, especially consistently-sized multiple emulsions. In the present invention, it has been unexpectedly found that further increases in fluid flow rates do not lead to increased fluid instability, as would be expected; rather, further increases in flow rates from an unsteady regime surprisingly lead to more stability, not less. In particular, it has been found that increasing the flow rate through the unsteady regime may lead to stable operation, for example, in which consistently-sized multiple emulsions with the relatively thin shells can be produced at relatively high speeds.

A multiple emulsion droplet may contain one or more droplets therein. A "droplet," as used herein, is an isolated portion of a first fluid that is surrounded by a second fluid. It is to be noted that a droplet is not necessarily spherical, but may assume other shapes as well, for example, depending on the external environment. In some embodiments, the droplet has a minimum cross-sectional dimension that is substantially equal to the largest dimension of the channel perpendicular to fluid flow in which the droplet is located.

Using the methods and devices described herein, in certain embodiments, a consistent volume and/or number of droplets are produced, and/or a consistent ratio of volume and/or number of outer droplets to inner droplets (or other such ratios) are produced. In addition, as described elsewhere, the relative volumes of the fluidic droplets within the multiple emulsion are configured in some cases to include a relatively thin layer of fluid, e.g., separating two other fluids. For example, in some cases, a single droplet within an outer droplet is configured/formed such that the inner droplet occupies a relatively large percentage of the volume of the outer droplet, thereby resulting in a thin layer of outer droplet fluid surrounding the inner droplet fluid. The thin layer of outer droplet fluid surrounding the inner droplet fluid, which may contain a polymer, may be subsequently dried to form a solid shell containing a fluid. The ability to precisely control the dimensions of the thin layer of outer droplet fluid can allow one to fabricate particles configured with thin shells, including any of the thicknesses or other dimensions described elsewhere herein.

In some embodiments, a triple emulsion may be produced, i.e., an emulsion containing an inner droplet (or first) fluid, surrounded by an outer droplet (or second) fluid, which in turn is surrounded by a third or carrying fluid. In some cases, the carrying fluid and the outer droplet fluid may be the same. These fluids are often of varying miscibilities due to differences in hydrophobicity. For example, the inner droplet fluid may be water soluble, the outer droplet fluid oil soluble, and the carrying fluid water soluble. This configuration is often referred to as a W/O/W multiple emulsion ("water/oil/water"). Another multiple emulsion may include an inner droplet fluid that is oil soluble, an outer droplet fluid that is water soluble, and a carrying fluid that is oil soluble. This type of multiple emulsion is often referred to as an O/W/O multiple emulsion ("oil/water/oil"). It should be noted that the term "oil" in the above terminology merely refers to a fluid that is generally more hydrophobic and not miscible or soluble in water, as is known in the art. Thus, the oil may be a hydrocarbon in some embodiments, but in other embodiments, the oil may comprise other hydrophobic fluids.

In the descriptions herein, multiple emulsions are generally described with reference to a three phase system, i.e., having an inner droplet fluid, an outer droplet fluid, and a carrying fluid. However, it should be noted that this is by way of example only, and that in other systems, additional fluids may be present within the multiple emulsion. As examples, an emulsion may contain a first fluid droplet and a second fluid droplet, each surrounded by a third fluid, which is in turn surrounded by a fourth fluid; or an emulsion may contain multiple emulsions with higher degrees of nesting, for example, a first fluid droplet surrounded by a second fluid droplet, which is surrounded by a third fluid droplet, which is contained within a carrying fluid. Accordingly, it should be understood that the descriptions of the inner droplet fluid, outer droplet fluid, and carrying fluid are for ease of presentation, and that the descriptions herein are readily extendable to systems involving additional fluids, e.g., quadruple emulsions, quintuple emulsions, sextuple emulsions, septuple emulsions, etc.

FIG. 2 includes an exemplary schematic diagram of a system 200 to form multiple emulsions, which may be used to form particles, according to some embodiments. In FIG. 2, system 200 includes outer conduit 210, a first inner conduit (or injection tube) 220, and a second inner conduit (or collection tube) 230. First inner conduit 220 includes an exit opening 225 that opens into the outer conduit 210, and second inner conduit 230 includes an entrance opening 235 that opens within the outer conduit 210. System 200 also includes a third inner conduit 240 disposed within first inner conduit 220. Inner conduit 240 includes an exit opening 245 that opens into conduit 220. As illustrated in FIG. 2, conduits 210, 220, 230, and 240 are illustrated as being concentric relative to each other. However, it should be noted that "concentric," as used herein, does not necessarily refer to tubes that are strictly coaxial, but also includes nested or "off-center" tubes that do not share a common center line. In some embodiments, however, the tubes may all be strictly coaxial with each other.

The inner diameter of conduit 220 generally decreases in a direction from left to right, as shown in FIG. 2, and the inner diameter of conduit 230 generally increases from the entrance opening in a direction from left to right as exhibited in FIG. 2. These constrictions, or tapers, provide geometries that aid in producing consistent emulsions, at least in some cases. While the rate of constriction is illustrated as being linear in FIG. 2, in other embodiments, the rate of constriction may be non-linear.

As shown in FIG. 2, inner droplet fluid 250 flows through third inner conduit 240 and out of exit opening 245 into conduit 220, in a left to right direction. In addition, outer droplet fluid 260 is illustrated flowing through conduit 220 in a left to right direction, outside inner droplet fluid 250 and conduit 240. Carrying fluid 270 is illustrated flowing in a left to right direction in the pathway provided between outer conduit 210 and conduit 220.

As illustrated in FIG. 2, inner droplet fluid 250 exits from exit opening 225 and is restrained from contacting the inner surface of conduit 220 by outer droplet fluid 260. As shown in the example of FIG. 2, no portion of inner fluid 250 contacts the inner surface of conduit 220 after its exit from conduit 240. In some embodiments, various system parameters can be chosen such that droplets of the first fluid are not formed at the exit opening of the first conduit. For example, in some embodiments, the flow rates of inner droplet fluid 250 and outer droplet fluid 260 can be chosen such that inner droplet fluid 250 forms the inner fluid (or core) and outer droplet fluid 260 forms the outer fluid (or sheath) in a core-sheath flow arrangement. As illustrated in FIG. 2, outer droplet fluid 260 does not completely surround inner droplet fluid 250 to form a droplet, but rather, outer droplet fluid 260 forms a sheath that surrounds inner droplet fluid 250 about its longitudinal axis. In some embodiments, conduit 240 has a capillary number such that no droplets are produced at the exit opening of conduit 240. As another example, inner droplet fluid 250 and/or outer droplet fluid 260 can be selected to have viscosities such that no droplets are produced at the exit opening of conduit 240.

Additionally, in some embodiments, outer droplet fluid 260 may not come into contact with the surface of conduit 230, at least until after a multiple emulsion droplet has been formed, because outer droplet fluid 260 is surrounded by carrying fluid 270 as the droplet enters collection tube 230.

As inner droplet fluid 250 and outer droplet fluid 260 are transported out of exit opening 225 of conduit 220, two droplets may be formed: an outer droplet 280 (including outer droplet fluid 260) and an inner droplet 285 (including inner droplet fluid 250) positioned within the outer droplet 280. As illustrated in FIG. 2, outer droplet 280 may form a relatively thin shell around inner droplet 285. Droplets 280 and 285 may be formed sequentially, or substantially simultaneously. For example, in FIG. 2, as fluids 250 and 260 are transported out of the exit opening 225 of conduit 220, the boundary between fluids 250 and 260 can be closed (e.g., by forming a substantially enclosed interface between the two fluids) at substantially the same time as the boundary between fluids 260 and 270 is formed. The droplets formed from the fluids exiting conduit 220 may be transported away from exit opening 225 and through opening 235 of conduit 230 by carrying fluid 270 as the droplets are transported through conduit 210.

While inner droplet fluid 250 is illustrated as forming a continuous jet extending from conduit 240 to exit opening 225 of conduit 220 in FIG. 2, in some embodiments, inner droplet fluid 250 may form one or more droplets prior to reaching exit opening 225. The droplets produced within conduit 220 may be further broken up upon exiting exit opening 225 of conduit 220 in certain cases. In some embodiments, the flow rates of inner droplet fluid 250 and/or outer droplet fluid 260 and/or other parameters within the system (e.g., fluid viscosities, channel dimensions, channel wall properties, etc.) can be selected such that jetting flow of inner droplet fluid 250 within outer droplet fluid occurs 260 within conduit 220. As used herein, a "jetting flow" regime refers to a condition in which a continuous stream of a first fluid (e.g., inner droplet fluid 250) extends longitudinally through a continuous stream of a second fluid without, in the regime, breaking up to form droplets of the inner fluid within the outer fluid (although breakup of the same fluid into droplets typically occurs outside of the jetting flow regime). In some embodiments, the fluid in the jetting flow regime (e.g., inner droplet fluid 250 in FIG. 2) can be continuous over a length of at least about 5, at least about 10, or at least about 25 times the cross-sectional diameter of the droplets that are eventually formed from the fluid, wherein the continuous length is measured from the exit opening of the conduit through which the fluid is delivered to the point at which the fluid breaks up to form droplets.

In contrast, a "dripping flow" regime refers to a condition in which a first fluid is broken up into droplets in a second fluid within a distance from the exit of the conduit through which it is delivered (e.g., conduit 240 in FIG. 2) that is less than or equal to about 2 times the average cross-sectional diameter of the first fluid droplets that are formed. As one particular example, in the set of embodiments illustrated in FIG. 2, inner droplet fluid 250 is illustrated as flowing from conduit 240 in a jetting flow regime, while inner droplet fluid 250 and outer droplet fluid 260 are illustrated as flowing from conduit 220 in a dripping flow regime.

In some embodiments, inner droplet fluid 250 and outer droplet fluid 260 do not break to form droplets until the fluids are inside of conduit 230 (i.e., to the right of end 235, which defines the entrance orifice of conduit 230 in FIG. 2). In other embodiments, however, inner droplet fluid 250 and outer droplet fluid 260 break to from droplets prior to entering conduit 230 (i.e., to the left of end 235). Under "dripping" conditions, the droplets are formed closer to the orifice at end 235 of conduit 230, while under "jetting" conditions, the droplets are formed further downstream, i.e., farther to the right as illustrated in FIG. 2. For example, under certain "dripping" conditions, droplets are produced when positioned within a single orifice diameter; this mode of operation can be analogized to a dripping faucet. Under some jetting conditions, a long jet is produced that extends three or more orifice diameters downstream down the length of the collection tube, where the jet breaks into droplets.

Droplet formation and morphology (and/or the corresponding morphology of particles formed from the droplets) can be affected in a number of ways, in various embodiments of the invention. For example, the geometry (physical configuration) of the device 200, including the relationship of the outer conduit and the inner conduits, may be configured to develop multiple emulsions of desired volume, frequency, and/or content. For example, the diameters of the exit openings at exit openings 225 and/or 245 of conduits 220 and 240, respectively, may be selected to help control the relative volumes of the formed droplets. Droplet formation may be affected, in some cases, by the rate of flow of the inner droplet fluid, the rate of flow of the outer droplet fluid, the rate of flow of the carrying fluid, the total amount of flow or a change in the ratios of any two of these, and/or combinations of any of these flow rates.

The relative volumes of the inner droplet and the outer droplet may also be carefully controlled in certain embodiments, i.e., the ratio of the size or volume of the inner and outer droplets. The inner droplet may fill a relatively large portion of the outer droplet. Such emulsions can be useful, for example, in forming particles with relatively thin shells, as discussed herein. In some embodiments, the inner fluid droplet may fill greater than about 10%, about 20%, about 30%, about 40%, about 50%, about 60%, about 70%, about 90%, about 95%, or about 99% of the volume of the outer droplet. In some cases, the outer droplet can be considered a fluid shell, or coating, when it contains an inner droplet, as some or most of the outer droplet volume may be filled by the inner droplet. In some embodiments, the outer fluid shell thickness can be equal to or less than, for example, about 5%, about 4%, about 3%, about 2%, about 1%, or about 0.1% of the outer fluid droplet radius. This allows, in some embodiments, for the formation of multiple emulsions with only a very thin layer of material separating, and thus stabilizing, two miscible fluids.

Of course, the invention is not limited to the formation of multiple emulsions including thin outer droplets, and, in other embodiments, the inner droplet may fill only a small portion of the outer droplet. In some embodiments, the inner droplets may fill less than about 90%, less than about 80%, less than about 70%, less than about 60%, less than about 50%, less than about 30%, less than about 20%, or less than about 10% of the volume of the outer droplet. The shell material can also be greater than or equal to, e.g., about 10%, about 20%, about 30%, about 40%, or about 50% of the outer fluid droplet radius.

In addition, by controlling the geometry (physical configurations) of the conduits and/or the flow of fluid through the conduits, the average cross-sectional diameters of the droplets that are produced may be controlled in certain embodiments. Those of ordinary skill in the art will be able to determine the average cross-sectional diameter (or other characteristic dimension) of a plurality or series of droplets, for example, using laser light scattering, microscopic examination, or other known techniques. The average cross-sectional diameter of a single droplet, in a non-spherical droplet, is the diameter of a perfect sphere having the same volume as the non-spherical droplet. The average cross-sectional diameter of a droplet (and/or of a plurality or series of droplets) may be, for example, less than about 1 mm, less than about 500 micrometers, less than about 200 micrometers, less than about 100 micrometers, less than about 75 micrometers, less than about 50 micrometers, less than about 25 micrometers, less than about 10 micrometers, or less than about 5 micrometers in some cases. The average cross-sectional diameter may also be at least about 1 micrometer, at least about 2 micrometers, at least about 3 micrometers, at least about 5 micrometers, at least about 10 micrometers, at least about 15 micrometers, or at least about 20 micrometers in certain cases. In some embodiments, at least about 50%, at least about 75%, at least about 90%, at least about 95%, or at least about 99% of the droplets within a plurality of droplets has an average cross-sectional diameter within any of the ranges outlined in this paragraph.

The droplets may be of substantially the same shape and/or size (i.e., "monodisperse"), or of different shapes and/or sizes, depending on the particular application. In some cases, the droplets may have a homogenous distribution of cross-sectional diameters, i.e., the droplets may have a distribution of cross-sectional diameters such that no more than about 10%, about 5%, about 3%, about 1%, about 0.03%, or about 0.01% of the droplets have an average diameter that is more than about 10%, about 5%, about 3%, about 1%, about 0.03%, or about 0.01% different from the average cross-sectional diameter of the droplets. Some techniques for producing homogenous distributions of cross-sectional diameters of droplets are disclosed in International Patent Application No. PCT/US2004/010903, filed Apr. 9, 2004, entitled "Formation and Control of Fluidic Species," by Link et al., published as WO 2004/091763 on Oct. 28, 2004, incorporated herein by reference, and in other references as described below and/or incorporated herein by reference.

In some cases, such as when the outer droplets (containing outer droplet fluid 260) are formed at the same rate as are inner droplets (containing inner droplet fluid 250), there can be a one-to-one correspondence between the number of inner droplets and the number of outer droplets; for example, in some embodiments, each inner droplet is surrounded by an outer droplet, and each outer droplet contains a single inner droplet of inner fluid. In other embodiments, different ratios of the number of inner droplets and the number of outer droplets may be present. In some embodiments, substantially all of the multiple emulsion droplets that are produced are double emulsion droplets.

In some embodiments of the invention, at least a portion of a multiple emulsion may be solidified to form a particle, for example, an outer fluid and/or an inner fluid. A fluid can be solidified using any suitable method. For example, in some embodiments, the fluid may be dried, gelled, and/or polymerized, and/or otherwise solidified, e.g., to form a solid, or at least a semi-solid. The solid that is formed may be rigid in some embodiments, although in other cases, the solid may be elastic, rubbery, deformable, etc. In some cases, for example, an outer fluid may be solidified to form a solid shell at least partially containing an interior containing a fluid and/or an agent. Any technique able to solidify at least a portion of a fluidic droplet can be used. For example, in some embodiments, a fluid within a fluidic droplet may be removed to leave behind a material (e.g., a polymer) capable of forming a solid shell. In other embodiments, a fluidic droplet may be cooled to a temperature below the melting point or glass transition temperature of a fluid within the fluidic droplet, a chemical reaction may be induced that causes at least a portion of the fluidic droplet to solidify (for example, a polymerization reaction, a reaction between two fluids that produces a solid product, etc.), or the like. Other examples include pH-responsive or molecular-recognizable polymers, e.g., materials that gel upon exposure to a certain pH, or to a certain species.

In some embodiments, a fluidic droplet is solidified by increasing the temperature of the fluidic droplet. For instance, a rise in temperature may drive out a material from the fluidic droplet (e.g., within an outer fluid droplet) and leave behind another material that forms a solid. For example, in embodiments illustrated in FIG. 2, fluid 260 (and therefore, outer droplet 280) may contain a polymer suspended in a liquid (e.g., a hydrophobic liquid). The liquid within fluid 260 may be removed from outer droplet 280 by heating the droplet, leaving behind a solidified polymeric shell surrounding droplet 285 (containing inner droplet fluid 250).

Thus, an outer droplet may be solidified to form a solid shell that encapsulates one or more fluids and/or agents, for example, for delivery to a target medium, as described elsewhere herein. For example, in FIG. 2, a particle similar to the particle described in FIGS. 1A-1D, described in detail below, may be formed by hardened droplet 280 and fluid 250. Such particles can be used to deliver the agent within fluid 250 to a target medium, as described elsewhere herein.

In some embodiments, it may be desirable to control the temperature at which the multiple emulsion droplet is dried. For example, in some such embodiments in which shells are formed by drying a multiple emulsion, controlling the drying temperature can ensure that the shell is configured so that it does not rupture during the drying process. In some embodiments, the multiple emulsion may be dried at a temperature of between about 25° C. and about 100° C., between about 40° C. and about 80° C., between about 50° C. and about 70° C., or between about 55° C. and about 65° C. In some embodiments, the multiple emulsion may be washed prior to drying (or after, in some cases) using a variety of suitable solvents including, but not limited to toluene and water. For example, in one set of embodiments, after particles are formed, the carrying fluid containing the particles may be removed and/or replaced with a vehicle (e.g., for delivery to a target medium), which may or may not be the same as the carrying fluid.

It should be noted that FIG. 2 and the related description is only exemplary, and other multiple emulsions (e.g., having differing numbers of droplets, nesting levels, etc.), and other systems are also contemplated within various embodiments of the instant invention. For example, the device in FIG. 2 may be configured to include other flow arrangements and/or additional concentric tubes, for example, to produce more highly nested droplets. By supplying fourth, fifth, sixth, etc. fluids, increasingly complex droplets within droplets can be produced in certain embodiments. Some of these fluids may be the same, in certain embodiments of the invention (e.g., the first fluid may have the same composition as the third fluid, the second fluid may have the same composition as the fourth fluid, etc.).

As an example, FIG. 3 includes an exemplary schematic illustration of system 300 in which triple emulsions are formed. In FIG. 3, system 300 includes outer conduit 310, a first inner conduit (or injection tube) 320, and a second inner conduit (or collection tube) 330. First inner conduit 320 includes an exit opening 325 that opens into the outer conduit 310, and second inner conduit 330 includes an entrance opening 335 that opens within the outer conduit 310.

As shown in FIG. 3, inner fluid 350 flows through conduit 320 and out of exit opening 325 into conduit 310, in a left to right direction. In addition, fluid 360 is illustrated flowing through conduit 310 in a left to right direction, outside inner fluid 350 and conduit 320. Near entrance opening 335 of conduit 330, fluid 360 surrounds fluid 350 to form the first nesting of the triple emulsion. Fluid 370 is illustrated entering conduit 310 from the right side and flowing in a right to left direction. Upon contacting fluid 360, fluid 370 reverses direction, and surrounds fluids 350 and 360 near entrance opening 335 of conduit 330 to form the second nesting of the triple emulsion. Fluid 380 is illustrated entering conduit 310 from the right side and flowing in a right to left direction. Fluids 370 and 380 are arranged such that fluid 370 forms the sheath and fluid 380 forms the core of a core-sheath flow arrangement. Upon reaching entrance opening 335 of conduit 330, fluid 380 changes direction and surrounds fluids 350, 360, and 370 to form the third nesting of the triple emulsion.

FIG. 4 includes an exemplary schematic illustration of system 400 in which quadruple emulsions are formed. The arrangement of conduits in FIG. 4 is similar to the arrangement in FIG. 3, including outer conduit 410, a first inner conduit (or injection tube) 420, and a second inner conduit (or collection tube) 430. First inner conduit 420 includes an exit opening 425 that opens into the outer conduit 410, and second inner conduit 430 includes an entrance opening 435 that opens within the outer conduit 410.

As shown in FIG. 4, inner fluid 450 flows through conduit 420 and out of exit opening 425 into conduit 410, in a left to right direction. In addition, fluid 460 is illustrated flowing through conduit 410 in a left to right direction, outside inner fluid 450 and conduit 420. Fluid 465 is illustrated flowing through conduit 410 in a left to right direction while surrounding fluid 460. Fluid 470 is illustrated entering conduit 410 from the right side and flowing in a right to left direction. Upon contacting fluid 465, fluid 470 reverses direction, and flows toward entrance opening 435 of conduit 430. Fluid 480 is illustrated entering conduit 410 from the right side and flowing in a right to left direction. Fluids 470 and 480 are arranged such that fluid 470 forms the sheath and fluid 480 forms the core of a core-sheath flow arrangement. Upon reaching entrance opening 435 of conduit 430, fluid 480 changes direction. Near entrance opening 435 of conduit 430, fluid 460 surrounds fluid 450 to form the first nesting; fluid 465 surrounds fluids 450 and 460 to form the second nesting; fluid 470 surrounds fluids 450, 460, and 465; and fluid 480 surrounds fluids 450, 460, 465, and 570 to form the fourth nesting of the quadruple emulsion.

The multiple emulsions including more than two nestings (e.g., triple emulsions, quadruple emulsions, etc.) can have any of the properties described elsewhere herein with respect to double emulsions. For example, the flow rates of the fluids can be controlled such that each nesting includes a single droplet. In such embodiments, the multiple emulsion comprises a core fluid surrounded by multiple layers of multiple outer fluids. Each droplet within such multiple emulsions may have any of the properties (e.g., thicknesses, variations in thickness (or lack thereof), cross-sectional diameter, etc.) described elsewhere herein. For example, in the embodiments illustrated in FIG. 4, any of the shells formed by fluids 460, 465, and 470 within the quadruple emulsions may have any of the thicknesses and/or variations in thicknesses described elsewhere herein. As another example, the quadruple emulsions formed in FIGS. 3 and 4 (or in other embodiments comprising further nesting) may have any of the cross-sectional diameters and/or distributions of cross-sectional diameters described elsewhere herein.

Figure 13A:
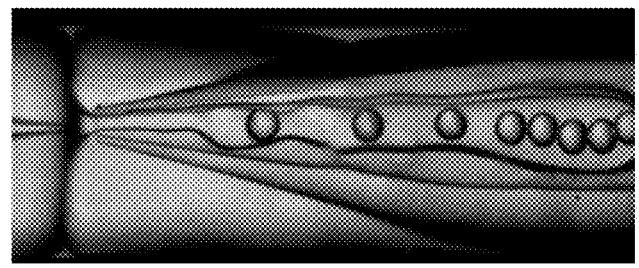
FIGS. 13A-13C show (A) an optical microscope image illustrating the production of certain multiple emulsions, (B) an exemplary plot of the number of core droplets formed as a function of the volumetric flow rate of the inner stream according to various embodiments, and (C) optical microscope images illustrating a production of certain multiple emulsions, according to some embodiments.
Figure 13B:
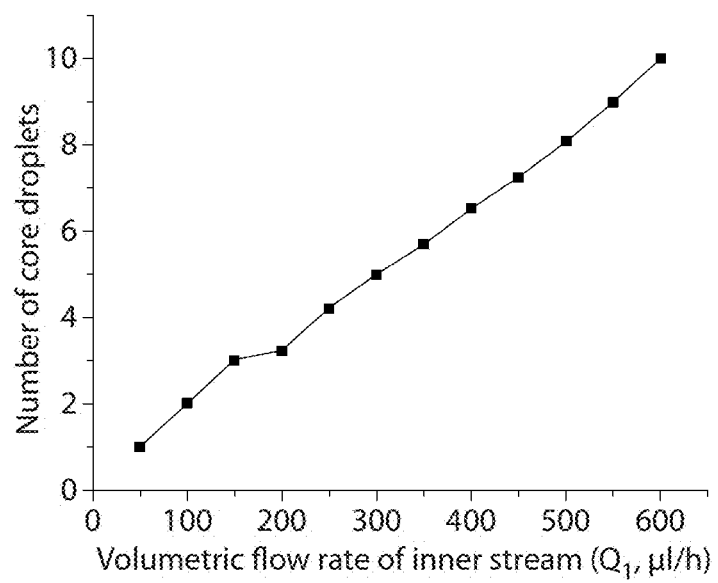
Figure 13C:
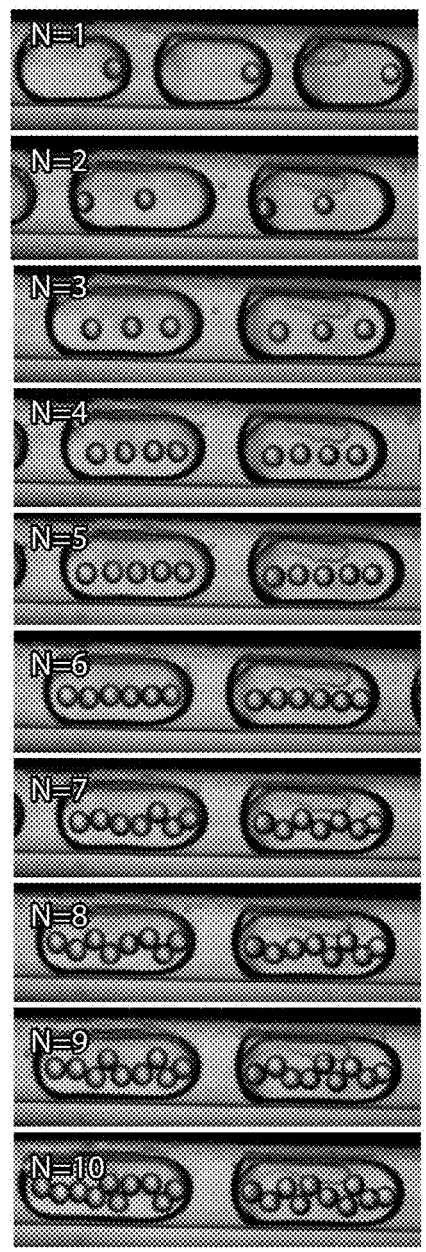

While multiple emulsions containing a single droplet at each nesting level have been described, it should be understood that the invention is not so limited, and, in some embodiments, one or more nesting levels contain more than one droplet. For example, in some embodiments, the inner fluid forms a plurality of droplets within a middle fluid, and the middle fluid is surrounded by a thin layer of an outer fluid which is, in turn, surrounded by a carrying fluid. Some such embodiments are illustrated in FIG. 13C. In some embodiments, the outer fluid surrounds a middle fluid which surrounds a plurality of outer fluids, each of which forms a thin layer of fluid around a plurality of innermost fluids within a carrying fluid. By controlling the relative flow rates of the fluids used to form the multiple emulsion, a plurality of droplets are formed within any nesting level of the multiple emulsion.

In some cases in which multiple droplets are present within a given nesting level, for a given nesting level of a multiple emulsion droplet, each of the fluidic droplets of that level may contain substantially the same number of inner fluidic droplets therein; for example, substantially all of the droplets may contain substantially the same number of droplets therein. It should be understood that, even if the droplets appear to be substantially identical (in any portion of a multiple emulsion droplet), or to contain substantially the same number of droplets therein, not all of the droplets will necessarily be completely identical. In some cases, there may be minor variations in the number and/or size of droplets contained within a surrounding droplet. Thus, in some cases, at least about 75%, at least about 80%, at least about 85%, at least about 90%, at least about 92%, at least about 94%, at least about 95%, at least about 96%, at least about 97%, at least about 98%, or at least about 99% of a plurality of droplets may each contain the same number of droplets therein.

The rate of production of multiple emulsion droplets may be determined by the droplet formation frequency, which under many conditions can vary between approximately 1 Hz and 5000 Hz. In some cases, the rate of droplet production may be at least about 1 Hz, at least about 10 Hz, at least about 100 Hz, at least about 200 Hz, at least about 300 Hz, at least about 500 Hz, at least about 750 Hz, at least about 1,000 Hz, at least about 2,000 Hz, at least about 3,000 Hz, at least about 4,000 Hz, or at least about 5,000 Hz.

Production of large quantities of emulsions may be facilitated by the parallel use of multiple devices such as those described herein, in some instances. In some cases, relatively large numbers of devices may be used in parallel, for example at least about 10 devices, at least about 30 devices, at least about 50 devices, at least about 75 devices, at least about 100 devices, at least about 200 devices, at least about 300 devices, at least about 500 devices, at least about 750 devices, or at least about 1,000 devices or more may be operated in parallel. The devices may comprise different conduits (e.g., concentric conduits), openings, microfluidics, etc. In some cases, an array of such devices may be formed by stacking the devices horizontally and/or vertically. The devices may be commonly controlled, or separately controlled, and can be provided with common or separate sources of various fluids, depending on the application.

The systems and methods described herein can be used in a plurality of applications. For example, fields in which the particles and multiple emulsions described herein may be useful include, but are not limited to, food, beverage, health and beauty aids, paints and coatings, chemical separations, and drugs and drug delivery. For instance, a precise quantity of a fluid, drug, pharmaceutical, or other agent can be contained by a shell designed to release its contents under particular conditions. In some instances, cells can be contained within a droplet, and the cells can be stored and/or delivered, e.g., to a target medium, for example, within a subject. Other agents that can be contained within a particle and delivered to a target medium include, for example, biochemical species such as nucleic acids such as siRNA, RNAi and DNA, proteins, peptides, or enzymes. Additional agents that can be contained within an emulsion include, but are not limited to, colloidal particles, magnetic particles, nanoparticles, quantum dots, fragrances, proteins, indicators, dyes, fluorescent species, chemicals, or the like. The target medium may be any suitable medium, for example, water, saline, an aqueous medium, a hydrophobic medium, or the like.

In one particular set of embodiments, particles comprising thin shells can be formed using the multiple emulsion techniques described herein. In some embodiments, as a non-limiting illustrative example, one or more particles can be used to deliver a fluid and/or an agent to a target medium, such as a hydrocarbon, crude oil, petroleum, or other medium. In some cases, at least some of the particles may comprise a solid portion or shell at least partially containing an interior containing a fluid and/or an agent. The shells of the particles can comprise a polymer, and in some cases, substantially all of the polymer within the shells is at least partially soluble in the target medium. The carrying fluid in which the particles are formed may be used as a vehicle used to contact the particles with a target medium, and/or the carrying fluid may be substituted by a suitable vehicle, as discussed elsewhere herein. When the particles contact the target medium, at least a portion of the shells of the particles can be disrupted, for instance, such that at least some of the fluid and/or agent within the particles is expelled or otherwise transported from the particles and into the target medium. Of course, it should be understood that the particles may be used in other applications as well, e.g., as discussed herein.

In some embodiments, the inventive particles are configured to withstand relatively high absolute pressures.

FIGS. 1A-1D are exemplary schematic diagrams illustrating use of a particle 100 to deliver a fluid 112 and/or an agent 114 to a target medium 116 (e.g., a medium containing an oil, such as crude oil, a hydrocarbon, etc.), in accordance with some embodiments of the invention. Particle 100 may be, for example, suspended in vehicle 105. In these figures, particle 100 includes shell 110, which partially or fully surrounds a fluid 112. As shown in this example, fluid 112 contains an agent 114, such as a surfactant or other agent as is discussed herein, although in other cases, there may be no agent present. In some embodiments, shell 110 may partially or fully surround any suitable material. The material may be, for example, a solid or a semisolid, an agent, etc. Also, in some cases, more than one material may be present.

Shell 110 may comprise one or more polymers, such as polystyrene, polycaprolactone, polyisoprene, poly(lactic acid), and the like. Shell 110 can be formed, for example, by removing a liquid from a suspension of droplets of polymers in an outer fluid, leaving behind a solidified polymeric shell. Examples of this are discussed below.

Vehicle 105 may comprise any suitable fluid configured for delivering the particles 100 to the target medium 116. In some embodiments (e.g., in cases where target medium 116 contains crude oil and/or other hydrocarbons), vehicle 105 is hydrophilic (e.g., an aqueous vehicle).

In some embodiments, when the particles 100 contained within vehicle 105 are exposed to a medium 116 (e.g., a medium containing oil) such that the shell contacts the medium (for example medium 116 in FIG. 1A), at least a portion of the shell 100 is disrupted. For example, the polymer within the shell 110 may be configured to be at least partially soluble in an oil (e.g., in crude oil) such that, when the shell 110 contacts a medium 116 containing the oil, at least a portion of the shell 110 dissolves in the medium 116, thereby causing a disruption in the shell 110. The polymer may also be configured so that it is at least partially soluble in a hydrocarbon, etc., as discussed herein, instead of (or in addition to) an oil such as crude oil. In some cases, a hole may form (and grow in some cases), or the shell 110 may crack, fragment, become distorted, etc. as a result of the disruption. In some embodiments, the fluid 112 and/or agent 114 contained by the shell 110 can be at least partially exposed to the medium 116 containing the oil, for example, as a result of this disruption in the shell 110.

Figure 1B:
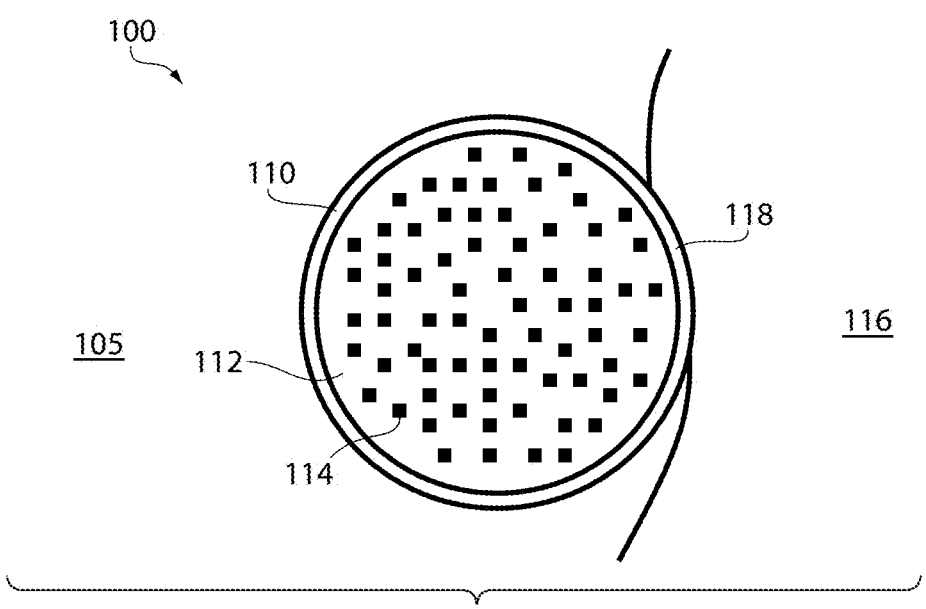
Figure 1C:
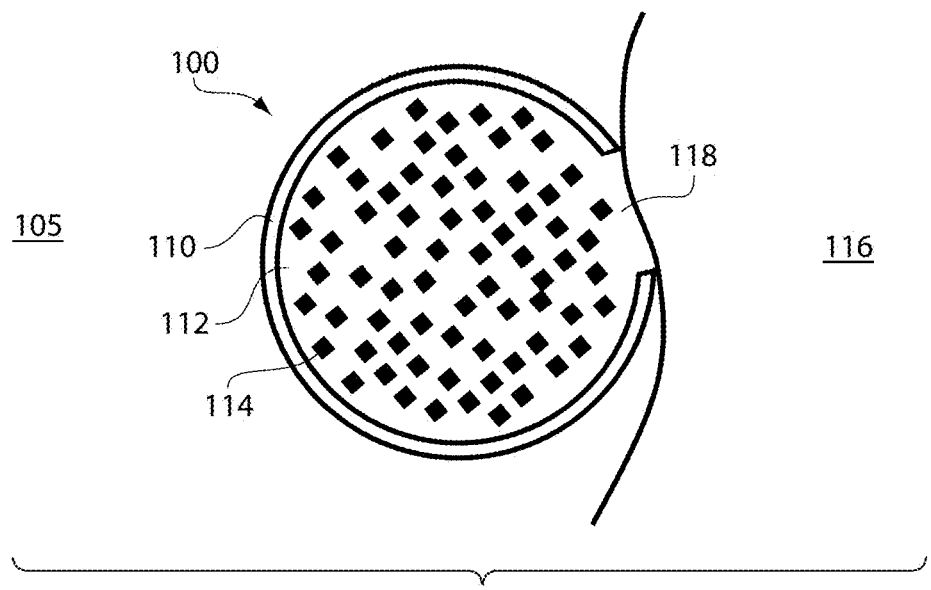
Figure 1D:
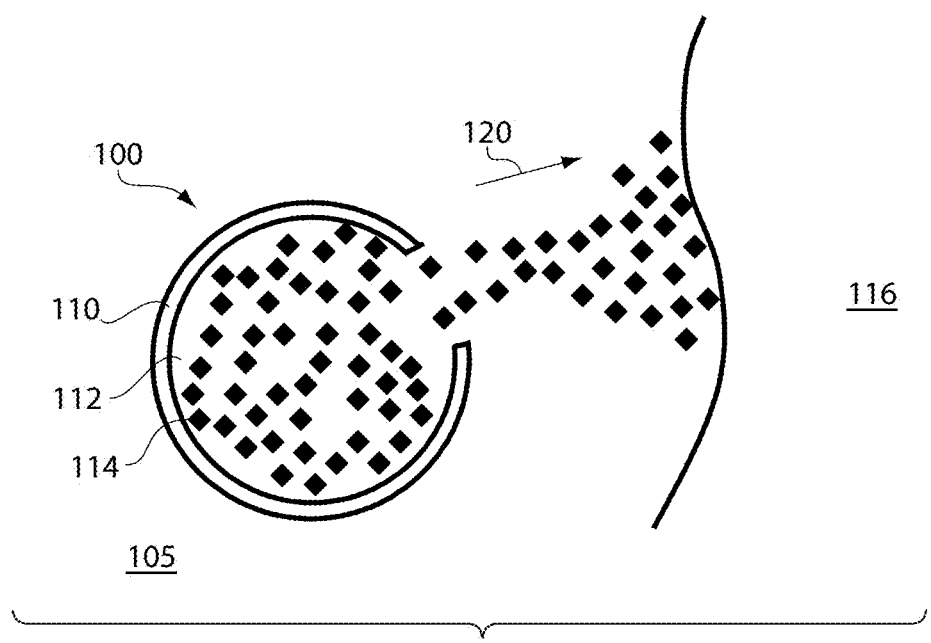

FIGS. 1B-1D include schematic illustrations showing an exemplary process by which a shell 110 of a particle 100 is disrupted, leading the particle 100 to release a fluid 112 and/or an agent 114 contained therein. However, it should be understood that this discussion is by way of example only, and is not intended to be a limiting description of the disruption of a shell 110. In FIG. 1B, shell 110 of particle 100, contained within vehicle 105, is in contact with medium 116. Upon contacting medium 116, portion 118 of shell 110 dissolves, as illustrated in FIG. 1C. In some embodiments, after portion 118 dissolves, some or all of fluid 112 and/or agent 114 is transported out of shell 110 to be exposed to medium 116, as illustrated in FIG. 1D. Transport may be, for example, by convection, diffusion, osmosis, electrical drift, etc. In some embodiments, the shell 110 shrinks as its contents (e.g., fluid 112 and/or agent 114) are released. For example, shell 110 in FIG. 1D is depicted as smaller than shell 110 in FIG. 1C to represent such shrinkage of the shell 110. In addition, the contents (e.g., fluid 112 and/or agent 114) of the shell 100 may be directionally released into a medium 116 in certain embodiments. For example, in FIG. 1D, fluid 112 and/or agent 114 are shown as having been released from shell 110 in the direction of arrow 120.

In some embodiments, some or all of the polymer within the shell is configured to be at least partially soluble in the target medium (e.g., a medium containing crude oil, a hydrocarbon, petroleum, an oil, etc.). As used herein, a material is configured to be "soluble" in a liquid medium when the material is exposed to a liquid medium at 25° C. and 1 atm, where the liquid medium has a mass of at least 100 times the mass of the material, and the material enters the liquid medium such that, at equilibrium, all of the material is contained within the liquid medium and no portion of the material forms a separate, macroscopic phase (e.g., as a precipitated solid or a phase-separated fluid). It should be understood that "solubility," as used herein, does not necessarily require that the soluble material be dissolved within the medium at a molecular level, for example, a finely-dispersed suspension, a dispersion, an emulsion, etc. may be formed at equilibrium in some cases. In addition, a material is configured to be "partially soluble" when some, but not all, of the material is soluble within the liquid medium using the screening test discussed above. In certain cases, one or more of the polymers within the shell may be configured to be at least partially soluble in a chemical "indicative" of the target medium in certain cases, for instance, where the target medium is one that is not readily compositionally defined. For example, in some embodiments, one or more polymers within the shell may be configured to be at least partially soluble in octane, which may be used as a chemical indicative of crude oil.

In some embodiments, the shell may comprise one or more materials that are configured to not be soluble in hydrophilic fluids such as water, an alcohol, etc. The materials may, in some embodiments, include one or more polymers such as those described herein. The use of such shell materials in a particle allows, in some embodiments, for delivery of fluids and/or agents contained within the particle to a medium that the particle comes in contact with, for example, hydrocarbons, petroleum, an oil, etc.

In an example, a plurality of particles comprising water-insoluble shells and containing a surfactant (or any other suitable fluid and/or agent such as those described herein) are suspended in water, or another suitable vehicle. In this example, the suspension of particles in water is transported to or otherwise brought into contact with a region or location containing, or at least suspected of containing, oil, such as an oil well, a subterranean oil reservoir, a container of oil (e.g., a vial or a barrel), a chemical plant, a refinery, etc. In this example, prior to contacting the oil, the water-insoluble shells of the particles are configured to remain substantially intact, ensuring that the surfactant remains contained within the particles. In some embodiments, once the shells of the particles contact the target medium, the shell is disrupted, e.g., at least partially dissolving within the medium, thereby exposing at least some of the surfactant to the medium.

As noted above, the shell may comprise a polymer in some embodiments. Exemplary polymers suitable for use in shells include, but are not limited to, polystyrene (PS), polycaprolactone (PCL), polyisoprene (PIP), poly(lactic acid), polyethylene, polypropylene, polyacrylonitrile, polyimide, polyamide, and/or mixtures and/or co-polymers of these and/or other polymers.

In some embodiments, the polymer may include a relatively linear polymer. Generally, linear polymers dissolve more quickly than highly cross-linked polymers, and are therefore be particularly useful in many applications. In some embodiments, the linear polymers are not substantially crosslinked (i.e., the polymers include linear chains of carbon atoms that do not include chemical bonding to other chains, although pendant groups may be present). It should be understood that, while the linear polymers may not be cross-linked, the linear polymers may be physically entangled with one another.

All or part of the shell of a particle may comprise a polymer that has a relatively high glass transition temperature ($T_g$), in some embodiments. Polymers with high glass transition temperatures are more resistant to rupture or disruption at high temperatures and/or pressures, which can make their use desirable for certain high temperature applications, such as some enhanced oil recovery processes. However, in other applications, polymers with lower glass transition temperatures may also be used. In some embodiments, substantially all of the polymer within the shell has a glass transition temperature of at least about 85° C., at least about 100° C., between about 85° C. and about 250° C., or between about 85° C. and about 200° C. One of ordinary skill in the art would be capable of determining the glass transition temperature of a polymer used in a shell by, for example, using differential scanning calorimetry (DSC). Generally, DSC defines the glass transition temperature as the temperature at which the polymer matrix goes from the glass state to the rubber state. Generally, polymers with relatively long chain lengths have relatively smaller chain mobility and relatively higher strength, toughness, and glass transition temperatures. Exemplary polymers with relatively high glass transition temperatures include, but are not limited to, polystyrene (PS), polycaprolactone (PCL), and polyisoprene (PIP), and/or mixtures and/or co-polymers of these and/or other polymers.

The molecular weight of the polymeric material used in the shell of the particle can also be selected to impart desirable physical properties, in accordance with some embodiments of the invention. For example, in certain embodiments in which relatively quick disruption of the shell of the particle is desired upon contact with the target medium, polymers with low weight-averaged molecular weights (e.g., less than about 20,000 g/mol) can be employed. In some embodiments in which it is desirable to rupture the shell relatively slowly, polymers with relatively high weight-averaged molecular weights (e.g., greater than about 20,000 g/mol, e.g., between about 20,000 g/mol and about 800,000 g/mol) can be employed.

In some embodiments, the shell of the particle is configured to withstand the application of relatively high pressures without rupturing. Mechanically robust shells may be produced by fabricating the shell from a mechanically resistant material, such as polystyrene, polycaprolactone, polyisoprene, and/or other mechanically resistant polymer or other material. In some embodiments, one or more particles (e.g., after drying) may be subjected to an absolute pressure of at least about 200 kPa, at least about 500 kPa, at least about 750 kPa, between about 100 kPa and about 1000 kPa, or between about 200 kPa and about 750 kPa (for example, in embodiments where the particles are suspended in water or another vehicle that is pressurized for delivery to a subterranean oil reservoir) without rupturing. In some embodiments, including some embodiments in which high pressure resistance is desired, the materials used in the shell are relatively elastic. For example, in some embodiments, the Young's modulus of the polymeric material used in the shell may be at least about 1 MPa, at least about 10 MPa, at least about 100 MPa, or at least about 1 GPa. In some embodiments, the Young's modulus of the polymeric material used in the shell may be less than about 10 GPa, less than about 5 GPa, or less than about 3 GPa.

The particles may be configured to be able to deliver a variety of agents. The agents may be fluid or solid, and/or the agent may be contained within a fluid (e.g., dissolved, suspended, etc.) In some embodiments, for example, the agent may include one or more surfactants. The surfactants can be delivered, for example, to a medium containing oil, or other medium as discussed herein. When the surfactant is delivered to a medium containing oil, for instance, the surfactant stabilizes the oil-water interface, which prevents the oil from forming a fine emulsion in the water, thus making the oil easier to separate from the water. A variety of surfactants may be contained within the particles. In some embodiments, for example, the particles may contain an ionic (e.g., cationic or anionic) surfactant. Exemplary anionic surfactants suitable for use include, but are not limited to, sodium dodecyl sulfate (SDS), ammonium lauryl sulfate, sodium lauryl sulfate, sodium laureth sulfate, dioctyl sodium sulfosuccinate, perfluorooctanesulfonate (PFOS), perfluorobutanesulfonate, alkyl aryl ether phosphate, alkyl ether phosphate, alkyl carboxylates, fatty acid salts (soaps), sodium stearate, sodium lauroyl sarcosinate, carboxylate fluorosurfactants, perfluorononanoate, perfluorooctanoate (PFOA or PFO), or the like. Exemplary cationic surfactants suitable for use include, but are not limited to, cetyl trimethylammonium bromide (CTAB), hexadecyl trimethyl ammonium bromide, cetyl trimethylammonium chloride (CTAC), cetylpyridiniumchloride (CPC), polyethoxylated tallow amine (POEA), benzalkonium chloride (BAC), benzethonium chloride (BZT), or the like. In some embodiments, non-ionic surfactants are used, including, but not limited to: sorbitan monooleate (also referred to as Span 80); Poly(ethylene glycol)-block-poly(propylene glycol)-block-poly(ethylene glycol), Poly(propylene glycol)-block-poly (ethylene glycol)-block-poly(propylene glycol) (also referred to as F 108); polyvinyl alcohol (PVA); cetyl alcohol, stearyl alcohol; cetostearyl alcohol (e.g., consisting predominantly of cetyl and stearyl alcohols); oleyl alcohol; polyoxyethylene glycol alkyl ethers (Brij); octaethylene glycol monododecyl ether; pentaethylene glycol monododecyl ether; polyoxypropylene glycol alkyl ethers; glucoside alkyl ethers; decyl glucoside; lauryl glucoside; octyl glucoside; polyoxyethylene glycol octylphenol ethers; triton X-100; polyoxyethylene glycol alkylphenol ethers; nonoxynol-9; glycerol alkyl esters; glyceryl laurate; polyoxyethylene glycol sorbitan alkyl esters; polysorbates; sorbitan alkyl esters; cocamide MEA; cocamide DEA; dodecyldimethylamine oxide; block copolymers of polyethylene glycol and polypropylene glycol; Poloxamers; or the like.

In some embodiments, the use of ionic surfactants is advantageous because the shells may be more stable, for example in applications where the particles are suspended in a saline environment (e.g., sea water) or other suitable vehicle. Not wishing to be bound by any particular theory, it is believed that the use of ionic surfactants in saline provides an osmotic balance between the fluid (or other contents) inside the shell, and the fluid outside the shell, and this osmotic balance helps to stabilize the shell.

The particles may be suspended in any suitable vehicle (e.g., vehicle 105 in FIGS. 1A-1D). In some embodiments, the vehicle in which the particles are suspended is hydrophilic. In an example, vehicle 105 comprises seawater, which may be used, for example, to deliver particles to crude oil or other hydrocarbons that have been released into a sea and/or that lie within an oil reservoir beneath the surface of a sea. Examples of suitable hydrophilic vehicles include, but are not limited to, water, alcohols (e.g., butanol (e.g., n-butanol), isopropanol (IPA), propanol (e.g., n-propanol), ethanol, methanol, glycerin, or the like), saline solutions, blood, acids (e.g., formic acid, acetic acid, or the like), amines (e.g., dimethyl amine, diethyl amine, or the like), mixtures of these, and/or other similar fluids. In some embodiments, polar protic solvents (e.g., alcohols, acids, bases, etc.) can be used in the hydrophilic vehicle. In some embodiments, polar aprotic solvents can be used in the hydrophilic vehicle, including, for example, dimethyl sulfoxide (DMSO), acetonitrile (MeCN), dimethylformamide (DMF), acetone, or the like. It should be understood that the invention is not limited to hydrophilic vehicles, and, in other embodiments, hydrophobic vehicles could be used.

The particles described herein may have any suitable average cross-sectional diameter. Those of ordinary skill in the art will be able to determine the average cross-sectional diameter of a single particle and/or a plurality of particles, for example, using laser light scattering, microscopic examination, or other known techniques. The average cross-sectional diameter of a single particle, in a non-spherical particle, is the diameter of a perfect sphere having the same volume as the non-spherical particle. The average cross-sectional diameter of a particle (and/or of a plurality or series of particles) may be, for example, less than about 1 mm, less than about 500 micrometers, less than about 200 micrometers, less than about 100 micrometers, less than about 75 micrometers, less than about 50 micrometers, less than about 25 micrometers, less than about 10 micrometers, or less than about 5 micrometers, or between about 50 micrometers and about 1 mm, between about 10 micrometers and about 500 micrometers, or between about 50 micrometers and about 100 micrometers in some cases. The average cross-sectional diameter may also be at least about 1 micrometer, at least about 2 micrometers, at least about 3 micrometers, at least about 5 micrometers, at least about 10 micrometers, at least about 15 micrometers, or at least about 20 micrometers in certain cases. In some embodiments, at least about 50%, at least about 75%, at least about 90%, at least about 95%, or at least about 99% of the particles within a plurality of particles has an average cross-sectional diameter within any of the ranges outlined in this paragraph.

In some embodiments, the shell of the particle(s) are relatively thin. The use of thin shells can provide a number of advantages. For example, thin shells can dissolve relatively quickly in some cases. In some embodiments, this may allow a particle to deliver its contents prior to being transported away from the target medium. Another advantage of using particles with thin shells is that, during the process by which the outer liquid of a fluidic droplet is dried to form the shell of a particle, where the outer liquid contains a polymer that solidifies to form the shell, removal of the liquid can be performed relatively easily without rupturing the shell that is formed, at least according to certain embodiments. In some embodiments, when relatively thick shells are employed, the shells tend to rupture when the liquid in which the polymer is suspended is removed. Not wishing to be bound by any particular theory, it is believed that, when relatively thick shells are employed (e.g., shells with thicknesses greater than about 10 micrometers), the outermost portion of the shell dries more quickly than the innermost portion of the shell, producing a stress that can rupture or otherwise disrupt the shell. Without wishing to be bound by any theory, it is believed that using a middle phase with a very thin thickness allows the middle phase to act as a lubricant such that the fluids are within a lubrication regime. In this regime, the drag force on the innermost fluid is significantly increased. The increase in drag force is believed to enhance the stability of thin shell fluid. For example, the migration velocity of a 98-micrometer diameter inner droplet surrounded by a 100 micrometer shell is 100,000 times lower than the migration velocity of a 50-micrometer diameter inner droplet surrounded by a 100 micrometer shell.

In some embodiments, the shell of a particle has an average thickness (averaged over the entire particle) of less than about 0.05, less than about 0.01, less than about 0.005, or less than about 0.001 times the average cross-sectional diameter of the particle, or between about 0.0005 and about 0.05, between about 0.0005 and about 0.01, between about 0.0005 and about 0.005, or between about 0.0005 and about 0.001 times the average cross-sectional diameter of the particle. In some embodiments, the shell of a particle has an average thickness of less than about 1 micron, less than about 500 nm, or less than about 100 nm, or between about 50 nm and about 1 micron, between about 50 nm and about 500 nm, or between about 50 nm and about 100 nm. In some embodiments, at least about 50%, at least about 75%, at least about 90%, at least about 95%, or at least about 99% of the particles within a plurality of particles includes a shell having an average thickness within any of the ranges outlined in this paragraph. One of ordinary skill in the art would be capable of determining the average thickness of a shell by, for example, examining scanning electron microscope (SEM) images of the particles.

For many applications, it may be desirable to deliver a plurality of particles, at least some of which contain a fluid and/or an agent such as a surfactant, to a target medium. In order to ensure predictable agent delivery, some embodiments advantageously employ particles with relatively consistent properties. For example, in some embodiments, a plurality of particles are provided wherein the distribution of shell thicknesses among the plurality of particles is relatively uniform. The use of particles with relatively uniform shell thicknesses can ensure, in some cases, consistent shell dissolution times, making agent delivery more predictable. In some embodiments, a plurality of particles are provided having an overall average shell thickness, measured as the average of the average shell thicknesses of each of the plurality of particles. In some cases, the distribution of the average shell thicknesses can be such that no more than about 5%, no more than about 2%, or no more than about 1% of the particles have a shell with an average shell thickness thinner than 90% (or thinner than 95%, or thinner than 99%) of the overall average shell thickness and/or thicker than 110% (or thicker than 105%, or thicker than about 101%) of the overall average shell thickness.

The plurality of particles may have relatively uniform cross-sectional diameters in certain embodiments. The use of particles with relatively uniform cross-sectional diameters can allow one to control the viscosity of the particle suspension, the amount of agent delivered to the target medium, and/or other parameters of the delivery of fluid and/or agent from the particles. In some embodiments, the plurality of particles has an overall average diameter and a distribution of diameters such that no more than about 5%, no more than about 2%, or no more than about 1% of the particles have a diameter less than about 90% (or less than about 95%, or less than about 99%) and/or greater than about 110% (or greater than about 105%, or greater than about 101%) of the overall average diameter of the plurality of particles.

In some embodiments, the plurality of particles has an overall average diameter and a distribution of diameters such that the coefficient of variation of the cross-sectional diameters of the particles is less than about 10%, less than about 5%, less than about 2%, between about 1% and about 10%, between about 1% and about 5%, or between about 1% and about 2%. The coefficient of variation can be determined by those of ordinary skill in the art, and may be defined as:

$$c_v = \frac{\sigma}{|\mu|} \quad [1]$$

wherein $\sigma$ is the standard deviation and $\mu$ is the mean.

As used herein, two fluids are immiscible, or not miscible, with each other when one is not soluble in the other to a level of at least 10% by weight at the temperature and under the conditions at which the emulsion is produced. For instance, two fluids may be selected to be immiscible within the time frame of the formation of the fluidic droplets. In some embodiments, two fluids (e.g., the carrying fluid and the inner droplet fluid of a multiple emulsion) are compatible, or miscible, while the outer droplet fluid is incompatible or immiscible with one or both of the carrying and inner droplet fluids. In other embodiments, however, all three (or more) fluids may be mutually immiscible, and in certain cases, all of the fluids do not all necessarily have to be water soluble. In still other embodiments, as mentioned, additional fourth, fifth, sixth, etc. fluids may be added to produce increasingly complex droplets within droplets, e.g., a carrying fluid may surround a first fluid, which may in turn surround a second fluid, which may in turn surround a third fluid, which in turn surround a fourth fluid, etc. In addition, the physical properties of each nesting layer of fluidic droplets may each be independently controlled, e.g., by control over the composition of each nesting level.

As used herein, the term "fluid" generally refers to a substance that tends to flow and to conform to the outline of its container, i.e., a liquid, a gas, a viscoelastic fluid, etc. Typically, fluids are materials that are unable to withstand a static shear stress, and when a shear stress is applied, the fluid experiences a continuing and permanent distortion. The fluid may have any suitable viscosity that permits flow. If two or more fluids are present, each fluid may be independently selected among essentially any fluids (liquids, gases, and the like) by those of ordinary skill in the art, by considering the relationship between the fluids.

In an aspect of the present invention, as discussed, multiple emulsions are formed by flowing fluids through one or more conduits. The system may be a microfluidic system. "Microfluidic," as used herein, refers to a device, apparatus, or system including at least one fluid channel having a cross-sectional dimension of less than about 1 millimeter (mm), and in some cases, a ratio of length to largest cross-sectional dimension of at least 3:1. One or more conduits of the system may be a capillary tube. In some cases, multiple conduits are provided, and in some embodiments, at least some are nested, as described herein. The conduits may be in the microfluidic size range and may have, for example, average inner diameters, or portions having an inner diameter, of less than about 1 millimeter, less than about 300 micrometers, less than about 100 micrometers, less than about 30 micrometers, less than about 10 micrometers, less than about 3 micrometers, or less than about 1 micrometer, thereby providing droplets having comparable average diameters. One or more of the conduits may (but not necessarily), in cross-section, have a height that is substantially the same as a width at the same point. A conduit may include an opening that may be smaller, larger, or the same size as the average diameter of the conduit. For example, conduit openings may have diameters of less than about 1 mm, less than about 500 micrometers, less than about 300 micrometers, less than about 200 micrometers, less than about 100 micrometers, less than about 50 micrometers, less than about 30 micrometers, less than about 20 micrometers, less than about 10 micrometers, less than about 3 micrometers, etc. In cross-section, the conduits may be rectangular or substantially non-rectangular, such as circular or elliptical. The conduits of the present invention may also be disposed in or nested in another conduit, and multiple nestings are possible in some cases. In some embodiments, one conduit may be concentrically retained in another conduit and the two conduits are considered to be concentric. However, one concentric conduit may be positioned off-center with respect to another, surrounding conduit, i.e., "concentric" does not necessarily refer to tubes that are strictly coaxial. By using a concentric or nesting geometry, two fluids that are miscible may avoid contact.

Figure 5:
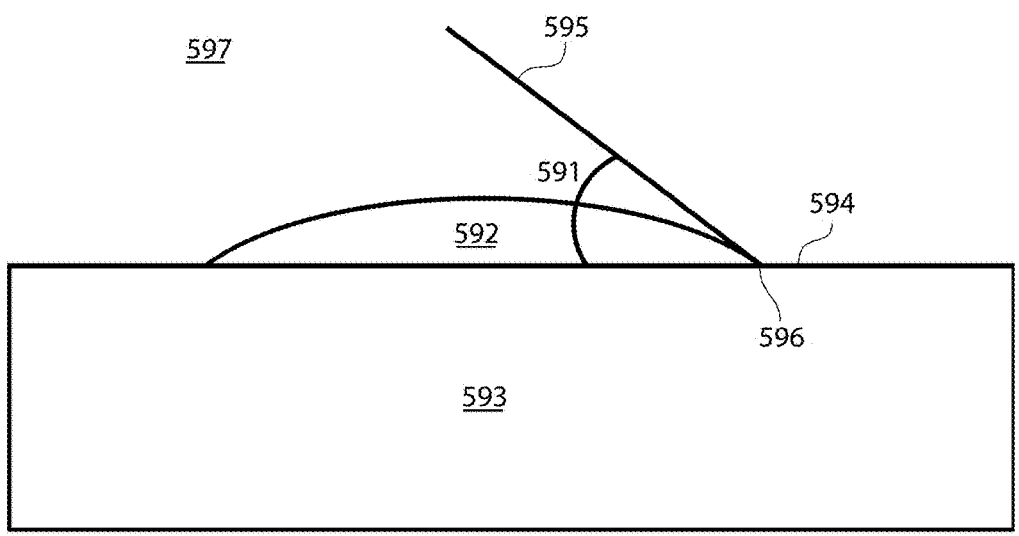
FIG. 5 is a schematic illustration outlining measurement of a contact angle of a hydrophilic material.

In some embodiments, fluids, conduits (including conduit walls), and other materials may be referred to as hydrophobic or hydrophilic. A material is "hydrophobic" when a droplet of water forms a contact angle greater than 90° when placed in intimate contact with the material in question in air at 1 atm and 25° C. A material is "hydrophilic" when a droplet of water forms a contact angle of less than 90° when placed in intimate contact with the material in question in air at 1 atm and 25° C. The "contact angle," in the context of hydrophobicity and hydrophilicity is the angle measured between the surface of the material and a line tangent to the external surface of the water droplet at the point of contact with the material surface, and is measured through the water droplet. FIG. 5 is a schematic illustration of the contact angle 591 formed by a water droplet 592 on a hydrophilic material 593 in air 597. As shown in FIG. 5, contact angle 591 is measured from surface 594 of material 593 through droplet 592 and to a line 595 tangent to the external surface of droplet 592 at the point of contact 596 between droplet 592 and material surface 594.

A variety of materials and methods, according to certain aspects of the invention, may be used to form systems (such as those described above) configured to produce the multiple emulsions and/or particles described herein. In some cases, the various materials selected lend themselves to various methods. For example, various components of the invention are configured from solid materials, in which the conduits are configured via micromachining, film deposition processes such as spin coating and chemical vapor deposition, laser fabrication, photolithographic techniques, etching methods including wet chemical or plasma processes, and the like. See, for example, *Scientific American,* 248:44-55, 1983 (Angell, et al). In one embodiment, at least a portion of the fluidic system is formed of silicon by etching features in a silicon chip. Technologies for precise and efficient fabrication of various fluidic systems and devices of the invention from silicon are known. In another embodiment, various components of the systems and devices of the invention are configured of a polymer, for example, an elastomeric polymer such as polydimethylsiloxane ("PDMS"), polytetrafluoroethylene ("PTFE" or Teflon®), or the like.

Different components can be fabricated of different materials. For example, a base portion including a bottom wall and side walls can be fabricated from an opaque material such as silicon or PDMS, and a top portion can be fabricated from a transparent or at least partially transparent material, such as glass or a transparent polymer, for observation and/or control of the fluidic process. Components can be coated so as to expose a desired chemical functionality to fluids that contact interior conduit walls, where the base supporting material does not have a precise, desired functionality. For example, components can be fabricated as illustrated, with interior conduit walls coated with another material. Material used to fabricate various components of the systems and devices of the invention, e.g., materials used to coat interior walls of fluid conduits, may desirably be selected from among those materials that will not adversely affect or be affected by fluid flowing through the fluidic system, e.g., material(s) that is chemically inert in the presence of fluids to be used within the device. A non-limiting example of such a coating is disclosed below; additional examples are disclosed in Int. Pat. Apl. Ser. No. PCT/US2009/000850, filed Feb. 11, 2009, entitled "Surfaces, Including Microfluidic Channels, With Controlled Wetting Properties," by Weitz, et al., published as WO 2009/120254 on Oct. 1, 2009, incorporated herein by reference.

In some embodiments, various components of the invention are fabricated from polymeric and/or flexible and/or elastomeric materials, and can be conveniently formed of a hardenable fluid, facilitating fabrication via molding (e.g. replica molding, injection molding, cast molding, etc.). The hardenable fluid may be essentially any fluid that can be induced to solidify, or that spontaneously solidifies, into a solid capable of containing and/or transporting fluids contemplated for use in and with the fluidic network. In some embodiments, the hardenable fluid comprises a polymeric liquid or a liquid polymeric precursor (i.e. a "prepolymer"). Suitable polymeric liquids include, for example, thermoplastic polymers, thermoset polymers, or mixture of such polymers heated above their melting point. As another example, a suitable polymeric liquid may include a solution of one or more polymers in a suitable solvent, which solution forms a solid polymeric material upon removal of the solvent, for example, by evaporation. Such polymeric materials, which can be solidified from, for example, a melt state or by solvent evaporation, are well known to those of ordinary skill in the art. A variety of polymeric materials, many of which are elastomeric, are suitable, and are also suitable for forming molds or mold masters, for embodiments where one or both of the mold masters is composed of an elastomeric material. A non-limiting list of examples of such polymers includes polymers of the general classes of silicone polymers, epoxy polymers, and acrylate polymers. Epoxy polymers are characterized by the presence of a three-membered cyclic ether group commonly referred to as an epoxy group, 1,2-epoxide, or oxirane. For example, diglycidyl ethers of bisphenol A can be used, in addition to compounds based on aromatic amine, triazine, and cycloaliphatic backbones. Another example includes the well-known Novolac polymers. Non-limiting examples of silicone elastomers suitable for use according to the invention include those formed from precursors including the chlorosilanes such as methylchlorosilanes, ethylchlorosilanes, phenylchlorosilanes, etc.

Silicone polymers are utilized in some embodiments, for example, the silicone elastomer polydimethylsiloxane. Non-limiting examples of PDMS polymers include those sold under the trademark Sylgard by Dow Chemical Co., Midland, Mich., and particularly Sylgard 182, Sylgard 184, and Sylgard 186. Silicone polymers including PDMS have several beneficial properties simplifying fabrication of the microfluidic structures of the invention. For instance, such materials are inexpensive, readily available, and can be solidified from a prepolymeric liquid via curing with heat. For example, PDMSs are typically curable by exposure of the prepolymeric liquid to temperatures of about, for example, about 65° C. to about 75° C. for exposure times of, for example, about an hour. Also, silicone polymers, such as PDMS, can be elastomeric, and thus may be useful for forming very small features with relatively high aspect ratios, necessary in certain embodiments of the invention. Flexible (e.g., elastomeric) molds or masters can be advantageous in this regard.

An advantage of forming structures such as microfluidic structures of the invention from silicone polymers, such as PDMS, is the ability of such polymers to be oxidized, for example by exposure to an oxygen-containing plasma such as an air plasma, so that the oxidized structures contain, at their surface, chemical groups capable of cross-linking to other oxidized silicone polymer surfaces or to the oxidized surfaces of a variety of other polymeric and non-polymeric materials. Thus, components can be fabricated and then oxidized and essentially irreversibly sealed to other silicone polymer surfaces, or to the surfaces of other substrates reactive with the oxidized silicone polymer surfaces, without the need for separate adhesives or other sealing means. In most cases, sealing can be completed simply by contacting an oxidized silicone surface to another surface without the need to apply auxiliary pressure to form the seal. That is, the pre-oxidized silicone surface acts as a contact adhesive against suitable mating surfaces. Specifically, in addition to being irreversibly sealable to itself, oxidized silicone such as oxidized PDMS can also be sealed irreversibly to a range of oxidized materials other than itself including, for example, glass, silicon, silicon oxide, quartz, silicon nitride, polyethylene, polystyrene, glassy carbon, and epoxy polymers, which have been oxidized in a similar fashion to the PDMS surface (for example, via exposure to an oxygen-containing plasma). Oxidation and sealing methods useful in the context of the present invention, as well as overall molding techniques, are described in the art, for example, in an article entitled "Rapid Prototyping of Microfluidic Systems and Polydimethylsiloxane," Anal. Chem., 70:474-480, 1998 (Duffy et al.), incorporated herein by reference.

In some embodiments, certain microfluidic structures of the invention (or interior, fluid-contacting surfaces) may be formed from certain oxidized silicone polymers. Such surfaces may be more hydrophilic than the surface of an elastomeric polymer. Such hydrophilic conduit surfaces can thus be more easily filled and wetted with aqueous solutions.

In some embodiments, a bottom wall of a microfluidic device of the invention is formed of a material different from one or more side walls or a top wall, or other components. For example, in some embodiments, the interior surface of a bottom wall comprises the surface of a silicon wafer or microchip, or other substrate. Other components may, as described above, be sealed to such alternative substrates. Where it is desired to seal a component comprising a silicone polymer (e.g. PDMS) to a substrate (bottom wall) of different material, the substrate may be selected from the group of materials to which oxidized silicone polymer is able to irreversibly seal (e.g., glass, silicon, silicon oxide, quartz, silicon nitride, polyethylene, polystyrene, epoxy polymers, and glassy carbon surfaces which have been oxidized). Alternatively, other sealing techniques may be used, as would be apparent to those of ordinary skill in the art, including, but not limited to, the use of separate adhesives, bonding, solvent bonding, ultrasonic welding, etc.

The following documents are incorporated herein by reference in their entirety for all purposes: International Patent Publication Number WO 2004/091763, filed Apr. 9, 2004, entitled "Formation and Control of Fluidic Species," by Link et al.; International Patent Publication Number WO 2004/002627, filed Jun. 3, 2003, entitled "Method and Apparatus for Fluid Dispersion," by Stone et al.; International Patent Publication Number WO 2006/096571, filed Mar. 3, 2006, entitled "Method and Apparatus for Forming Multiple Emulsions," by Weitz et al.; International Patent Publication Number WO 2005/021151, filed Aug. 27, 2004, entitled "Electronic Control of Fluidic Species," by Link et al.; International Patent Publication Number WO 2008/121342, filed Mar. 28, 2008, entitled "Emulsions and Techniques for Formation," by Chu et al.; International Patent Publication Number WO 2010/104604, filed Mar. 12, 2010, entitled "Method for the Controlled Creation of Emulsions, Including Multiple Emulsions," by Weitz et al.; International Patent Publication Number WO 2011/028760, filed Sep. 1, 2010, entitled "Multiple Emulsions Created Using Junctions," by Weitz et al.; International Patent Publication Number WO 2011/028764, filed Sep. 1, 2010, entitled "Multiple Emulsions Created Using Jetting and Other Techniques," by Weitz et al; and a U.S. Provisional Patent Application, filed on Jul. 6, 2011, entitled "Delivery to Hydrocarbons or Oil, Including Crude Oil," by Abbaspourrad et al. Also incorporated herein by reference in their entireties are U.S. Provisional Patent Application Ser. No. 61/505,001, filed Jul. 6, 2011, entitled "Delivery to Hydrocarbons or Oil, Including Crude Oil," by Abbaspourrad, et al., and of U.S. Provisional Patent Application Ser. No. 61/504,990, filed Jul. 6, 2011, entitled "Multiple Emulsions and Techniques for the Formation of Multiple Emulsions," by Kim, et al.

All other patents, patent applications, and documents cited herein are also hereby incorporated by reference in their entirety for all purposes.

The following examples are intended to illustrate certain embodiments of the present invention, but do not exemplify the full scope of the invention.

Example 1

This example describes an approach to making relatively monodisperse double emulsion droplets including a thin middle layer of fluid, using microfluidic techniques. Two immiscible streams confined in a microfluidic channel can form a stable jet or droplets under certain physical conditions, and the streams can be emulsified together to form double emulsion droplets, as discussed herein. The resultant double emulsion droplets have a thin outer layer which can enhance the stability of the double emulsion. The systems and methods described in this example can be applied to any viscous organic solvent, and in some embodiments, can facilitate the making of particles having a shell containing material, with a small amount of shell material. In addition, the systems and methods described in this example can produce double emulsions, or higher-order multiple emulsions, in a single step, at least in some cases. Relatively monodisperse particles with a shell thicknesses of less than 100 nm may be formed in some instances by evaporation of an outer phase (such as toluene) to leave behind a polymer (such as poly(lactic acid)) that solidifies to form the shell.

Two immiscible fluids flowing through a single microfluidic channel can show different distinct flow patterns of droplets and jets, depending upon several physical parameters. The fluid with the higher affinity to the walls of the microfluidic channel may form a continuous phase, while the fluid with the lower affinity may flow in the form of droplets or jets without contacting the walls of the channel. In many instances, the flow may produce a jet that is unstable due to Rayleigh-Plateau instability, which results in the breakup of the jet into separate droplets; however, spatial confinement of the interface may be used to produce a more stable jet. When the interface is formed proximate to a channel wall, the instability may be reduced in some cases.

Figure 6A:
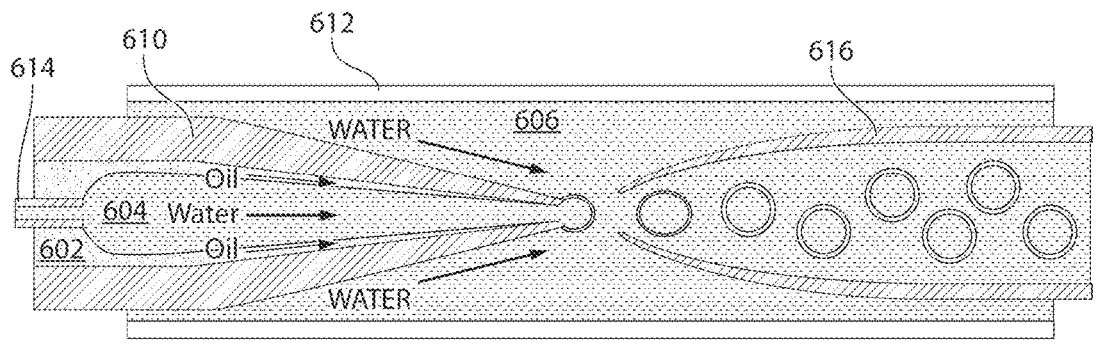
FIGS. 6A-6E show (A) an exemplary cross-sectional schematic diagram illustrating a system for producing certain multiple emulsions and (B-E) optical microscope images illustrating a production of certain multiple emulsions, according to some embodiments.

In some experiments in this example, double emulsion droplets were produced through emulsification of a stable biphasic jet into a continuous phase. To make water-in-oil-in-water (W/O/W) double emulsion droplets, microfluidic devices were employed. FIG. 6A includes a schematic illustration of a microfluidic device used for the preparation of double emulsion droplets. The microfluidic devices used here included a hydrophobic tapered injection channel 610 inserted in a second square channel 612 whose inner dimension was slightly larger than that of an outer diameter of injection channel 610 as depicted in FIG. 6A. By using a square channel with an inner diameter slightly larger than the outer diameter of the injection channel, the two channels fit snugly, which can allow for easier channel alignment of the tubes in the system. (Although a square channel was used here, channels having other shapes may also be used.) To flow two immiscible fluids ("oil" phase 602 and "water" phase 604) into the single injection channel, channel 614 was inserted into injection channel 610. In addition, a collection tube 616 was inserted into the square channel to confine the flow near the injection tip, thereby increasing the flow velocity and to collect droplets that are produced from injection channel 610. To produce W/O/W double emulsion droplets, n-octadecyltrimethoxyl silane (Aldrich) was coated on the injection capillary wall to render it hydrophobic, and 2-[methoxy(polyethyleneoxy)propyl]trimethoxyl silane (Gelest, Inc.) was coated onto the collection capillary wall to render it hydrophophilic.)

In these experiments, 25 wt % aqueous solution of poly (ethylene glycol) (PEG, MW 6000) and hexadecane ("oil" phase 602) with 1 wt % SPAN 80 was passed through the injection channel to form a dispersed phase of droplets, and 10 wt % aqueous solution of poly(vinyl alcohol) (PVA, MW 13,000-23,000) ("water" phase 606) was passed through channel 612 to form a continuous phase. It should be noted that the "oil" phase is used here to conveniently refer to a phase that is not substantially miscible in water or the "aqueous" phase (which is miscible in water). The "oil" phase should not be construed as being limited only to oils, and may include any fluid that is not substantially miscible in water.

Figure 6B:
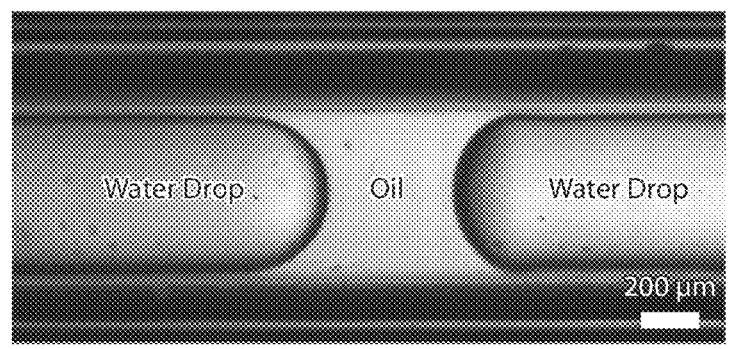

Depending on the inner diameter of the injection channel that was used in the microfluidic device, different resulting flow patterns were observed. For example, in an injection channel with an inner diameter of 580 micrometers, a variety of water droplet formations for a wide range of flow rates were observed. As a specific non-limiting example, when the ratio of the volumetric flow rate of the inner fluid stream to the volumetric flow rate of the outer fluid was set at 4:1, a "train" of plug-like or elongated droplets was observed, as shown in the optical microscope image in FIG. 6B; these droplets were emulsified into a cocurrent continuous fluid stream, flowing along the outer surface of the injection capillary in the same direction with the inner and outer fluid streams. When the plug-like droplets passed through the opening at the end of the channel, relatively monodisperse double emulsion droplets having relatively thin outer layers were generated, while large oil (hexadecane) blobs were generated for oil flow between water droplets. The discontinuous generation of double emulsion droplets is shown in the optical microscope image in FIG. 6C.

Figure 6C:
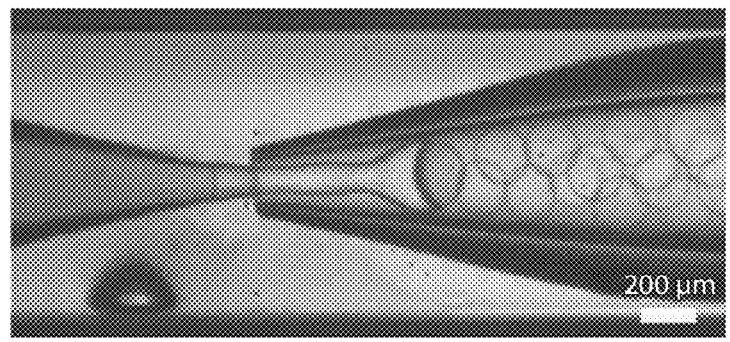
Figure 6D:
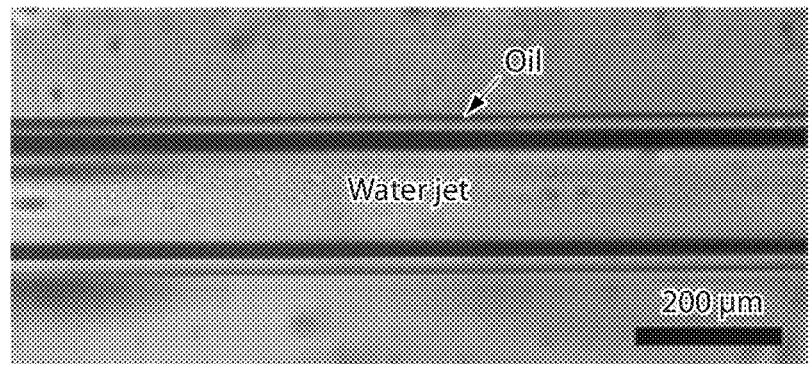
Figure 6E:
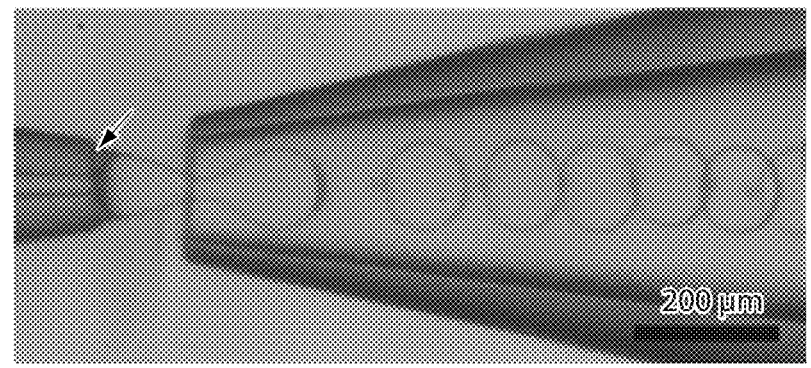

As another non-limiting example, when an injection channel with an inner diameter of 200 micrometers was used, a stable water jet was formed under these particular conditions, as shown in the optical microscope image in FIG. 6D. This jet was emulsified at or near the opening of the collection tube in a continuous manner, resulting in monodisperse double emulsion droplets. The use of a channel with a smaller inner diameter provided higher confinement of the interface under these conditions, thereby reducing perturbations and producing a stable jet. As seen in FIGS. 6C and 6E, the thickness of the outer layer of the resultant double emulsion droplet was too thin to accurately measure with an optical microscope.

Figure 7A:
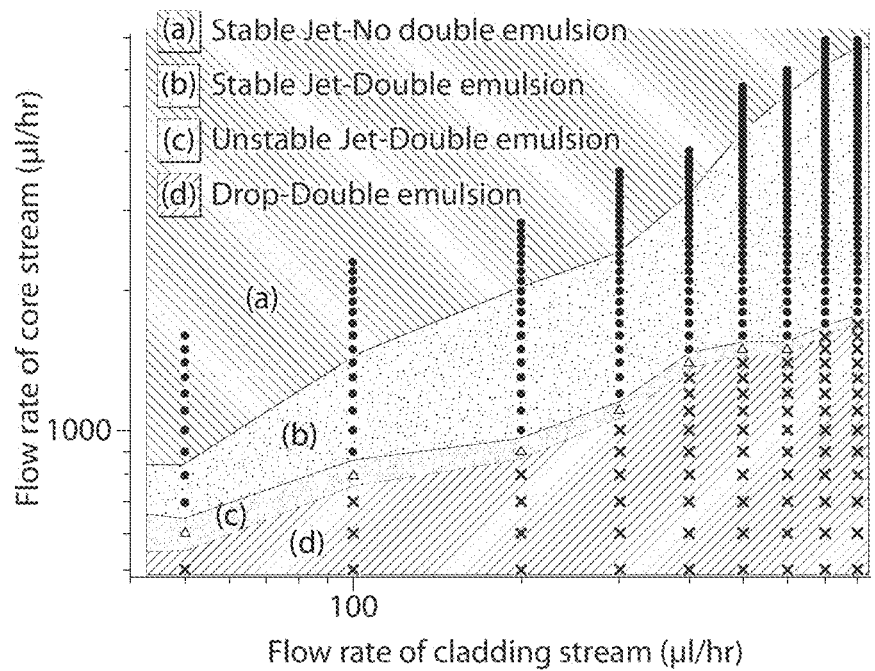
FIGS. 7A-7E show, according to some embodiments, (A) a plot of a flow rate of an inner stream as a function of a flow rate of a middle stream and (B-E) optical microscope images illustrating a production of multiple emulsions.
Figure 7B:
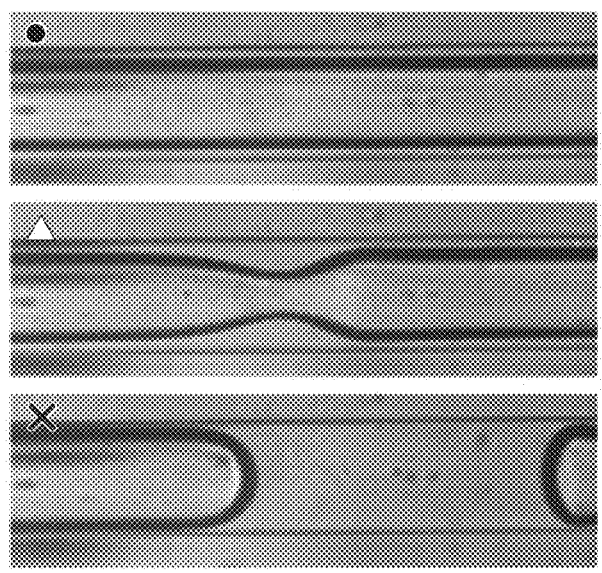

The flow rates of the entering streams influenced the flow pattern in the injection channel and thus, the generation of double emulsion droplets. FIG. 7A shows a plot of the flow behavior in the system as a function of the flow rates of the inner or "core" stream (fluid 604 in FIG. 6A) and the outer or "cladding" stream (fluid 602 in FIG. 6A), indicating various flow regimes observed at different flow rates of each, including regimes in which a stable jet and/or dropets are produced and in which unstable flow occurs and droplets are not produced. For example, when the flow rate of the inner stream was sufficiently high relative to a given flow rate of the outer stream, a stable water jet (circles) was formed in the injection channel, as shown in the top optical microscope image of FIG. 7B. In contrast, when the flow rate of the inner stream decreased, the jet became unstable and showed fluctuations of the interface without breakup (triangles), as shown in the middle optical microscope image of FIG. 7B. A further reduction of the flow rate of the inner stream yielded plug-like water droplets (crosses), as shown in the bottom optical microscope image of FIG. 7B.

Figure 7C:
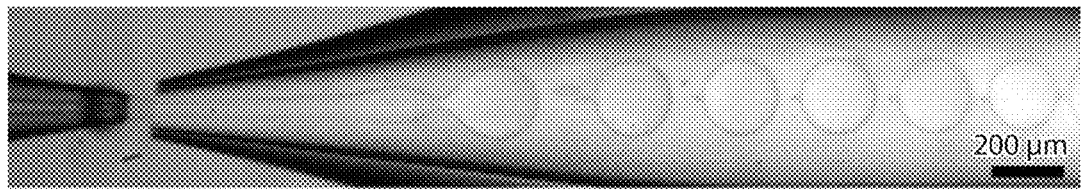
Figure 7D:
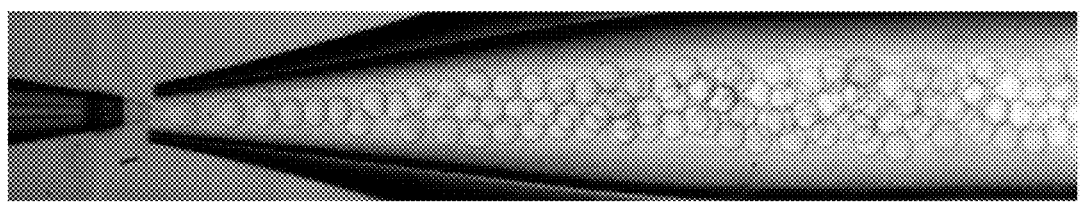
Figure 7E:
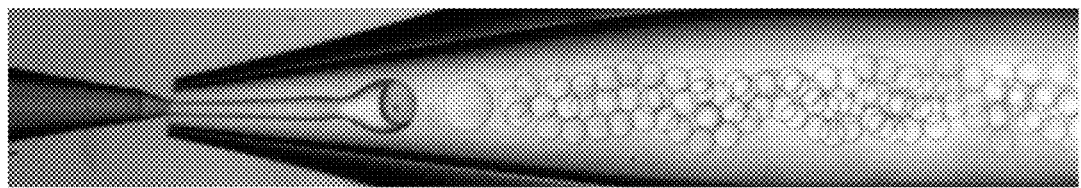

Although a high flow rate of the inner stream could produce a stable jet, a double emulsion was not always generated from the jet. High inertia of the inner stream at a high flow rate can cause leakage of the inner stream into the continuous phase near the tip of the injection channel, which corresponds to region (a) in FIG. 7A. Setting the flow rate of the inner stream to a value within region (b) allows double emulsion droplets to be generated in both jetting and dripping modes. For example, for an inner stream flow rate of about 1200 microliters/hour, the biphasic jet passed through the opening at the end of the collection channel and subsequently broke up into double emulsion droplets at the end of the jet, well inside the collection channel, as shown in the optical microscope image in FIG. 7C. By contrast, the biphasic jet was emulsified near the opening of the collection channel in the dripping mode for an inner stream flow rate of 800 microliters/hour in this particular device, as shown in the optical microscope image in FIG. 7D. When the flow rate of the inner stream was set to 400 microliters/hour (or any other flow rate within region (d) of FIG. 7A), discontinuous generation of double emulsion droplets was observed, as shown in the optical microscope image in FIG. 7E. For all of the experiments illustrated in FIGS. 7C-7E the flow rate of the cladding stream was maintained at 100 microliters/hour.

Figure 8A:
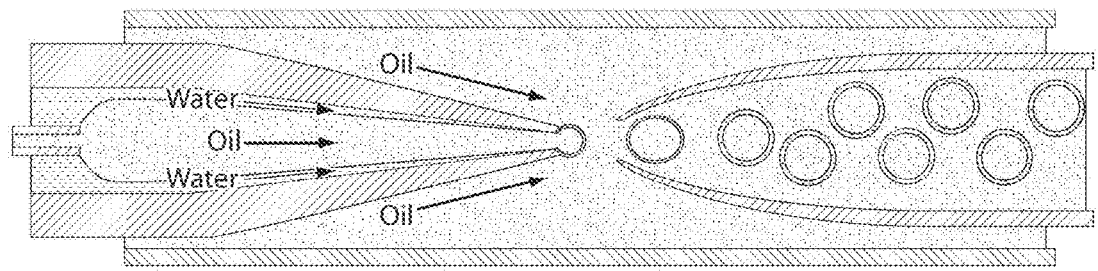
FIGS. 8A-8C show (A) an exemplary cross-sectional schematic diagram illustrating a system for producing certain multiple emulsions and (B-C) optical microscope images illustrating a production of certain multiple emulsions, according to some embodiments.
Figure 8B:
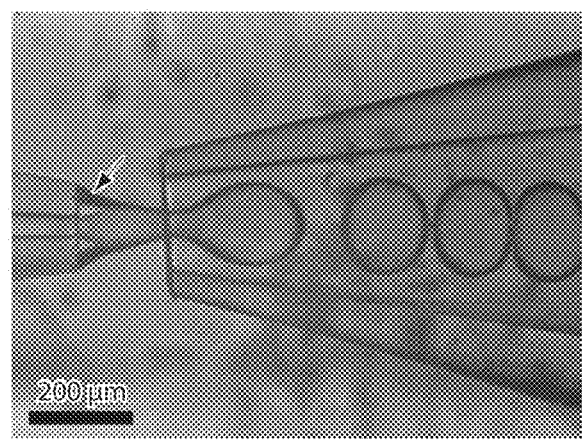
Figure 8C:
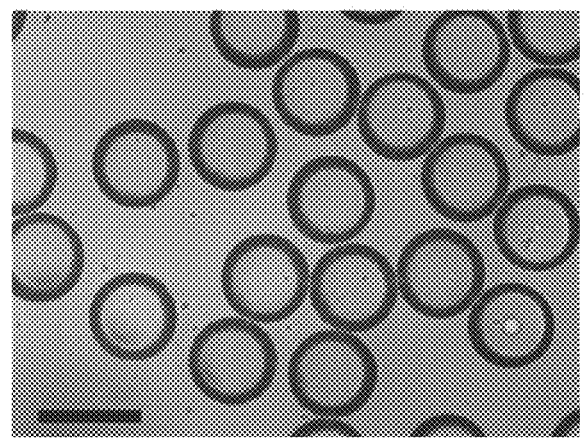

O/W/O double emulsion droplets may be prepared in a similar manner. To produce O/W/O double emulsion droplets, 2-[methoxy(polyethyleneoxy)propyl]trimethoxyl silane (Gelest, Inc.) was coated onto the injection capillary wall to render it hydrophilic, and n-octadecyltrimethoxyl silane (Aldrich) was coated onto the collection capillary wall to render it hydrophobic. Using a microfluidic device with the same geometry but opposite surface modifications, double emulsion droplets of silicone oil (AR 20)/1 wt % aqueous solution of F108/2 wt % silicone oil of DC749 were prepared, as illustrated in FIGS. 8A-8C. FIG. 8A is a schematic illustration of the microfluidic device used to prepare O/W/O double emulsion droplets. FIGS. 8B-8C are optical microscope images showing generation of O/W/O double emulsion droplets in the dripping mode and the resultant monodisperse double emulsion droplets.

Figure 9A:
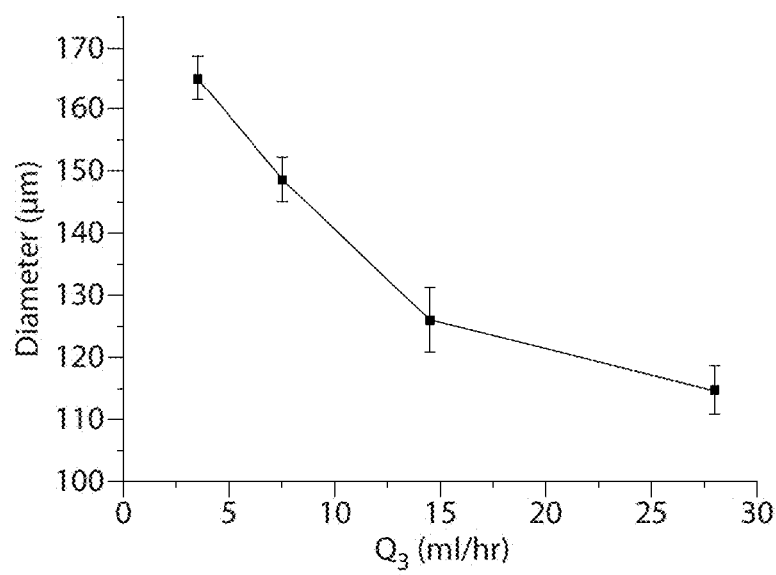
FIGS. 9A-9D show (A) a plot of droplet diameter as a function of $Q_3$ in accordance with some embodiments, (B) optical microscope images of certain multiple emulsions, (C) a plot of thickness as a function of flow ratios, and (D) optical microscope images of certain multiple emulsions, according to some embodiments.
Figure 9B:
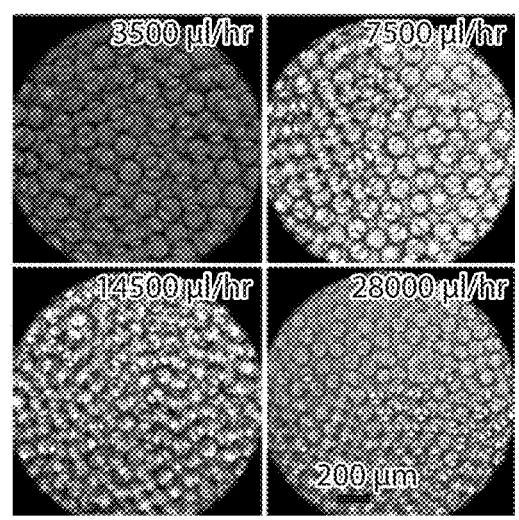

When operating in the dripping mode, droplet generation appeared to be governed by two competing forces: the capillary force that holds the droplet to the end of the channel and the drag force that pulls the droplet downstream. The size of double emulsion droplets may be controlled, for example, by controlling the flow rate of the continuous phase (which is proportional to the drag force). FIG. 9A includes a plot of emulsion diameter as a function of the rate of a continuous fluid flow in the outer channel 612, $Q_3$, and FIG. 9B shows optical microscope images of relatively monodisperse double emulsion droplets prepared at the denoted flow rates of the continuous phase. When the flow rate was increased, the diameter of the double emulsion droplets decreased, as shown in FIGS. 9A-9B. The resultant double emulsion droplets were relatively monodisperse, and the diameter had a coefficient of variation in range of 1.0-1.9%.

The thickness, t, of the outer layer of the double emulsion droplets was difficult to accurately measure from optical microscope images. However, the thicknesses of the outer layer could also be estimated by comparing the radius of the double emulsion droplet (R) to the radius of a single "oil" droplet ($R_{rup}$) prepared by rupturing the double emulsion droplet such that the inner "water" phase is transported out of the "oil" shell and into the continuous "water" phase, leaving behind an "oil" droplet. The thickness of the "oil" shell prior to rupturing can be calculated using the following mass balance equation, noting that the volume of the initial "oil" shell (the left-hand side of Equation 2) will be equivalent to the volume of the "oil" droplet formed after rupturing the double emulsion (the right-hand side of Equation 2):

$$\frac{4\pi R^3}{3} - \frac{4\pi (R-t)^3}{3} = \frac{4\pi R_{rup}^3}{3} \quad [2]$$

Rearranging Equation 2 to calculate the shell thickness yields:

$$t = R - (R^3 - R_{rup}^3)^{1/3} \quad [3]$$

Figure 9C:
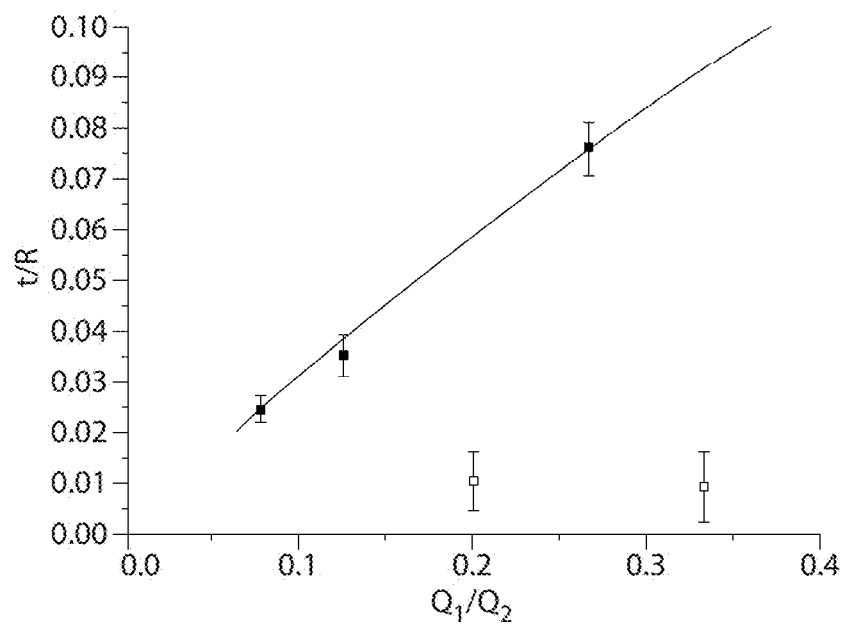
Figure 9D:
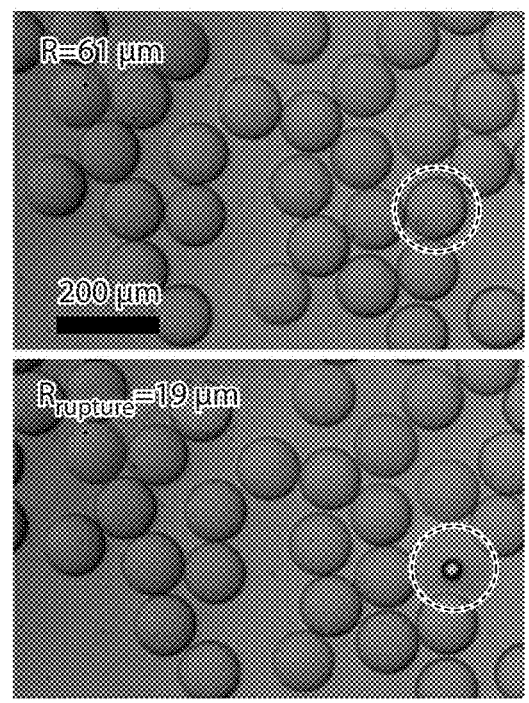

As an example, two optical microscope images are shown in FIG. 9D, which exhibits rupturing of double emulsion droplets by applying a mechanical force to the double emulsion suspension. Specifically, the double emulsion droplets were ruptured by placing a suspension of double emulsion droplets on the top of a glass slide and tapping the glass slide on a solid surface, such as a tabletop. Rupturing a double emulsion droplet resulted in a single emulsion droplet (denoted with the dotted circle in FIG. 9D). The radii observed in these two images were R=61 micrometers and $R_{rup}$=19 micrometers, resulting in a thickness of 620 nm.

In the same manner, using various double emulsion droplets produced at various relative flow rates of inner stream 604 ($Q_1$) to outer stream 602 ($Q_2$), the thicknesses of the outer layers of these double emulsion droplets were calculated (see FIG. 9C). In FIG. 9C, the top curve shows the thicknesses of the outer fluids of the double emulsion droplets prepared by the stable jetting or dripping modes, while the two data points at the bottom of the plot are from double emulsion droplets prepared using discontinuous dripping. The top curve in FIG. 9C fitted to the data is related to the mass balance equation. Specifically, Equations 4 and 5 below can be derived from mass conservation:

$$Q_1 = f \frac{4\pi (R-t)^3}{3} \quad [4]$$

$$Q_2 = f \left( \frac{4\pi R^3}{3} - \frac{4\pi (R-t)^3}{3} \right) \quad [5]$$

where f is frequency of drop generation. By dividing Equation 5 by Equation 4, and rearranging, the following equation can be obtained:

$$\frac{t}{R} = 1 - \left(1 + \frac{Q_1}{Q_2}\right)^{-\frac{1}{3}} \quad [6]$$

By contrast, the discontinuous dripping mode produced double emulsion droplets including outer fluid layers with very small relative thicknesses, regardless of the flow rates. Not wishing to be bound by any particular theory, this regime may have formed consistently thin outer fluid layers because the amount of the oil phase positioned between the plug-like water droplets and the inner wall of the injection channel (which eventually formed the outer layer of the double emulsion droplets) was very small. In fact, in this flow regime, most of the injected oil was situated between the plug-like water droplets, producing relatively large oil plugs contained between the water droplets that eventually formed the cores of the double-emulsion droplets. Because very little oil was positioned adjacent the water droplets, little oil was available to produce the outer layers, and the outer layers were very thin. Most of the injected oil flow was between two neighboring water droplets, forming large oil droplets at the exit opening rather than double emulsion droplets. Although the discontinuous dripping mode produced both relatively monodisperse double emulsion droplets with a thin outer fluid layer, as well as large oil (single-emulsion) droplets, separation of the double emulsion droplets from the mixture was easily achieved by taking advantage of the density difference between the the double emulsion droplets and the single emulsion droplets: the average density of the double emulsion droplets was almost same as the density of the aqueous inner fluid, while the density of the single emulsion oil droplets was almost the same as the density of the oil solution surrounding the droplets. Thus, the two types of droplets could readily be separated based on their density differences.

Double emulsion droplets were used to make microcapsules by removing fluid from the outer phase to produce a solid phase from material that was originally contained within the fluid of the outer phase. As a specific example, in some cases, a concentrated organic solution of polymers with high molecular weights in water was used as the outer phase. Double emulsion droplets containing a relatively thin outer fluid layer were produced, and this relatively thin outer fluid layer was solidified to form a shell that provided stability to the resulting particles. These particles could maintain their respective solidified shells around the contained inner fluid without being disrupted for relatively long times.

Figure 10A:
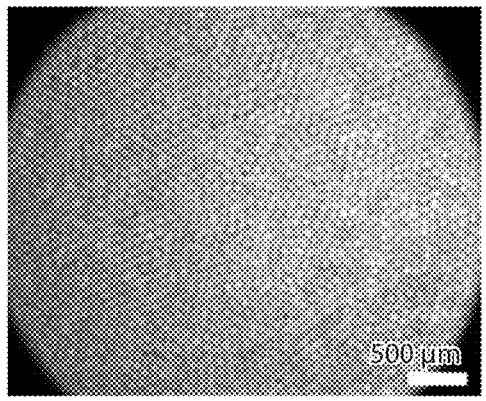
FIGS. 10A-10D show, according to some embodiments, (A-B) optical microscope images of certain multiple emulsions and (C-D) confocal microscope images of certain multiple emulsions.
Figure 10B:
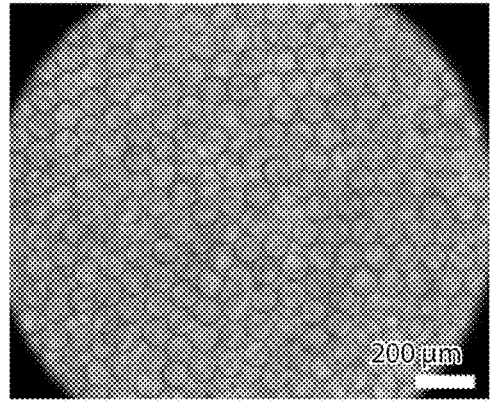

To illustrate some of the advantages discussed herein, polymeric particles having a shell containing a fluid were prepared, in which the shell was formed from poly(lactic acid) (PLA, MW 15,000). To produce W/O/W double emulsion droplets, a 10 wt % aqueous solution of PVA containing a green dye, 8-hydroxyl-1,3,6-pyrenetrisulfonic acid, trisodium salt, was used for the inner phase. 20 wt % of PLA in toluene containing a red dye, nile red, was used for the outer phase. A 3 wt % aqueous solution of PVA was employed for the carrying fluid. Approximately 1,000 double emulsion droplets were generated each second in the dripping mode. The resultant droplets, illustrated in the optical microscope images in FIGS. 10A-10B, were found to be relatively monodisperse.

Figure 10C:
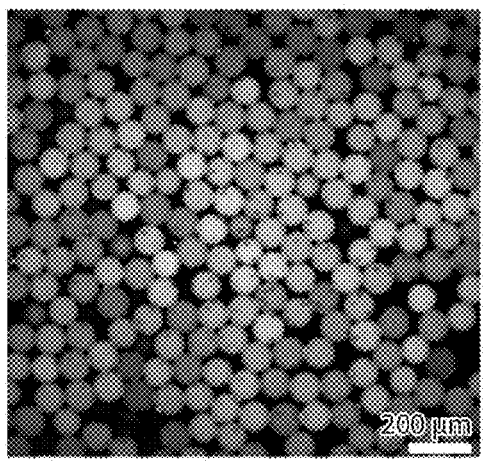
Figure 10D:
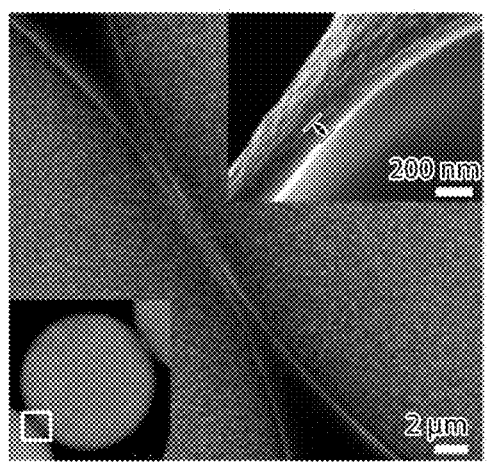

To remove toluene from the outer fluid layer, the suspension was exposed to a temperature of 65° C. for 2 hours. During this process, the toluene diffused from the outer phase to the PVA carrying fluid, from which the toluene was subsequently evaporated at 65° C. After the consolidation step, polymeric particles were produced, as shown in the confocal microscope images of FIGS. 10C-10D. At the maximum magnification, the thickness of the shells of the particles were observed to be smaller than 500 nm, as seen in FIG. 10D. A scanning electron microscope (SEM) image of the shell cross-section was also taken, showing that the thickness of the shell was about 80 nm, as shown in the inset of FIG. 10D. This was consistent with the confocal microscope images, especially considering that the outer fluid layer may have shrunk significantly during consolidation.

Figure 11A:
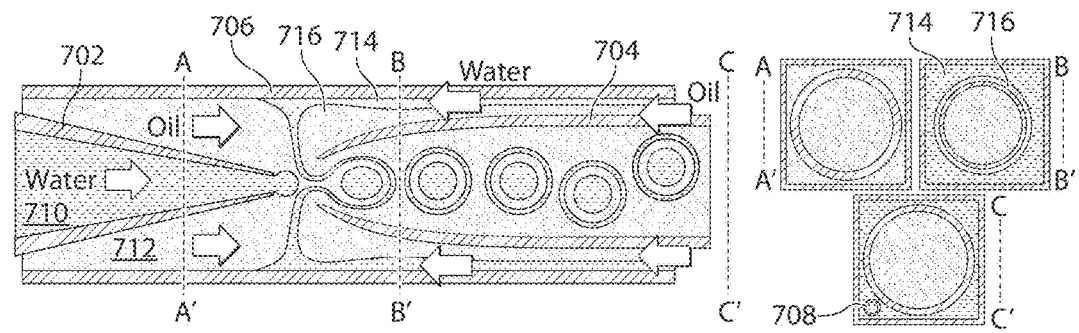
FIGS. 11A-11C show (A) an exemplary cross-sectional schematic diagram illustrating a system for producing certain multiple emulsions and (B-C) optical microscope images illustrating a production of certain multiple emulsions, according to some embodiments.

Higher-order multiple emulsion droplets were produced through a single-step emulsification process using a stable coaxial flow in a confining microfluidic channel. The device configuration used for producing triple emulsion droplets of water-in-oil-in-water-in-oil ($W_1/O_2/W_3/O_4$) is illustrated schematically in FIG. 11A, including three cross-sectional schematics taken along the A-A' plane, the B-B' plane, and the C-C' plane. The device included a tapered injection channel 702 and a collection channel 704 inserted in a third square channel 706. A small tapered channel 708 was also inserted into the space between the collection and square channel 706, as shown in the cross-section taken along C-C' to flow two immiscible fluids at the same time. An aqueous phase fluid 710 was passed through the injection channel to form the inner cores, while an oil phase fluid 712 was passed through channel 706 around injection channel 702 to form an outer layer of fluid for the resulting multiple emulsion droplets.

In this example, inner surface of channel 706 has a hydrophilic surface, while the outer surfaces of channels 702 and 704 (facing channel 706) are hydrophobic. 2-[methoxy (polyethyleneoxy)propyl]trimethoxyl silane (Gelest, Inc.) was used to make the walls of channel 706 hydrophilic, while n-octadecyltrimethoxyl silane (Aldrich) was used to make the walls of channels 702 and 704 hydrophobic. To prepare triple emulsion droplets, water was used for the innermost phase 710, hexadecane with 1 wt % SPAN 80 surfactant was used for oil phase 712 (i.e., for the first, "oil" shell), an aqueous solution of 3 wt % poly (vinyl alcohol) (PVA) and 1 wt % F108 surfactant was used for water phase 714 (i.e., for the second, "water" shell), and hexadecane with 1 wt % SPAN 80 was used as continuous phase 716. When both water 714 and oil 716 were introduced from the right side of channel 706, between collection channel 704 and channel 706, oil passed along the outer surface of collection channel 704 with water 714 shielding oil 716, as shown in the cross-section of B-B'. In this arrangement, the fluids formed coaxial interfaces in the opening of collection channel 704, which facilitated the formation of triple emulsion droplets in a single step emulsification process.

Figure 11B:
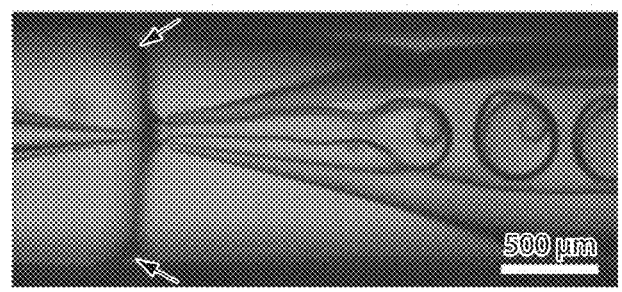
Figure 11C:
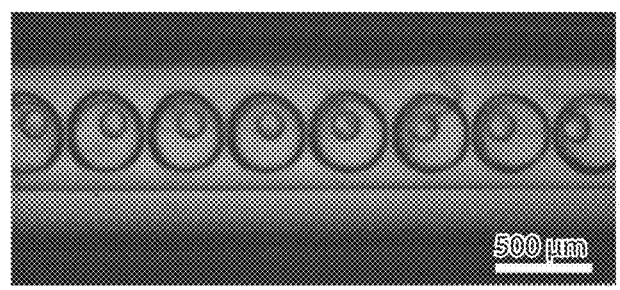

For the preparation of triple emulsion droplets, water ($W_1$) and hexadecane with 1 wt % SPAN 80 surfactant ($O_2$) were passed through injection channel 702 and the channel between injection channel 702 and channel 706, respectively, while both an aqueous solution of 3 wt % poly(vinyl alcohol) (PVA) and 1 wt % F108 surfactant ($W_3$) and hexadecane with 1 wt % SPAN 80 ($O_4$) were passed through the channel between collection channel 704 and square channel 706. The aqueous ($W_3$) and the hexadecane surfactant solutions ($O_4$) formed a coaxial interface, and were passed into the opening of collection channel 704, together with the water ($W_1$) and the hexadecane ($O_2$) from the left side. Using this arrangement, triple emulsion droplets of $W_1/O_2/W_3/O_4$ were prepared in collection channel 704. The triple emulsion droplets are displayed in the optical microscope images of FIGS. 11B-11C. The white arrows in FIG. 1B denote the aqueous stream for fluid layer $W_3$. The three phases of $O_2$, $W_3$, and $O_4$ were passed through the opening of collection channel 704 by forming two coaxial interfaces of $O_2/W_3$ and $W_3/O_4$ while the inner fluid water droplets ($W_1$) (which were produced at the tip of injection channel 702 in a dripping mode, at least in this example) triggered the breakup of the coaxial interfaces to form the final multiple emulsion droplets.

Figure 12A:
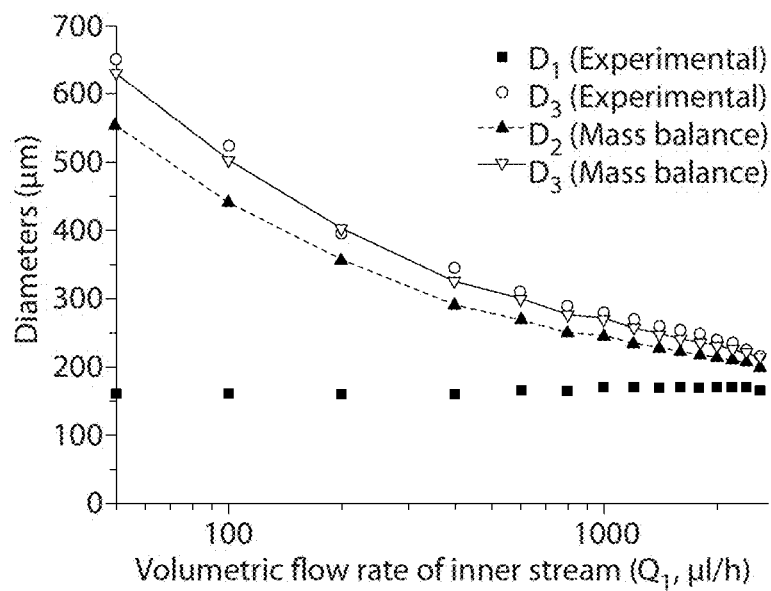
FIGS. 12A-12D show (A) an exemplary plot of droplet diameters as a function of a volumetric flow rate of an inner stream in accordance with some embodiments and (B-D) optical microscope images illustrating a production of certain multiple emulsions, according to some embodiments.

In this arrangement, the flow rate of the aqueous inner phase ($Q_1$) determined the sizes of the triple emulsion droplets. FIG. 12A is a plot of the diameters of the inner ($D_1$), the middle ($D_2$) and the outer fluid droplets ($D_3$) in a W/O/W/O triple emulsion droplets as a function of the flow rate of the inner aqueous phase ($Q_1$), where the flow rates of the middle fluid ($Q_2$), the outer fluid ($Q_3$), and the carrying oil fluid ($Q_4$) phases were kept at 2 ml/h, 1 ml/h, and 3 ml/h, respectively. Triangles (▲) and upside down triangles (▼) denote the calculated diameters $D_2$ and $D_3$ from mass balances. As the flow rate of the aqueous inner phase $Q_1$ was increased, the frequency by which inner fluid droplets were generated increased without a significant change of diameter ($D_1$) under dripping conditions. In addition, as $Q_1$ increased, the frequency of breakup increased, which resulted in the reduction of the diameter of the middle droplets ($D_2$) and the outer droplets ($D_3$). Not wishing to be bound by any particular theory, the slight increase of inner droplet diameter $D_1$ may be attributable to a change in the position of the contact line of the aqueous inner stream on the tip of the hydrophobic injection channel. Diameters $D_2$ and $D_3$ can be calculated using the following mass balance equations, which describe core drop-triggered breakup:

$$D_2 = D_1\left(1 + \frac{Q_2}{Q_1}\right)^{1/3} \text{ and } D_3 = D_1\left(1 + \frac{Q_2 + Q_3}{Q_1}\right)^{1/3} \quad [7]$$

where $Q_2$ and $Q_3$ are volumetric flow rates of $O_2$ and $W_3$, respectively. The calculated diameter of $D_3$ appeared to be consistent with the experimentally measured diameters.

Figure 12B:
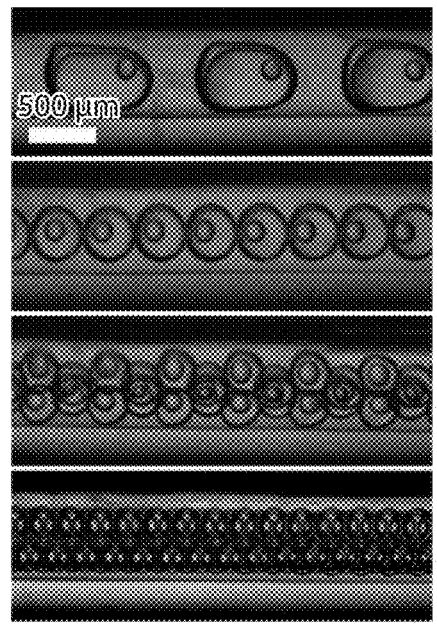
Figure 12C:
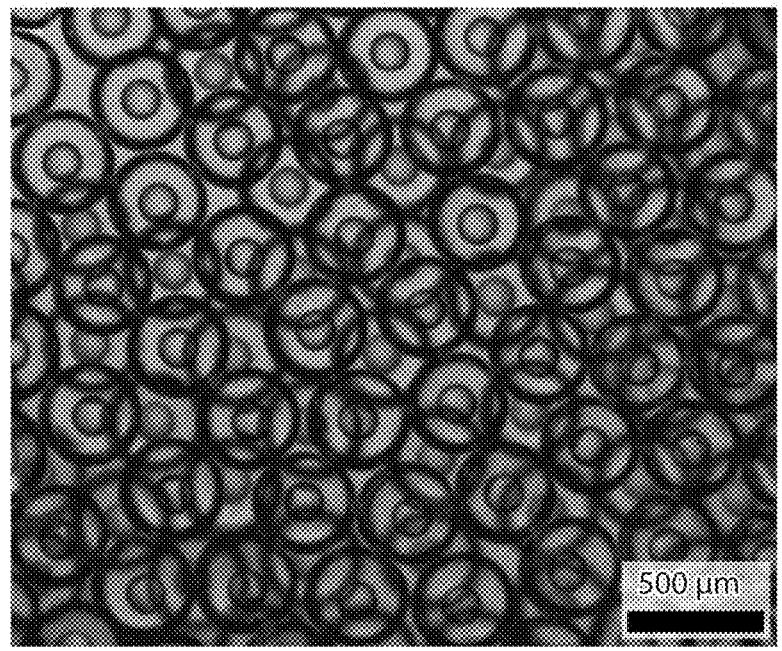
Figure 12D:
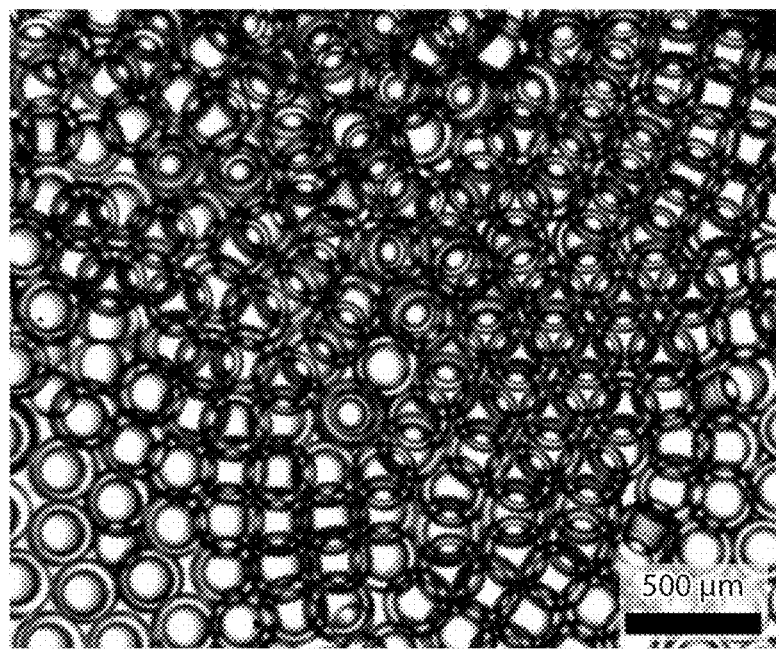

FIG. 12B shows optical microscope images of the downstream emulsions at $Q_1$ values of 50 microliters/hour (top), 200 microliters/hour, 800 microliters/hour, and 2600 microliters/hour (bottom). Optical microscope images of the monodisperse triple emulsion droplets produced at two different values of $Q_1$ (0.2 ml/h and 1.6 ml/h) are displayed in FIGS. 12C and 12D, respectively.

For larger values of $Q_2$, the droplet breakup mechanism changed from core drop-triggering to jetting. The coaxial interfaces formed a long jet, and plug-like droplets containing any desirable number of core droplets could be produced, as illustrated in the optical microscope image of FIG. 13A. FIG. 13B is a plot of the number of inner fluid droplets formed in the emulsion as a function of the volumetric flow rate of the inner fluid stream ($Q_1$). As shown in FIG. 13B, the number of inner fluid droplets may be controlled by adjusting $Q_1$, which determined the relative frequency of inner droplet generation and interface breakup. In FIG. 13B, the flow rates of the middle oil ($Q_2$), the outer aqueous ($Q_3$), and the carrying oil ($Q_4$) phases were kept at 4.0 ml/h, 1.4 ml/h, and 3.0 ml/h, respectively. FIG. 13C shows optical microscope images showing the triple emulsion droplets containing various numbers of core droplets, as denoted in each respective microscope image.

Figure 14A:
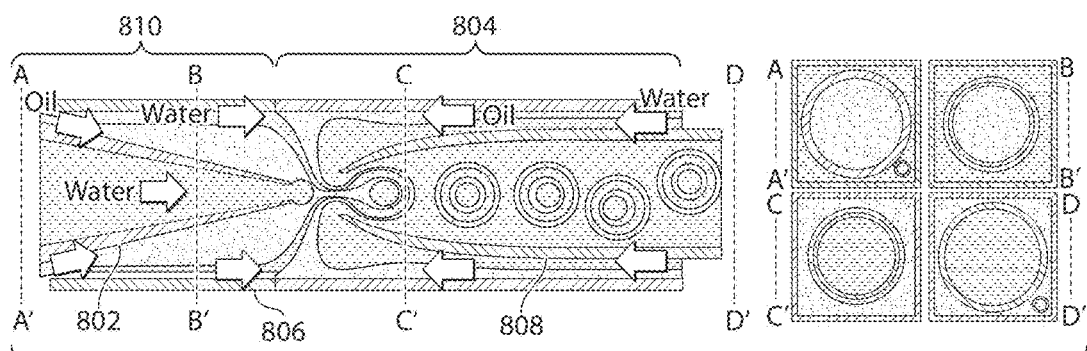
FIGS. 14A-14D show (A) an exemplary cross-sectional schematic diagram illustrating a system for producing certain multiple emulsions and (B-D) optical microscope images illustrating a production of certain multiple emulsions, according to some embodiments.
Figure 14B:
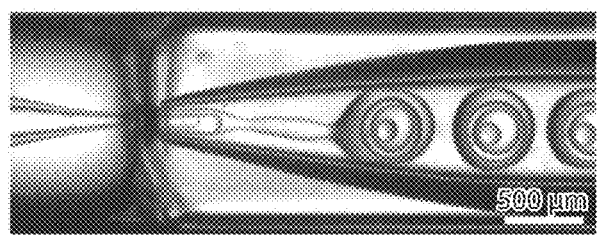
Figure 14C:
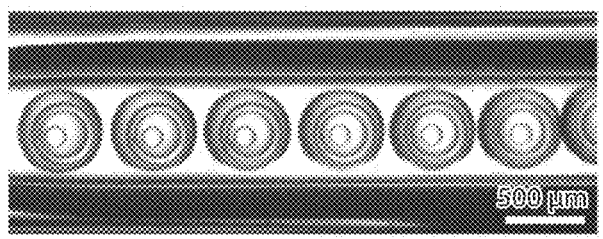
Figure 14D:
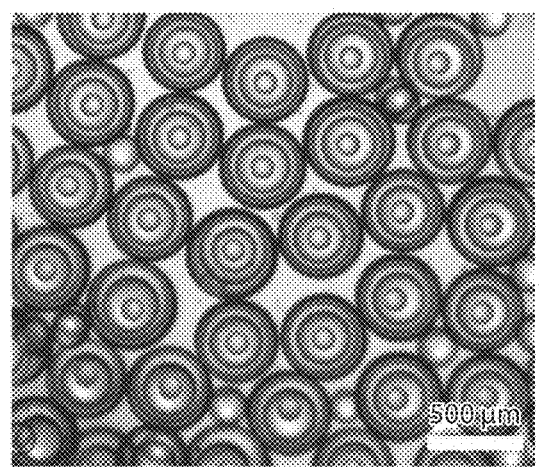

Substantially monodisperse quadruple emulsion droplets were also prepared using a single-step emulsification process. The device used to produce quadruple emulsion droplets was similar to the device used to produce triple emulsion droplets, and is illustrated schematically in FIG. 14A (including cross-sectional schematic illustrations along planes A-A', B-B', C-C', and D-D'). Two biphasic streams from both the left and right sides of channel 806 formed three coaxial interfaces. Quadruple emulsion droplets were made by breaking up the interfaces triggered by core droplets. For $W_1/O_2/W_3/O_4/W_5$ quadruple emulsion droplets, injection channel 802 and portion 804 of the square channel 806 on the opposite side of the injection channel were treated to be hydrophobic, and the collection channel 808 and the remaining part 810 of square channel are treated to be hydrophilic, using techniques similar to those described above. To modify the inner wall of square channel 806 into two distinct regions, two square channels were treated with different silane coupling agents and then connected together to form a single channel. The gap between the two channels was sealed by an epoxy resin to form a single channel. The breakup of the three concentric interfaces of $O_2/W_3$, $W_3/O_4$, and $O_4/W_5$ was triggered by the injection of inner fluid droplets, resulting in substantially monodisperse quadruple emulsion droplets as shown in the optical microscope images of FIGS. 14B-14D. The breakup occurred sequentially from the inner interfaces to the outer interfaces.

Figure 15A:
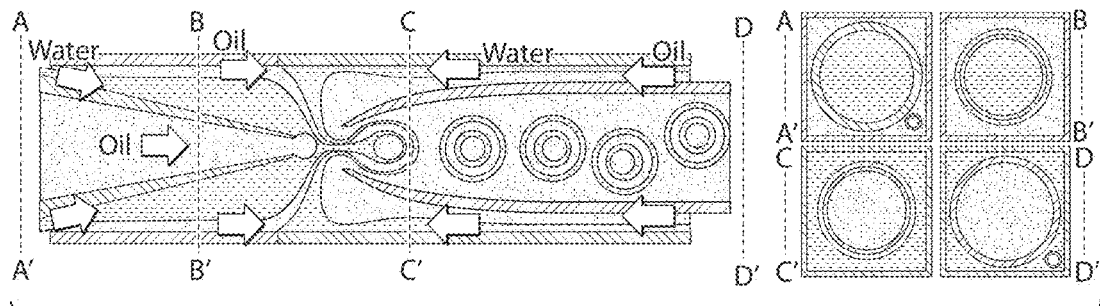
FIGS. 15A-15D show (A) an exemplary cross-sectional schematic diagram illustrating a system for producing certain multiple emulsions and (B-D) optical microscope images illustrating the production of certain multiple emulsions, according to some embodiments.
Figure 15B:
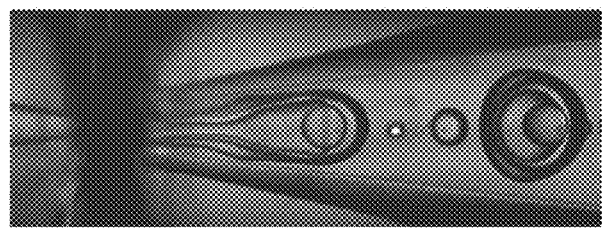
Figure 15C:
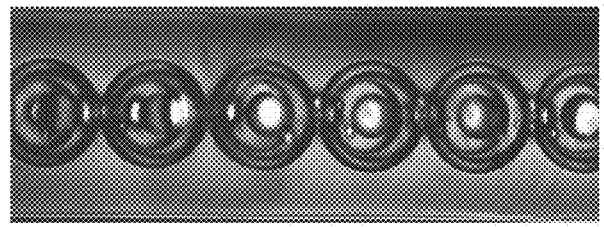
Figure 15D:
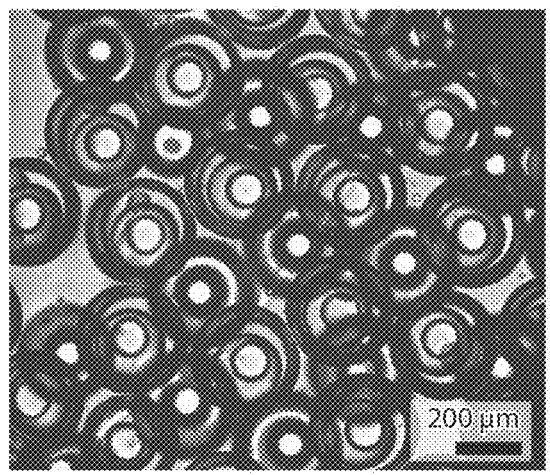

Inverse quadruple emulsion droplets with an O/W/O/W/O arrangement were also produced using a device with the same geometry as the device used to produce W/O/W/O/W emulsions, but with the opposite chemical modifications, as illustrated schematically in FIG. 15A (including cross-sectional schematic illustrations along planes A-A', B-B', C-C', and D-D'). FIGS. 15B-15D include optical microscope images showing the resultant quadruple emulsions.

Example 2

This example describes the use of certain microfluidic techniques to make polymer particles comprising shells with nano-scale thicknesses. The polymer shell was designed such that it remained solid during transit and liquefied upon contact with a suitable target medium, such as hydrocarbons or oil (e.g., any aromatic or short chain hydrocarbon oil, or other oil as discussed herein), locally transporting a fluid and/or an agent contained within the particle to the oil (or other target medium). Release of the contents of the particles was triggered when the solid polymer shell was exposed to the oil, after which the shell became disrupted. For example, at least a portion of the shell may liquefy and/or behave like a viscoelastic fluid, exposing the fluid and/or agent within the particle to the target medium. The liquefied shell of the particle may shrink rapidly in some embodiments, expelling or otherwise transporting the fluid and/or agent out of the particle, into the oil. Not wishing to be bound by any particular theory, it is believed that the shell of the particle shrinks in some cases in order to decrease the interfacial area and/or the surface energy of the particle. The time required for the particle to expose the agent and/or fluid to the target medium (e.g., by expelling the fluid and/or agent from the particle) may be tuned, for instance, by varying the molecular weight of the polymer. This may also be adjusted depending on the composition of the oil or other target medium. This method of triggered release may be used for a variety of different applications, for example, for reservoir applications such as enhanced oil recovery (EOR), or other applications such as those described herein.

A double emulsion template using microfluidic devices (generally described in Example 1) was used to contain one or more agents within shells having thicknesses ranging from, e.g., about 100 nm to about 1 micrometer. The microfluidic devices allowed for the control of particle properties, for example, mechanical stability, release, and/or loading efficiencies in various embodiments. The microfluidic devices also allowed for easy fabrication, e.g., for the production of particles having desirable properties and/or for tailoring the properties of the particles for use in various applications.

Figure 16:
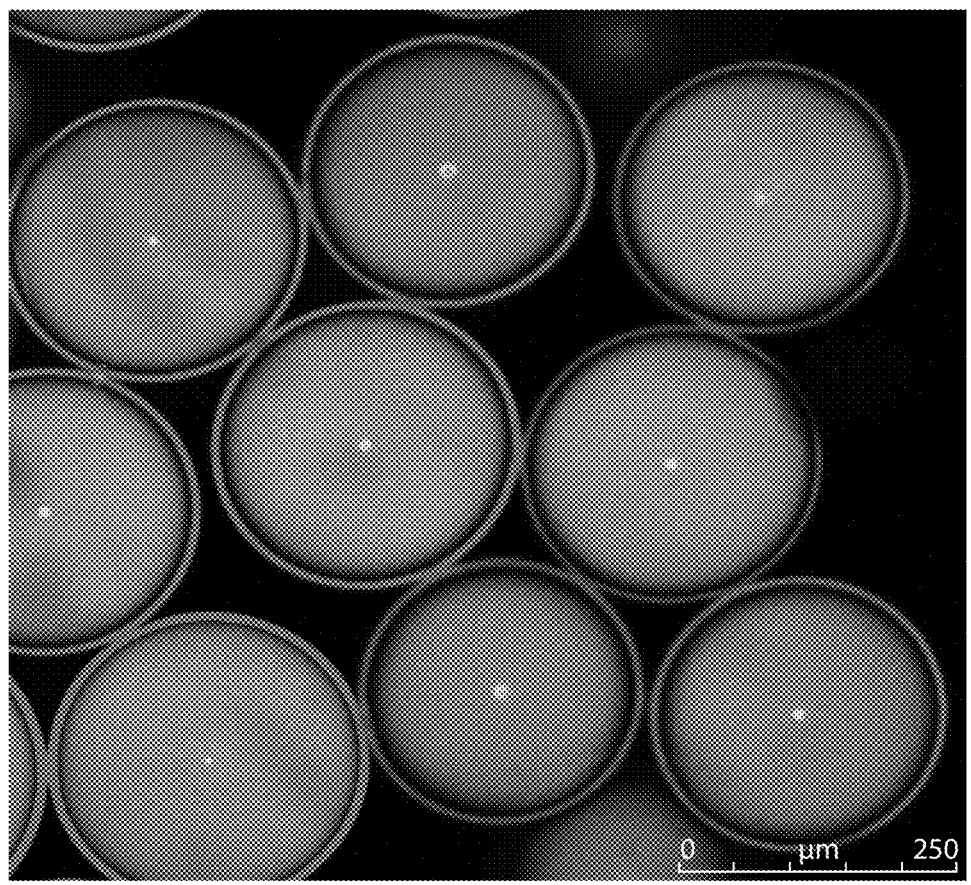
FIG. 16 illustrates, according to one set of embodiments, a confocal microscope image of a particle comprising a polystyrene shell.

In this example, the carrying fluid was prepared by dissolving 10 g PVA (MW=13000-23000, Aldrich) in 90 mL of water. The outer fluid was formed using a solution of 8 wt % linear polystyrene (MW=20000-800000, Aldrich) and 0.01 g of Nile Red (fluorescent dye, Sigma) dissolved in toluene. The inner or core fluid was prepared by dissolving 1 g of PVA (MW=13000-23000, Aldrich) in 9 mL of water. To visualize the core via confocal microscopy, 0.05 g Dex-FITC (Polysciences) was added to the inner fluid solution. All fluids were pumped into the microfluidic device using syringe pumps (Harvard PHD 2000 series). Flow rates for the continuous, middle and the core fluids were set at 300, 500, and 20,000 microliters/h, respectively. In FIG. 16, as an example, the confocal microscope image shows a polystyrene (PS) shell encapsulating a labeled surfactant, 10 wt % PVA.

The outer fluid was solidified to form shells by evaporating the solvent (toluene) inside the outer fluid away from the droplets using a heat treatment process (65° C. for 2 hours) to form a shell comprising the solid linear polymer.

The ability to produce thin particle shells offers several advantages. For example, the thin shell was found to be robust, and could contain a wide range of materials without failing mechanically, while the shell was still able to be disrupted upon contact with even small concentrations or amounts of oils or hydrocarbons (or other suitable target medium).

In this example, the microfluidic fabrication process was monitored using an inverted optical microscope (DM-IRB, Leica) fit with a fast camera (Phantom V9, Vision Research). Confocal images of the particles were obtained using a scanning confocal microscope (Leica TCS-SP5).

Example 3

This example describes the production of particles comprising thin polymeric shells that were configured to controllably release their contents. In this example, the carrying fluid was prepared by dissolving 10 g PVA (weight-averaged MW=52500-23000; Aldrich) in 90 mL of water. The outer fluid was formed using a solution of 8 wt % linear polystyrene (MW=20,000-800,000, Aldrich) and 0.01 g of Nile Red (fluorescent dye, Sigma) dissolved in toluene. The inner or core fluid was prepared by dispersing 0.1 g of fluorescently labeled magnetic poly styrene particles (Polyscience, size=1 micrometers) in 5 mL of water. All fluids were pumped into the microfluidic device using syringe pumps (Harvard PHD 2000 series). Flow rates for the core, middle, and continuous fluids were set at 650, 400 and 12,000 microliters/h, respectively.

Figure 17A:
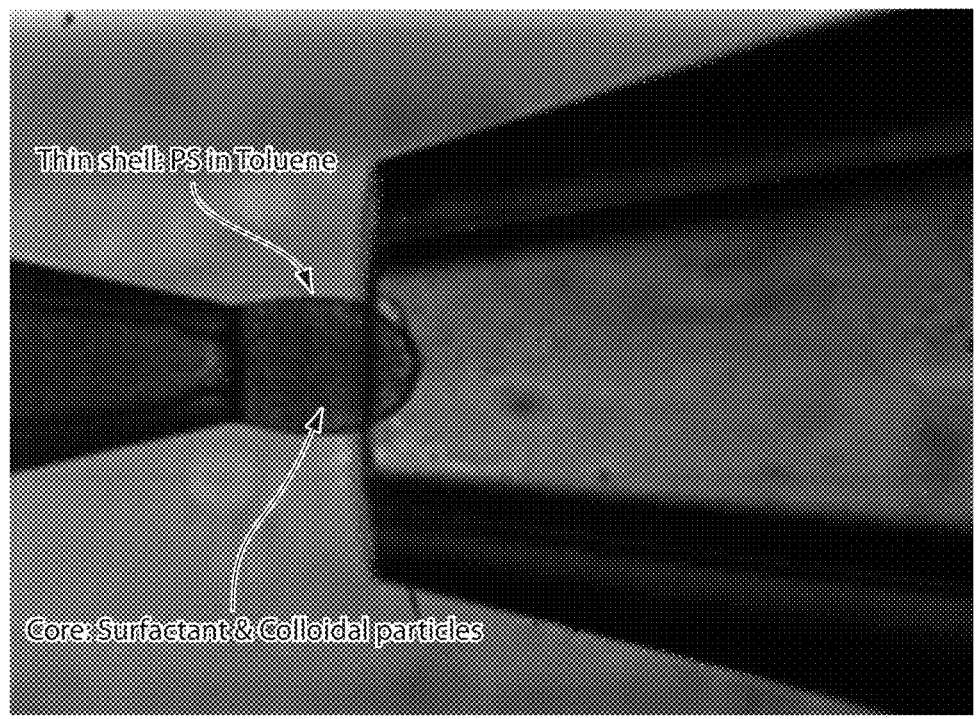
FIGS. 17A-17B show (A) an optical microscope image illustrating the production of a multiple emulsion, and (B) a confocal microscope image of a particle containing fluorescently labeled polystyrene nanoparticles, according to some embodiments.
Figure 17B:
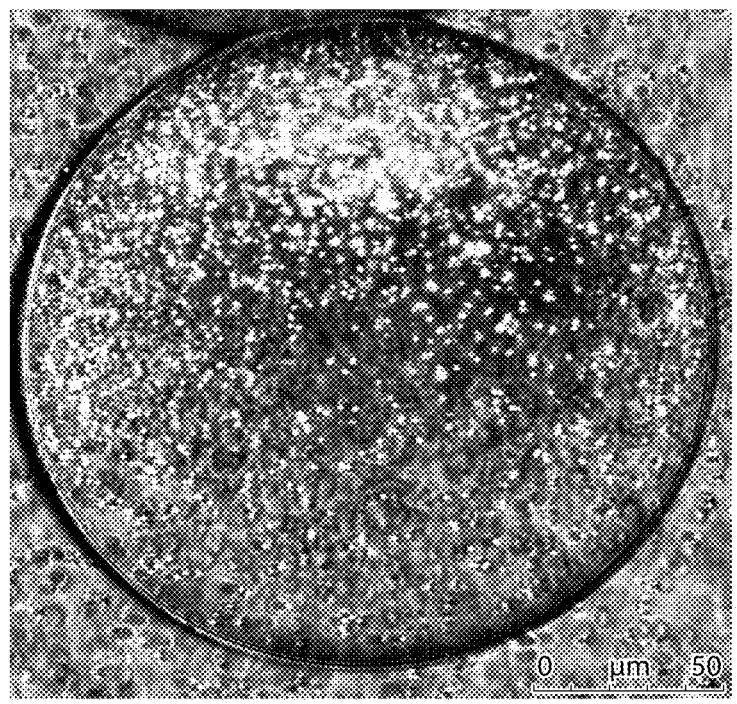

FIG. 17A illustrates the microfluidic production of a particle having a thin PS shell containing smaller magnetic nanoparticles as an example agent. The particles having the thin PS shells were produced at the opening of an injection channel inside the collection channel. The microfluidic system was similar to the ones discussed above. The confocal microscope image in FIG. 17B shows a particle containing fluorescently labeled PS nanoparticles contained within an unlabeled PS shell. The PS nanoparticles were found to be confined to the PS container, as discussed below, confirming a high encapsulation efficiency.

Figure 18C:
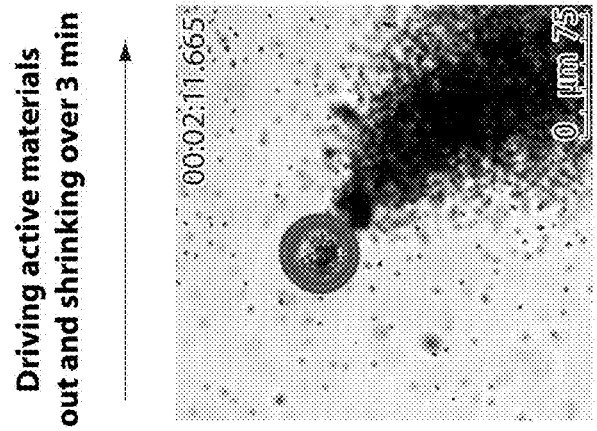
FIGS. 18A-18C show confocal microscope images illustrating a controlled release mechanism, according to one set of embodiments.
Figure 18B:
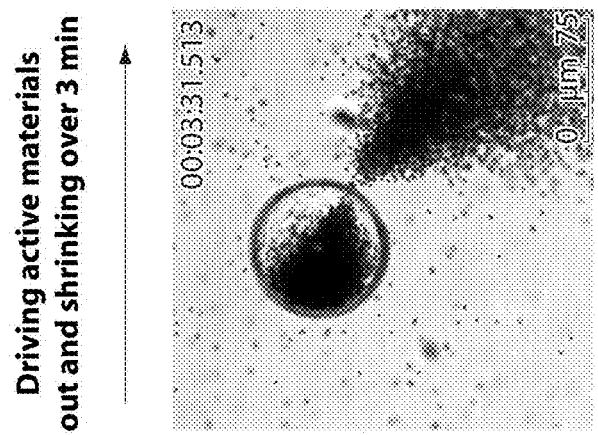
Figure 18A:
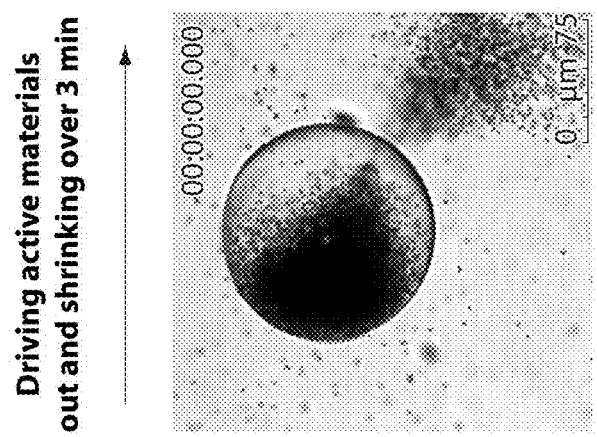

Controlled release of fluids or agents contained within the particles may be achieved by first contacting the shells of the particles with an oil, after which, in some cases, the shell absorbs the oil and becomes more fluid or otherwise disrupted. This solid to fluid-like transition created a shell defect, which initiated shell collapse and subsequent release of agent contained within the shell. FIGS. 18A-18C include three confocal microscope images illustrating the controlled release mechanism. In FIGS. 18A-18C, the shells of various particles containing a divinyl benzene/polystyrene (DVB-PS) shell viscoelastically transformed from solid to liquid. The period of time over which this transition occurred varied depended on the oil composition. As the shell of the particle absorbed the oil, the solid shell became more like a liquid-like viscoelastic material. During contact with oil, a small amount of the shell dissolved in the oil, producing a defect in the shell. In FIG. 18A, the particle forced the nanoparticles contained within the particle out through the defect of the shell into the surrounding oil. The nanoparticles were pushed out of the collapsing particle while the particle decreased in size. Expelling of nanoparticles proceeded through the shell defect until substantially all of the nanoparticles were completely forced out of the particle (FIGS. 18B and 18C).

Figure 19A:
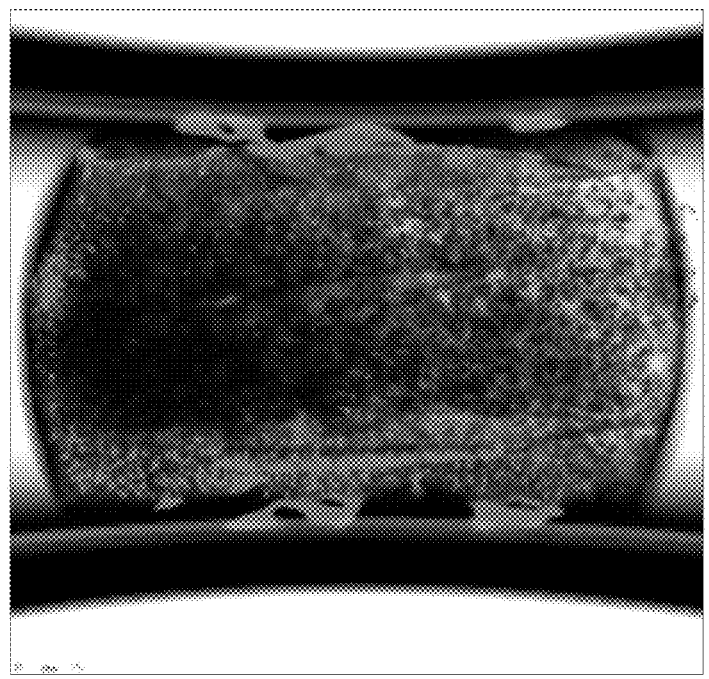
FIGS. 19A-19C show (A-B) confocal microscope images of particles as they are squeezed through a glass microfluidic channel and (C) a bright field image of a particle as it is passed through a glass microfluidic channel, according to some embodiments.
Figure 19B:
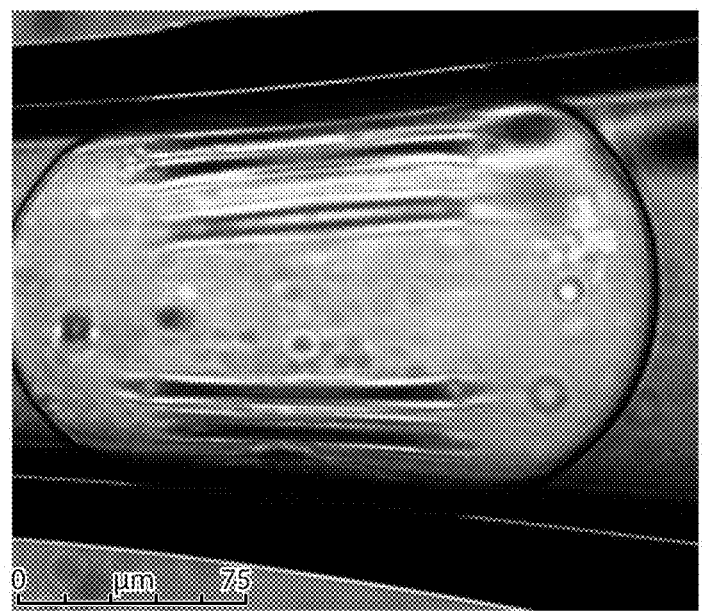
Figure 19C:
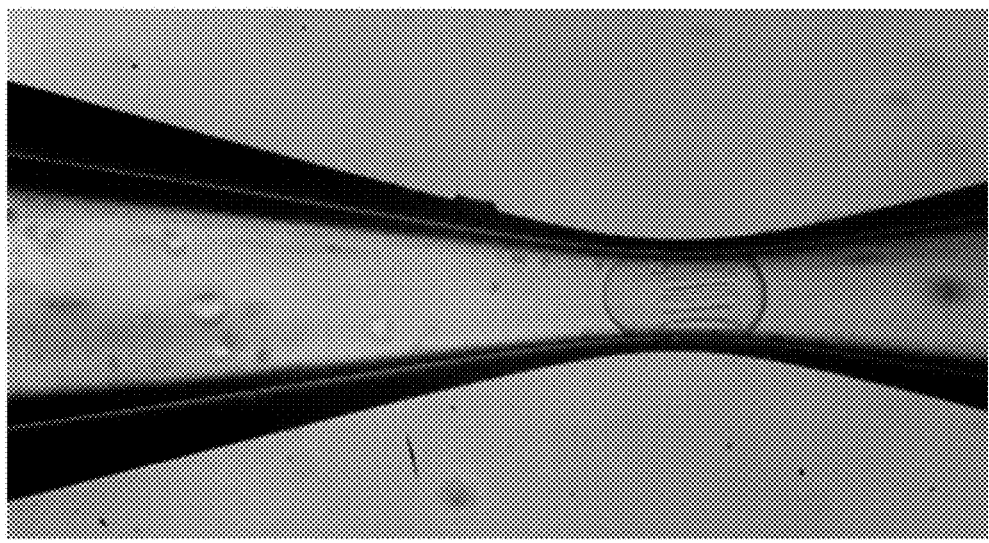

In another set of experiments, additional particles were formed that comprised a triblock copolymer (PS-PIP-PS) inside a shell. These particles exhibited a similar release mechanism as the one discussed above. The shells of these particles comprising the PS-PIP-PS triblock copolymer were relatively flexible, which allowed the particles to be passed through confined geometries smaller than the particle diameter without disruption or release of agents contained within the particles. FIGS. 19A-19B include confocal microscope images of the PS-PIP-PS capsules (Diameter=150 micrometers) as they were squeezed through a confined glass microfluidic channel (diameter=80 micrometers). FIG. 19C includes a bright field image of the same process. The use of flexible shells in the particles can allow the particles to retain their mechanical integrity, e.g., while being manipulated, packed, passed through confined channels, openings, etc.

Figure 20:
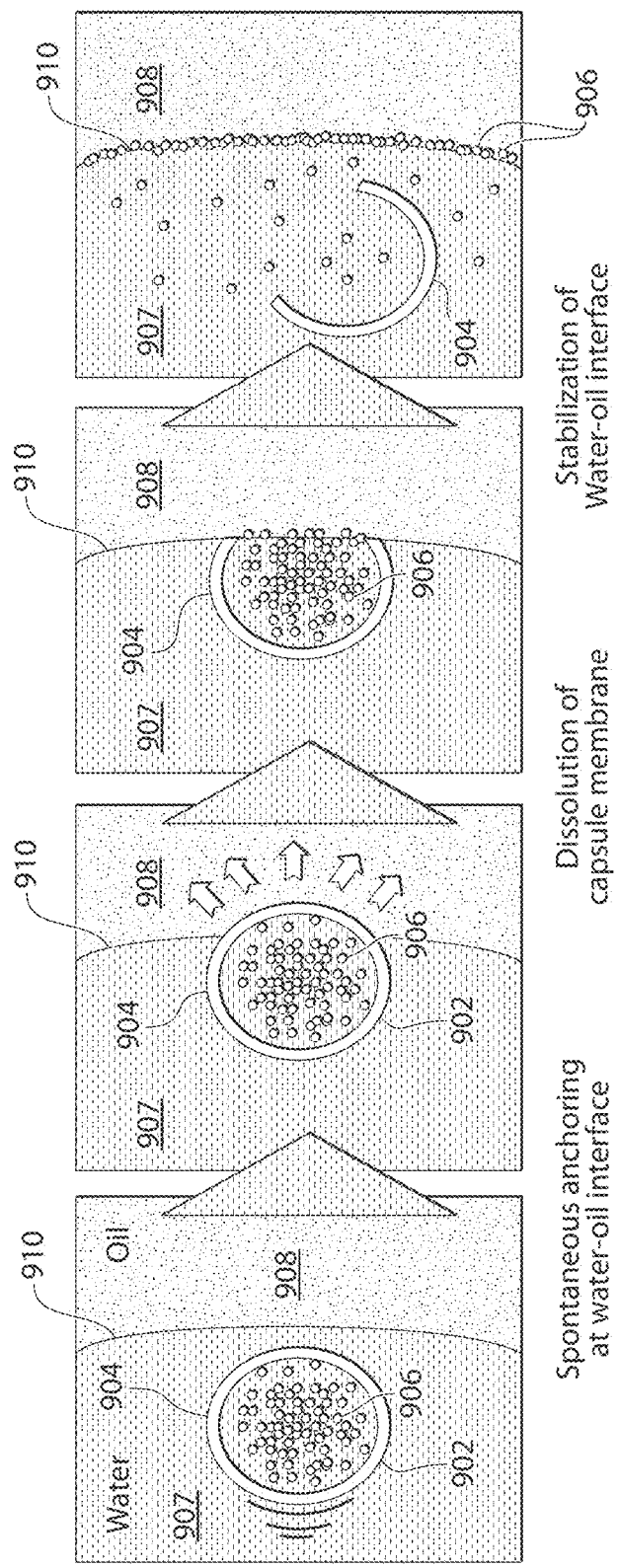
FIG. 20 is a schematic illustration of delivery of an agent to an oil-water interface, according to one set of embodiments.

FIG. 20 includes a schematic illustration showing how particles may be used in an enhanced oil recovery (EOR) process, according to certain embodiments of the invention. In FIG. 20, particle 902 includes a shell 904 encapsulating a surfactant 906. Particle 902 may be suspended in an aqueous vehicle 907 (e.g., water) and transported to a target medium 908 containing oil. Upon encountering interface 910 between vehicle 907 and target medium 908, at least a part of shell 904 of particle 902 may absorb oil and undergo a viscoelastic solid-to-liquid transition, which may initiate shell 904 liquefaction to expose agents contained within the particles to target medium 908. In some cases, the agent may be locally released to the target medium, as illustrated in FIG. 20.

The polymer shell in these examples may be formed using a variety of polymers including polystyrene (PS), polycaprolactone (PCL), and/or a variety of other polymers. As an example, by incorporating PCL in the shell of particle, controlled release of a fluid and/or an agent contained within the particle may be made dependent upon the pH of the environment, e.g., of the target medium. The use of pH-dependent materials in the shell could also be useful in applications such as targeted drug delivery. As an example, targeted delivery of magnetic particles (useful, for example, for identification of residual oil in place (ROIP) by NMR sensing) may also be achieved. Examples of magnetic particles that may be used include iron oxide, magnetite, hematite, other compounds containing iron, or the like.

For all experiments in this example, the microfluidic fabrication process was monitored using an inverted optical microscope (DM-IRB, Leica) fit with a fast camera (Phantom V9, Vision Research). Brightfield images of dried particles were taken with an inverted optical microscope (DM-IRB, Leica) equipped with a camera (QImaging QICAM). Confocal images of the particles were obtained using a scanning confocal microscope (Leica TCS-SP5). SEM (scanning electron microscopy) images were collected with a Zeiss Ultra55 field emission microscope (FESEM) (field emission scanning electron microscopy).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
   a collection of particles, each particle comprising a shell comprising a polymer and at least partially containing a fluid, wherein:
   (a) the particles have an average diameter of less than about 1 mm,
   (b) at least about 90% of the particles within the collection have a shell with an average thickness of less than about 0.05 times the average cross-sectional diameter of the particle, and/or have a shell with an average thickness of less than about 1 micrometer, and
   (c) substantially all of the polymer within the shells has a glass transition temperature of at least about 85° C. and/or substantially all of the polymer within the shells is at least partially soluble in octane.

2. The article of claim 1, wherein the at least about 90% of the particles within the collection have a shell with an average thickness of less than about 1 micrometer.

3. The article of claim 1, wherein the at least about 90% of the particles within the collection have a shell with an average thickness of less than about 0.05 times the average cross-sectional diameter of the particle.

4. The article of claim 1, wherein the at least about 90% of the particles within the collection have a shell comprising polystyrene.

5. The article of claim 1, wherein the at least about 90% of the particles within the collection have a shell comprising polycaprolactone.

6. The article of claim 1, wherein the at least about 90% of the particles within the collection have shell comprising polyisoprene.

7. The article of claim 1, wherein the at least about 90% of the particles within the collection have a shell comprising poly(lactic acid).

8. The article of claim 7, wherein the fluid comprises a surfactant.

9. The article of claim 8, wherein the surfactant is an ionic surfactant.

10. The article of claim 1, wherein substantially all of the polymer within the shells has a glass transition temperature of at least about 85° C.

11. The article of claim 10, wherein substantially all of the polymer within the shells has a glass transition temperature of between about 85° C. and about 200° C.

12. The article of claim 1, wherein substantially all of the polymer within the shells is at least partially soluble in octane.

13. The article of claim 1, wherein substantially all of the polymer within the shells has a Young's modulus of at least about 1 MPa.

14. The article of claim 1, wherein the at least about 90% of the particles within the collection can be subjected to an absolute pressure of at least about 200 kPa without rupturing.

15. A collection of particles as defined in claim 1, wherein the collection has an overall average diameter and a distribution of diameters such that the coefficient of variation of the cross-sectional diameters of the particles is less than about 10%.

* * * * *